(12) United States Patent
Limberg

(10) Patent No.: US 9,143,375 B1
(45) Date of Patent: Sep. 22, 2015

(54) ITERATIVE-DIVERSITY COFDM BROADCASTING WITH IMPROVED SHAPING GAIN

(71) Applicant: Allen LeRoy Limberg, Port Charlotte, FL (US)

(72) Inventor: Allen LeRoy Limberg, Port Charlotte, FL (US)

( * ) Notice: Subject to any disclaimer, the term of this patent is extended or adjusted under 35 U.S.C. 154(b) by 0 days.

(21) Appl. No.: 14/641,428

(22) Filed: Mar. 8, 2015

Related U.S. Application Data

(60) Provisional application No. 61/950,160, filed on Mar. 9, 2014.

(51) Int. Cl.
| | |
|---|---|
| H04L 27/38 | (2006.01) |
| H04L 27/26 | (2006.01) |
| H04L 1/00 | (2006.01) |
| H04L 27/34 | (2006.01) |
| H04L 5/22 | (2006.01) |
| H04L 1/04 | (2006.01) |
| H04L 5/00 | (2006.01) |
| H04N 21/61 | (2011.01) |

(52) U.S. Cl.
CPC ............ *H04L 27/2646* (2013.01); *H04L 1/005* (2013.01); *H04L 1/0041* (2013.01); *H04L 1/0045* (2013.01); *H04L 1/0063* (2013.01); *H04L 1/04* (2013.01); *H04L 5/0007* (2013.01); *H04L 5/22* (2013.01); *H04L 27/265* (2013.01); *H04L 27/3483* (2013.01); *H04N 21/615* (2013.01)

(58) Field of Classification Search
USPC ........... 375/261, 299, 347, 298; 714/776, 758
See application file for complete search history.

(56) References Cited

U.S. PATENT DOCUMENTS

| | | | | |
|---|---|---|---|---|
| 8,675,754 | B1 * | 3/2014 | Yonge et al. .................. | 375/261 |
| 8,718,189 | B2 * | 5/2014 | Limberg ........................ | 375/298 |
| 8,887,030 | B2 * | 11/2014 | Loghin et al. ................. | 714/776 |
| 8,958,490 | B2 | 2/2015 | Limberg | |
| 2004/0252791 | A1 | 12/2004 | Shen et al. | |
| 2004/0255231 | A1 | 12/2004 | Shen et al. | |
| 2005/0149843 | A1 | 7/2005 | Shen et al. | |
| 2007/0162818 | A1 | 7/2007 | Shen et al. | |
| 2010/0165213 | A1 * | 7/2010 | Knutson et al. ............... | 348/731 |
| 2013/0028271 | A1 | 1/2013 | Limberg | |
| 2014/0161209 | A1 * | 6/2014 | Limberg ....................... | 375/299 |
| 2014/0177731 | A1 * | 6/2014 | Limberg .................. | 375/240.25 |

* cited by examiner

*Primary Examiner* — Eva Puente

(57) ABSTRACT

Transmitter apparatus to broadcast coded orthogonal frequency-division multiplexed (COFDM) radio-frequency carriers conveying low-density parity-check (LPDC) coding transmits the same coded DTV signals twice some time apart. The coded DTV signals of initial transmissions and of final transmissions are mapped to quadrature amplitude modulation (QAM) of the COFDM carriers according to first and second patterns, respectively. Bits that map to lattice points in the first mapping pattern more likely to experience error are mapped to lattice points in the second mapping pattern less likely to experience error. Bits that map to lattice points in the second mapping pattern more likely to experience error are mapped to lattice points in the first mapping pattern less likely to experience error. Receiver apparatus combines the earlier and later transmissions of twice-transmitted COFDM signals as part of iterative procedures for de-mapping QAM and decoding the LDPC coding of the DTV signals.

27 Claims, 25 Drawing Sheets

PER PRIOR ART

Fig. 9 1st Gray Mapping of 16QAM

Fig. 10 2nd Gray Mapping of 16QAM

| 1 1 0 0 |
|---------|
| 1 1 0 0 |
| 1 1 0 0 |
| 1 1 0 0 |

PATTERN OF 1ST BITS
IN FIG. 9 16QAM
CONSTELLATION

Fig. 11 A

| 0 1 1 0 |
|---------|
| 0 1 1 0 |
| 0 1 1 0 |
| 0 1 1 0 |

PATTERN OF 2ND BITS
IN FIG. 9 16QAM
CONSTELLATION

Fig. 11 B

| 1 1 1 1 |
|---------|
| 1 1 1 1 |
| 0 0 0 0 |
| 0 0 0 0 |

PATTERN OF 3RD BITS
IN FIG. 9 16QAM
CONSTELLATION

Fig. 11 C

| 0 0 0 0 |
|---------|
| 1 1 1 1 |
| 1 1 1 1 |
| 0 0 0 0 |

PATTERN OF 4TH BITS
IN FIG. 9 16QAM
CONSTELLATION

Fig. 11 D

| 0 1 1 0 |
|---------|
| 0 1 1 0 |
| 0 1 1 0 |
| 0 1 1 0 |

PATTERN OF 1ST BITS
IN FIG. 10 16QAM
CONSTELLATION

Fig. 12 A

| 1 1 0 0 |
|---------|
| 1 1 0 0 |
| 1 1 0 0 |
| 1 1 0 0 |

PATTERN OF 2ND BITS
IN FIG. 10 16QAM
CONSTELLATION

Fig. 12 B

| 0 0 0 0 |
|---------|
| 1 1 1 1 |
| 1 1 1 1 |
| 0 0 0 0 |

PATTERN OF 3RD BITS
IN FIG. 10 16QAM
CONSTELLATION

Fig. 12 C

| 1 1 1 1 |
|---------|
| 1 1 1 1 |
| 0 0 0 0 |
| 0 0 0 0 |

PATTERN OF 4TH BITS
IN FIG. 10 16QAM
CONSTELLATION

Fig. 12 D

Fig. 13  1st Gray Mapping of 64QAM

Fig. 14 2nd Gray Mapping of 64QAM

```
1 1 1 1 | 0 0 0 0        0 0 | 1 1 1 1 | 0 0        0 | 1 1 | 0 0 | 1 1 | 0
1 1 1 1 | 0 0 0 0        0 0 | 1 1 1 1 | 0 0        0 | 1 1 | 0 0 | 1 1 | 0
1 1 1 1 | 0 0 0 0        0 0 | 1 1 1 1 | 0 0        0 | 1 1 | 0 0 | 1 1 | 0
1 1 1 1 | 0 0 0 0        0 0 | 1 1 1 1 | 0 0        0 | 1 1 | 0 0 | 1 1 | 0
1 1 1 1 | 0 0 0 0        0 0 | 1 1 1 1 | 0 0        0 | 1 1 | 0 0 | 1 1 | 0
1 1 1 1 | 0 0 0 0        0 0 | 1 1 1 1 | 0 0        0 | 1 1 | 0 0 | 1 1 | 0
1 1 1 1 | 0 0 0 0        0 0 | 1 1 1 1 | 0 0        0 | 1 1 | 0 0 | 1 1 | 0
1 1 1 1 | 0 0 0 0        0 0 | 1 1 1 1 | 0 0        0 | 1 1 | 0 0 | 1 1 | 0
```

PATTERN OF 1ST BITS IN FIG. 13 64QAM CONSTELLATION

Fig. 15 A

PATTERN OF 2ND BITS IN FIG. 13 64QAM CONSTELLATION

Fig. 15 B

PATTERN OF 3RD BITS IN FIG. 13 64QAM CONSTELLATION

PATTERN OF 4TH BITS IN FIG. 13 64QAM CONSTELLATION

Fig. 15 D

PATTERN OF 5TH BITS IN FIG. 13 64QAM CONSTELLATION

Fig. 15 E

PATTERN OF 6TH BITS IN FIG. 13 64QAM CONSTELLATION

PATTERN OF 1ST BITS
IN FIG. 14 64QAM
CONSTELLATION

PATTERN OF 2ND BITS
IN FIG. 14 64QAM
CONSTELLATION

PATTERN OF 3RD BITS
IN FIG. 14 64QAM
CONSTELLATION

PATTERN OF 4TH BITS
IN FIG. 14 64QAM
CONSTELLATION

PATTERN OF 5TH BITS
IN FIG. 14 64QAM
CONSTELLATION

PATTERN OF 6TH BITS
IN FIG. 14 64QAM
CONSTELLATION

Fig. 16 D

Standard Gray Mapping for 16QAM

Conjugate Gray Mapping for 16QAM

Standard Gray Mapping for 64QAM

Conjugate Gray Mapping for 64QAM

ITERATIVE-DIVERSITY COFDM BROADCASTING WITH IMPROVED SHAPING GAIN

This application claims the benefit of the filing date of provisional U.S. Pat. App. Ser. No. 61/950,160 filed 9 Mar. 2014.

FIELD OF THE INVENTION

Various aspects of the invention relate to systems of over-the-air broadcasting of orthogonal frequency-division modulation (OFDM) digital television (DTV) signals for iterative-diversity reception and particularly to receiver apparatus for such systems.

BACKGROUND OF THE INVENTION

DTV broadcasting in the United States of America has been done in accordance with broadcasting standards formulated by an industry consortium called the Advanced Television Systems Committee (ATSC), which standards have prescribed the use of a vestigial-sideband amplitude-modulated single carrier in each radio-frequency (RF) channel allocated for broadcasting DTV signals. Consideration is being given to replacing those DTV broadcasting standards with new standards that may prescribe coded orthogonal frequency-division multiplexed (COFDM) plural carriers in each RF channel allocated for broadcasting DTV signals. These new standards may, for example, resemble the DVB-T2 broadcasting standard developed for use in Europe.

COFDM is typically generated beginning with randomizing digital data to insure that subsequent encoding of forward-error-correction (FEC) coding receives sufficient density of logic ONEs to operate efficiently. Then, the resulting FEC coding is subjected to some form of bit interleaving, and the bits of the interleaved FEC coding are mapped to quadrature-amplitude-modulation (QAM) symbol constellations. The real-axis and imaginary-axis spatial coordinates of the QAM symbol constellations are parsed into orthogonal frequency-division multiplex (OFDM) symbols, which modulate a single carrier wave at high rate using quadrature-amplitude-modulation (QAM). The resulting modulated carrier wave is then transformed in a fast inverse discrete Fourier transform (I-DFT) procedure to generate a multiplicity of RF carrier waves uniformly distributed within the frequency spectrum of the RF channel, each of which RF carriers is modulated at low symbol rate. (In this specification and the accompanying drawing and claims the general term "QAM" is to be considered to include QPSK, QPSK being an alternative term for 4QAM.)

Reception of COFDM generated as described in the foregoing paragraph will fail if there is severe flat-spectrum fading of substantial duration. Such flat-spectrum fading is sometimes referred to as a "drop-out" in received signal strength. Such drop-out occurs when the receiving site is changed such that a sole effective signal transmission path is blocked by an intervening hill or structure, for example. Because the signaling rate in the individual OFDM carriers is very low, COFDM receivers are capable of maintaining reception despite drop-outs that are only a fraction of a second in duration. However, drop-outs that last as long as a few seconds disrupt television reception perceptibly. Automatic gain control of the front-end tuner stages of a DTV receiver will increase their gain, amplifying noise to introduce burst noise into the FEC coding. Such protracted drop-outs are encountered in a vehicular receiver when the vehicle passes through a tunnel, for example. By way of further example of a protracted drop-out in reception, a stationary receiver may briefly discontinue COFDM reception when receiver synchronization is momentarily lost during dynamic multipath reception conditions, such as caused by an aircraft flying over the reception site. Electric motors can generate radio-frequency noise strong enough to overload the front-end tuner stages of a DTV receiver, acting as a jamming signal that obliterates COFDM reception and generates burst noise too long to be corrected by FEC coding.

The DVB-T2 standard for DTV broadcasting prescribes Bose-Chaudhuri-Hocquenghem (BCH) coding concatenated with subsequent low-density parity-check coding (LPDC) as FEC coding. The concatenated BCH-LDPC coding prescribed in the DVB-T2 standard is reported to allow better performance in the presence of AWGN to be achieved using 256QAM symbol constellations than could be achieved with DVB-T using 16QAM symbol constellations. The bits of the LDPC coding are block interleaved using a modification of matrix type of interleaving in which successive bits of LDPC coding are arranged in columns for subsequent row-by-row utilization for mapping to lattice points within successive QAM symbol constellations, which modification introduces "column twist". The DVB-T2 standard authorizes an alternative to parsing the real-axis and imaginary-axis spatial coordinates of 16QAM or 64QAM symbol constellations directly into orthogonal frequency-division multiplex (OFDM) symbols. In this alternative these QAM symbol constellations are in effect rotated relative to the real and imaginary axes of coordinate space so that every one of the lattice points of successive QAM symbols has unique coordinates along both the real axis and the imaginary axis. The unique coordinates of each QAM symbol constellation along the imaginary axis are then delayed for transmission respective to the unique coordinates of that QAM symbol constellation along the real axis. Accordingly, two unique coordinates of each QAM symbol constellation are transmitted, the second transmission being delayed respective to the first transmission for a time longer than the duration of a QAM symbol of an individual carrier. This facilitates iterative-diversity reception that can often avoid complete loss of reception of a portion of DTV signal owing to flat-spectrum fading, despite signal drop-outs that last up to a second or so.

An alternative way to facilitate iterative-diversity reception that can avoid complete loss of reception of a DTV signal owing to flat-spectrum fading, despite signal drop-outs that last up to a few seconds, is single-time retransmission of complete QAM symbol constellations after a suitable interval. Obviously, ignoring effects of signal corruption arising from noise in the transmission channel, twice transmitting complete QAM symbol constellations halves digital payload compared to transmitting them once.

When superficially considered, rotation of the QAM symbol constellations respective to the real and imaginary axes of modulation signal space appears not to reduce digital payload compared to a single-time transmission. Also, the respective times at which the initial transmission of a mapping of a set of data bits occur and at which the subsequent retransmission of a mapping of that same set of data bits occur are automatically referenced respective to each other.

However, the sizes of the data-slicing bins of the I-axis coordinates are reduced from what they would be for the square QAM symbol constellation without rotation. Also, the sizes of the data-slicing bins of the Q-axis coordinates are reduced from what they would be for the square QAM symbol constellation without rotation. E. g., the sizes of the data-slicing bins would be reduced by a factor of four when 16QAM symbol constellations are rotated. Reduction in the size of the data-slicing bins results in more bit errors being caused by AWGN corrupting the QAM. U.S. Pat. No. 8,958, 490 granted 17 Feb. 2015 to A. L. R. Limberg, titled "COFDM broadcasting with single-time retransmission of COFDM symbols" and incorporated herein by reference points out the following. The reduced-size data bins are substantially the same size as those for non-rotated 256QAM symbol constellations. The number of bit errors in data slicing that are caused by AWGN corrupting the non-rotated 256QAM symbol constellations is substantially the same as the number of bit errors in data slicing that are caused by AWGN corrupting the rotated 16QAM symbol constellations. The number of data bits that can be mapped by each of the rotated 16QAM symbol constellations is four. The number of data bits that can be mapped by each of the non-rotated 256QAM symbol constellations is eight, and single-time retransmission of the non-rotated 256QAM symbol constellations results in the same eight data bits being conveyed over two COFDM symbol block intervals. Whichever of the two methods is used to transmit data twice, two COFDM symbol block intervals convey on average eight data bits times the number of QAM symbol constellations in each COFDM symbol block interval. I. e., for given size of data-slicing bins and given number of bit errors in data slicing that are caused by similar AWGN, single-time retransmission of 256QAM symbol constellations results in similar code rate as rotated 16QAM symbol constellations do.

When the Q-axis coordinates of rotated 16QAM symbol constellations are delayed respective to their I-axis coordinates, the OFDM carriers are no longer each modulated in accordance with a respective rotated 16QAM constellation. Instead, each OFDM carrier is modulated in accordance with a respective 256QAM constellation. Presuming the 16QAM symbol constellations each used Gray mapping, the 256QAM symbol constellations are not Gray-mapped. The coordinates for the two orthogonal axes in which data-slicing is done are not Gray-coded, nor are they independent of each other. So, de-mapping rotated 16QAM constellations in a DTV receiver involves two-dimensional metrics for estimating errors in each of the four de-mapped bits to support subsequent soft decoding procedures for the FEC coding. This is a much more challenging task than de-mapping 256QAM symbol constellations that are Gray-mapped and have independent coordinates for the two orthogonal axes in which data-slicing is done. These independent coordinates are Gray-coded and de-mapping involves two sets of one-dimensional metrics for estimating errors in each of the eight de-mapped bits to support subsequent soft decoding procedures for the FEC coding. Errors can be estimated quite simply, proceeding from the departures of data-slicing results from values associated with lattice points in a 256QAM symbol constellation uncorrupted by noise.

Initial and final transmissions of the same coded data often allows a DTV receiver to replace burst noise in one of those transmissions with coded data from the other one of those transmissions. So, single-time retransmission of the same coded data facilitates the receiver being provided with substantial capability for overcoming peaks in noise of additive white Gaussian noise (AWGN) character, such as Johnson noise, as well as exceptionally effective capability for overcoming burst noise of substantial duration. This capability for overcoming burst noise facilitates the use of concatenated BCH-LDPC coding being used as FEC coding. LDPC coding is effective for overcoming AWGN, doing so at code rates almost three times those of concatenated convolutional coding (CCC) similarly effective for overcoming AWGN. LDPC coding does not have the tendency to extend burst errors that CCC has. However, LDPC coding is not very effective for correcting burst noise. While BCH coding can correct burst errors, using the BCH coding to correct a good amount of burst error distributed through each lengthy LDPC codeword requires many parity bits being associated with the systematic bits of the LDPC codeword. This undesirably reduces overall code rate of the concatenated BCH-LDPC coding. The DVB-T2 standard prescribes BCH coding capable of correcting only 10 or 12 bits in a block of 7,200 to 541,000 bits, keeping the number of parity bits per block less than 200. Accordingly, the retransmission provided by dissecting rotated symbol constellations is the principal mechanism allowing a receiver to correct burst noise in its reception of transmissions from a single COFDM transmitter. The primary reason that BCH coding was employed in DVB-T2 was to overcome the so-called "floor" in rate of reduction of bit-error-rate (BER) that occurs for signals having higher signal-to-nose ratio (SNR).

If a reception site is not more than a few kilometers distant from the COFDM transmitter or transmitters, multipath reception can cause severe frequency-selective fading of a large group of OFDM carriers in a particular portion of the RF channel. Frequency-selective fading has been observed that extends over three MHz in a 6-MHz-wide RF channel and reduces the amplitude of a central few of the selectively faded OFDM carriers as much as 35 dB respective to less affected OFDM carriers. Such frequency-selective fading corrupts so many of the QAM symbols used for modulating respective OFDM carriers that de-interleaving of the results of de-mapping the QAM symbols is unable to reduce the density of bit errors in the recovered bit-wise FEC coding to permit successful decoding thereof. In some circumstances a directional reception antenna may be able to mitigate this problem. However, the whip antenna of a hand-held receiver is apt not to have appreciable capability for rejecting co-channel interference.

U.S. Pat. No. 8,958,490 discloses the following procedures to overcome severe frequency-selective fading of a large group of OFDM carriers in a particular portion of the RF channel. COFDM symbols of initial transmissions of the coded DTV data are arranged such that their circular discrete Fourier transforms (DFTs) are rotated one-half revolution respective to the circular DFTs of corresponding COFDM symbols in time-slices of subsequent transmissions of that same DTV data. DTV receivers then de-rotate the COFDM symbols of initial transmissions of the DTV data and after delaying the resulting COFDM symbols combine them with COFDM symbols of subsequent transmissions of that same DTV data. Such DTV receivers are capable of overcoming severe frequency-selective fading that is apt to be caused by multipath reception from nearby DTV transmitters, as well as overcoming protracted severe flat-spectral fading of one of the initial and subsequent transmissions of the same DTV data.

Delaying the final transmissions of coded DTV signals up to few seconds respective to the initial transmissions of them allows receivers of suitable design to overcome protracted drop-outs in received signal strength. However, retransmitting COFDM symbols without intervening delay, or with intervening delay of only a few OFDM symbol intervals, enables receivers of suitable design better to overcome randomly occurring burst noise of short duration.

U.S. Pat. No. 8,958,490 describes COFDM receivers that decode separately the FEC coding of initial transmissions and final transmissions for iterative-diversity reception; data packets without error or with as little error as available are then chosen from the results of such separate decoding. U.S.

Pat. No. 8,958,490 also describes COFDM receivers that use maximal-ratio code combining of the coordinates of corresponding QAM symbol constellations from the initial and final transmissions of iterative-diversity reception prior to QAM de-mapping of those constellations.

The single-level LDPC block coding prescribed in the DVB-T2 DTV broadcast standard was originally designed for satellite transmission systems employing multiple-phase-shift-keying (MPSK) modulation of COFDM carriers. Single-level LDPC block coding is not optimal for uniform quadrature amplitude modulation (QAM) of COFDM carriers insofar as overcoming AWGN is concerned, since the bits of the received QAM symbols do not all have similar likelihoods of error. One prior-art approach taken to alleviate this problem is to use a plurality of various strength LDPC codes in a multi-level coding (MLC) scheme. The design of appropriate component LDPC block codes and implementation of decoders for them present problems with this approach, especially for higher order QAM constellations having larger numbers of lattice points in them.

Replacing uniform QAM of COFDM carriers with non-uniform quadrature-amplitude modulation (NUQAM) of the COFDM carriers is another prior-art approach taken to alleviate single-level LDPC block coding not being optimal for overcoming AWGN when uniform QAM of COFDM carriers is used. The problem with this approach is difficulty with the digital partitioning of received signals into regions mapping bits with equal likelihoods of them being correct.

SUMMARY OF THE INVENTION

A new approach better to fit single-level LDPC block coding for overcoming AWGN, when uniform QAM of COFDM carriers is used, relies on the repeated transmissions of data for iterative-diversity reception. Those data bits that are assigned positions in the map labels of QAM symbol constellations in initial transmissions of data that are more likely to exhibit errors owing to AWGN are assigned positions in the map labels of QAM symbol constellations in final transmissions of data that are less likely to exhibit errors owing to AWGN. Those data bits that are assigned positions in the map labels of QAM symbol constellations in final transmissions of data that are more likely to exhibit errors owing to AWGN are assigned positions in the map labels of QAM symbol constellations in initial transmissions of data that are less likely to exhibit errors owing to AWGN. When data bits from de-mapping the QAM symbol constellations in the initial transmissions of data are combined with corresponding data bits from de-mapping the QAM symbol constellations in the final transmissions of data, the likelihood of errors owing to AWGN in the combined bits is considerably more uniform than in either set of bits that are combined. This provides better overall channel shaping for subsequent decoding of single-level LDPC coding afflicted by AWGN.

BRIEF DESCRIPTION OF THE DRAWINGS

FIGS. 11A, 11B, 11C and 11D are diagrams showing patterns of how the first, second, third and fourth bits of map labels apply to lattice points within the 16QAM symbol constellation map of FIG. 9.

FIGS. 12A, 12B, 12C and 12D are diagrams showing patterns of how the first, second, third and fourth bits of map labels apply to lattice points within the 16QAM symbol constellation map of FIG. 10.

Figures 15A, 15B, 15C, 15D, 15E, 15F:
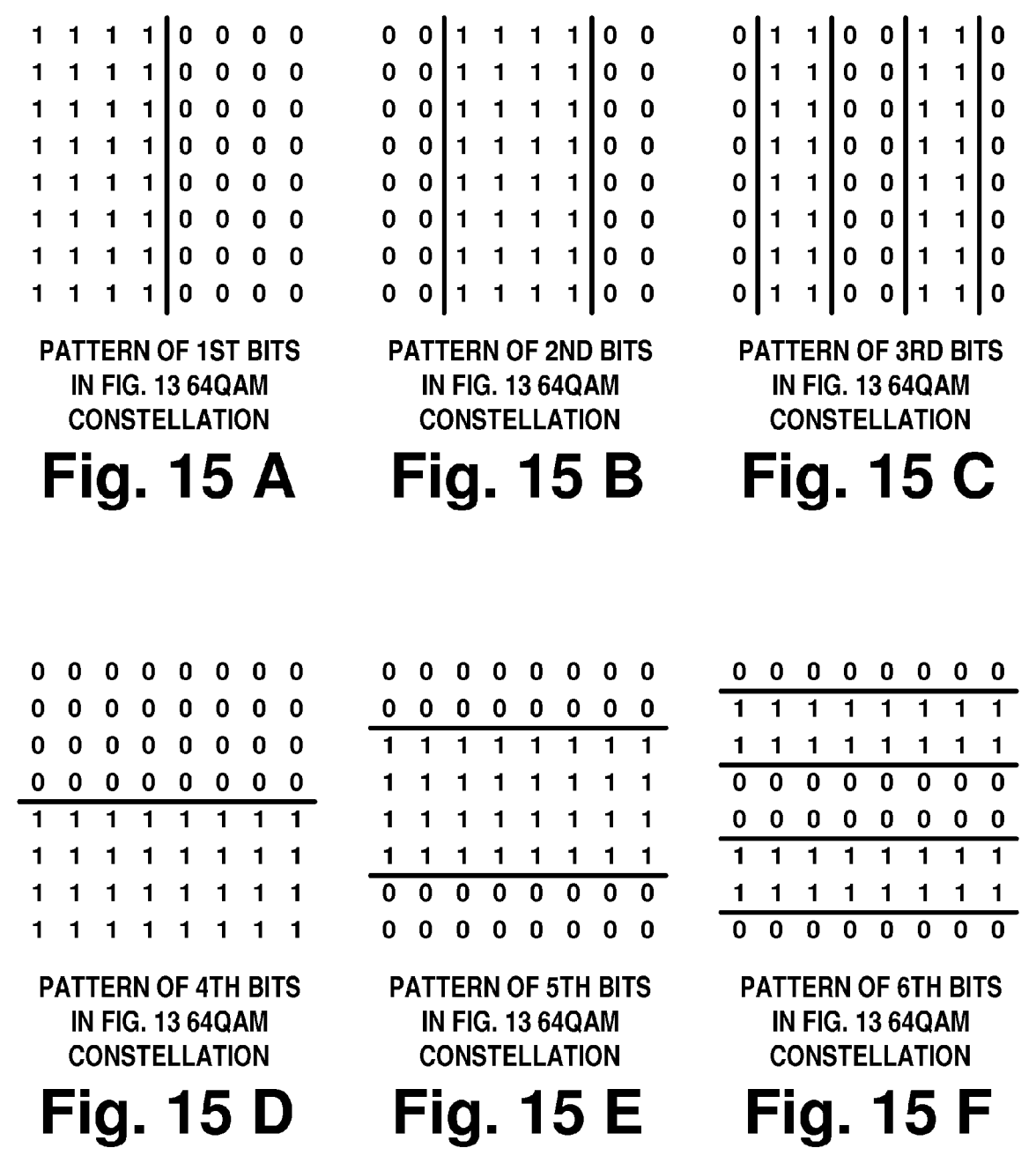

FIGS. 15A, 15B, 15C, 15D, 15E and 15F are diagrams showing patterns of the first, second, third, fourth, fifth and sixth bits within the 64QAM symbol constellation map of FIG. 13.

FIGS. 16A, 16B, 16C, 16D, 16E and 16F are diagrams showing patterns of the first, second, third, fourth, fifth and sixth bits within the 64QAM symbol constellation map of FIG. 14.

DETAILED DESCRIPTION

Figure 1:
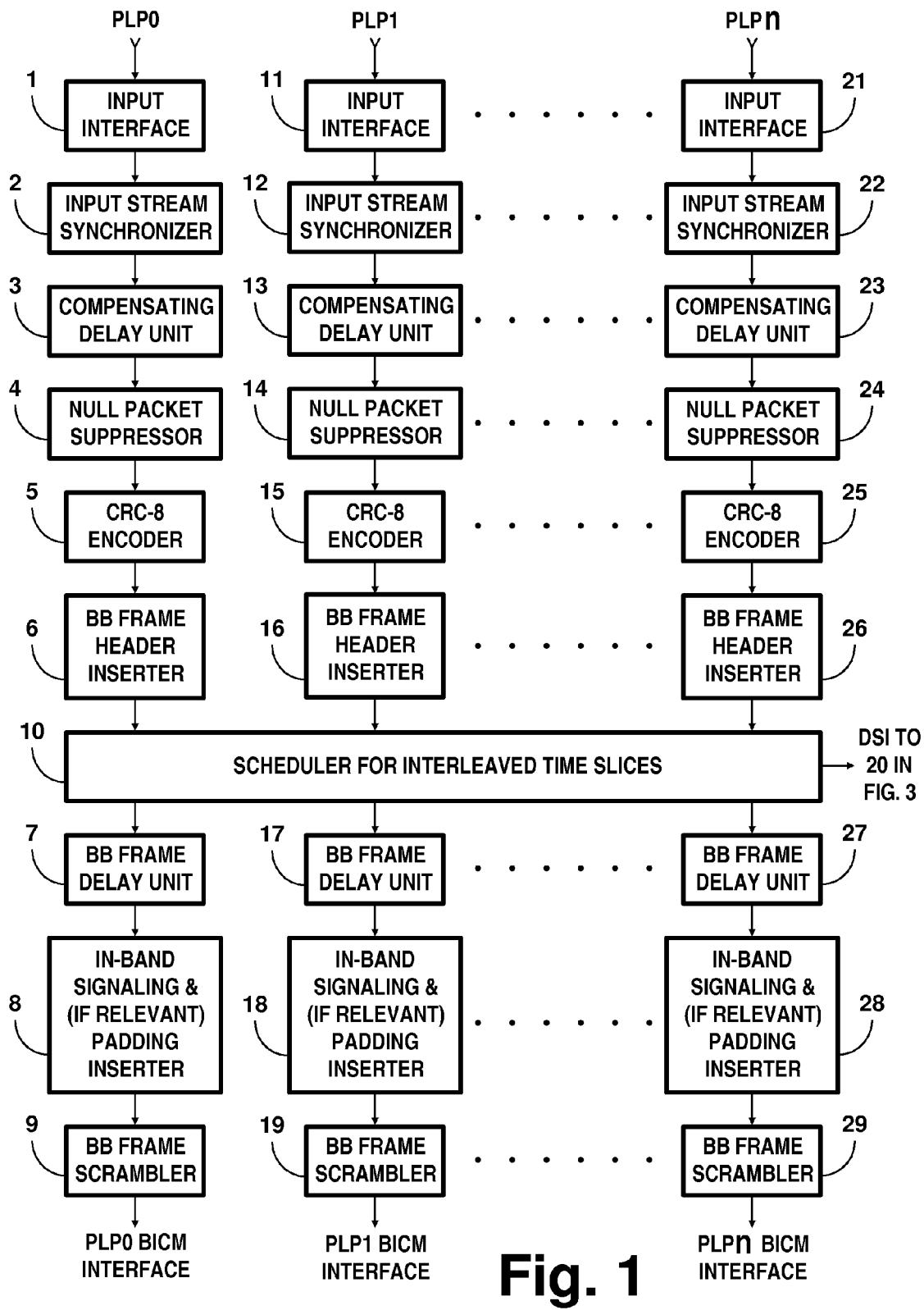
FIGS. 1, 2, 3 and 4 together form a schematic diagram of COFDM transmitter apparatus embodying aspects of the invention, which transmitter apparatus twice transmits the same coded DTV signal that uses Gray mapping (or close to Gray mapping) of the QAM of OFDM carriers.
Figure 2:
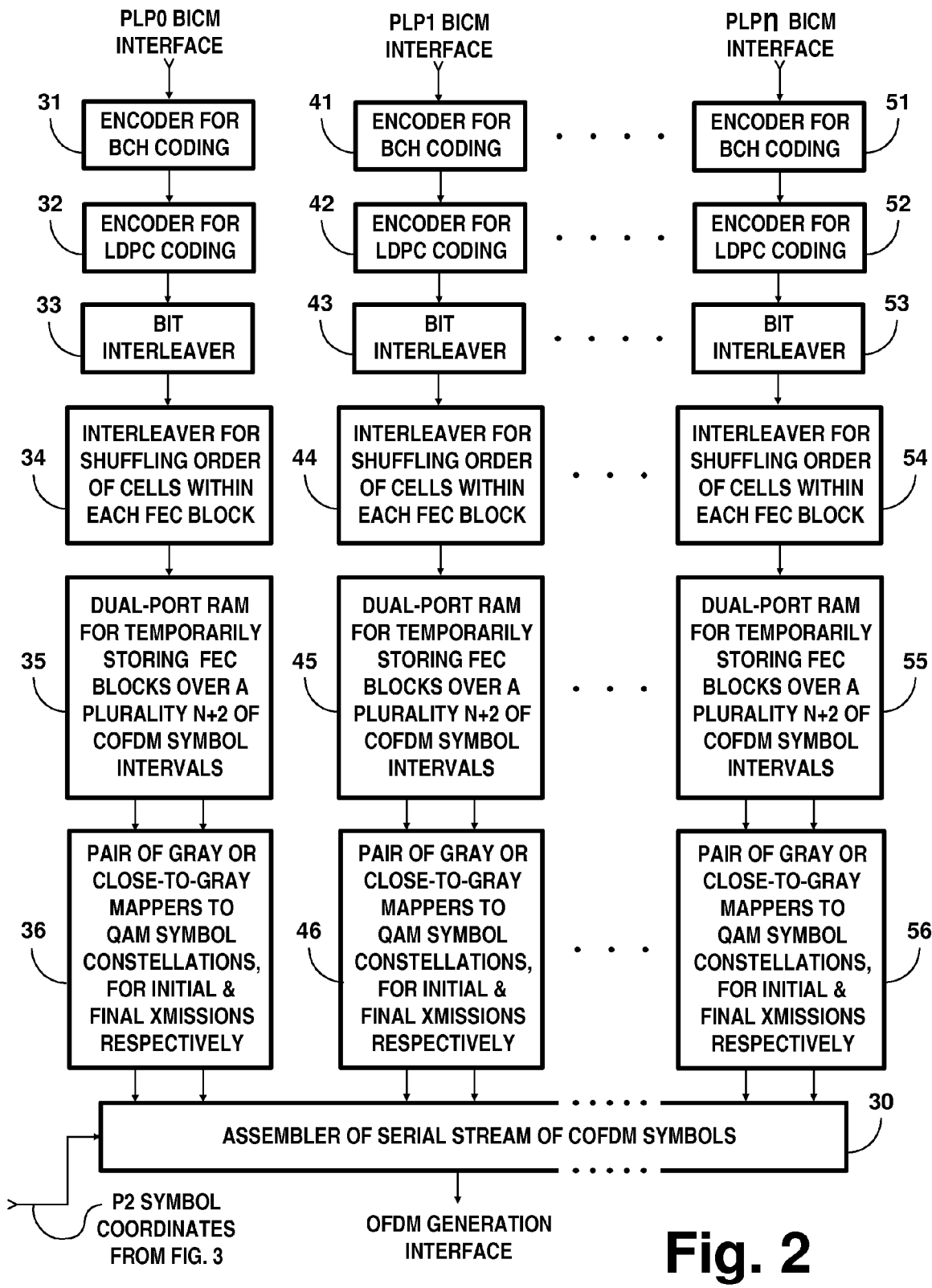
Figure 3:
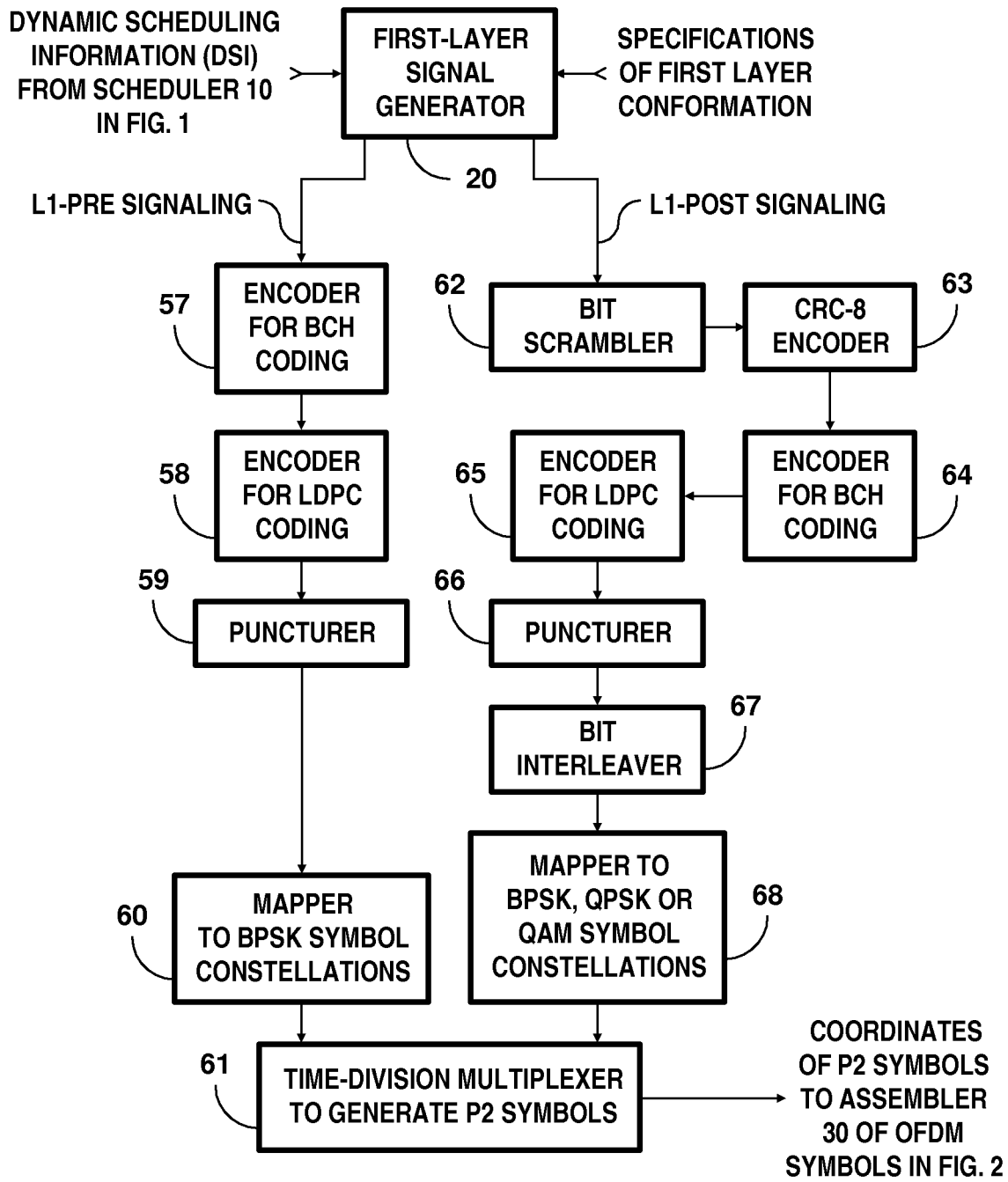
Figure 4:
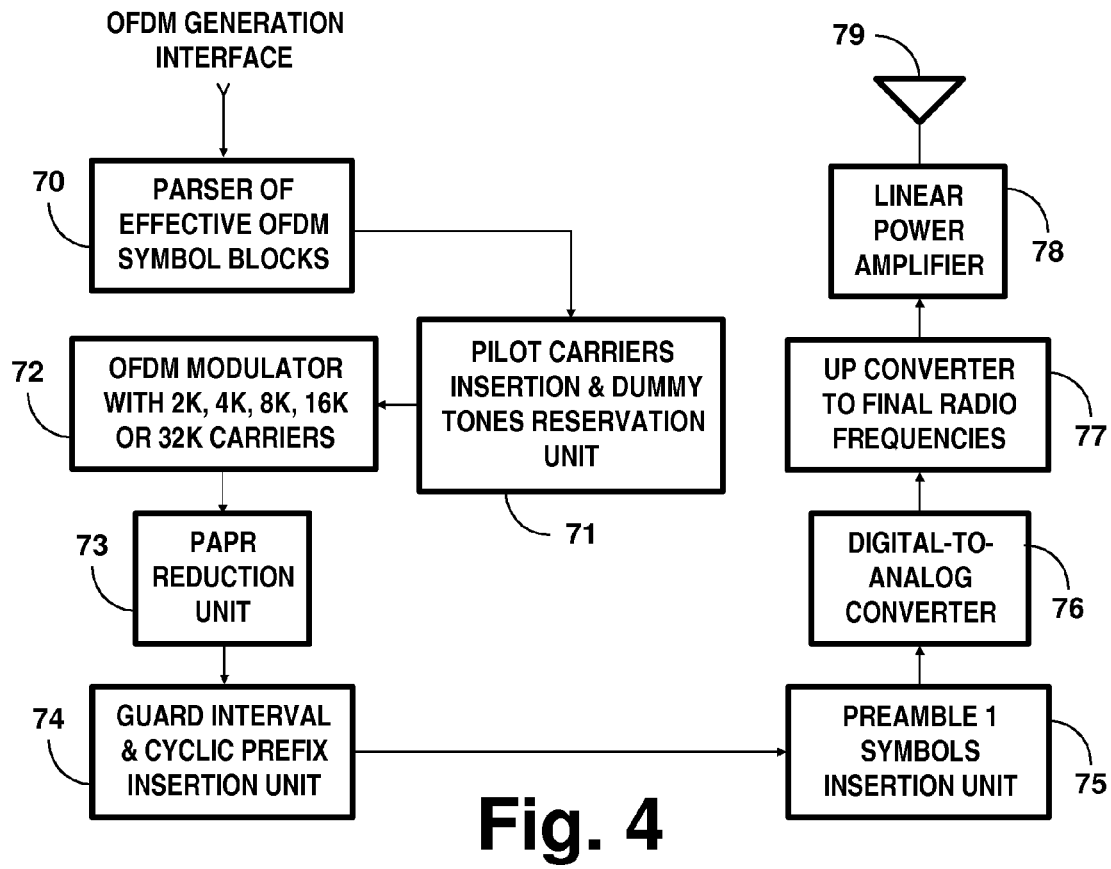

FIGS. 1, 2, 3 and 4 depict a DTV transmitter apparatus generating COFDM signals designed for reception by DTV receivers. FIG. 1 depicts apparatus for generating baseband frames (BBFRAMES) at a Bit-Interleaved Coding and Modulation (BICM) interface. FIG. 2 depicts apparatus for generating bit-wise forward-error-correction (FEC) coding and subsequent COFDM symbol blocks responsive to the BBFRAMEs supplied at the BICM interface. FIG. 3 depicts apparatus for generating bit-wise forward-error-correction (FEC) coding and subsequent COFDM symbol blocks responsive to first layer (L1) conformation specifications and to dynamic scheduling information (DSI). FIG. 4 depicts apparatus for generating and transmitting radio-frequency COFDM signals. Except for the processing of QAM symbol constellations into COFDM symbols, the DTV transmitter apparatus depicted in FIGS. 1, 2, 3 and 4 is essentially the same as specified in European Telecommunications Standards Institute (ETSI) standard EN 302 755 V1.3.1 published in April 2012, titled "Digital Video Broadcasting (DVB); Frame structure channel coding and modulation for a second generation digital terrestrial television broadcasting system (DVB-T2)", and incorporated herein by reference.

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. The scheduler 10 also generates and schedules dynamic scheduling information (DSI) for application to an additional PLP depicted in FIG. 3, which additional PLP generates OFDM symbol blocks that convey the DSI and first layer conformation specifications. Recommended practice is that at least the physical layer pipe PLP0 is a so-called "common" PLP used for transmitting data, such as a program guide, relating to the other "data" PLPs. The common PLP or PLPs are transmitted in each T2 frame following the P1 and P2 symbols, but before the data PLP or PLPs. A data PLP may be of a first type transmitted as a single slice per T2 frame, or a data PLP may be of a second type transmitted as a plurality of sub-slices disposed in non-contiguous portions of each T2 frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 bit-interleaved coding and modulation (BICM) interface. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is not sufficient to completely fill a BBFRAME, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 BICM interface. In practice the delay unit 7, the inserter 8 and the BBFRAME scrambler 9 are realized by suitable configuration of a random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 bit-interleaved coding and modulation (BICM) interface. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data randomizes bits of the BBFRAME supplied from the output port of the BBFRAME scrambler 19 as the PLP1 BICM interface. In practice the delay unit 17, the inserter 18 and the BBFRAME scrambler 19 are realized by suitable operation of a random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn bit-interleaved coding and modulation (BICM) interface. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn BICM interface. In practice the delay unit 27, the inserter 28 and the BBFRAME scrambler 29 are realized by suitable operation of a random-access memory.

The input stream synchronizers 2, 12, 22 etc. are operable to guarantee Constant Bit Rate (CBR) and constant end-to-end transmission delay for any input data format when there is more than one input data format. Some transmitters may not include ones of the input stream synchronizers 2, 12, 22 etc. or ones of the compensating delay units 3, 13, 23 etc. For some Transport-Stream (TS) input signals, a large percentage of null-packets may be present in order to accommodate variable bit-rate services in a constant bit-rate TS. In such a case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Programme Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 depicts the (n+1)th physical layer pipe PLP0 further comprising elements 31-36 in cascade connection after the PLP0 BICM interface, but before a respective input port of an assembler 30 for assembling a serial stream of OFDM symbols. More specifically, FIG. 2 depicts an encoder 31 for BCH coding with its input port connected to receive the PLP0 BICM interface signal from the output port of the BBFRAME scrambler 9 and with its output port connected to the input port of an encoder 32 for LDPC coding. FIG. 2 depicts the output port of the encoder 32 for LDPC coding connected to the input port of a bit interleaver 33, the output port of which is connected for applying bit-interleaved bit-wise FEC coding to the input port of a further interleaver 34 that shuffles the order of the QAM symbols in each successive FEC block. This shuffling implements cyclic delay diversity (CDD) that helps the FEC coding to overcome fading. The output port of the interleaver 34 connects to the write-input port of dual-port random-access memory 35. The dual-port RAM 35 is capable of temporarily storing each FEC block for a plurality of OFDM symbol intervals to implement the single-time retransmission of FEC blocks from the (n+1)th physical layer pipe PLP0, as explained in more detail with reference to FIG. 5 further on in this specification. In practice the interleaver 34 (and possibly the bit interleaver 33 as well) may be subsumed into the dual-port RAM 35 by appropriately controlling the read addressing and write addressing thereof.

The two read-output ports of the dual-port RAM 35 connect to respective input ports of a pair 36 of mappers for mapping successive bits of the interleaved bit-wise FEC coding to successive QAM symbol constellations. In the case of transmissions broadcast for reception by stationary DTV receivers, these QAM symbol constellations are apt to be square 256QAM symbol constellations or cruciform 512QAM symbol constellations, by way of specific examples. In the case of transmissions broadcast for reception by mobile DTV receivers, these QAM symbol constellations are apt to be square 16QAM symbol constellations, square 64 QAM symbol constellations or cruciform 128QAM symbol constellations, by way of specific examples.

Each of the pair 36 of mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLP0. A first of the pair 36 of mappers responds to the consecutive segments of the interleaved bit-wise FEC coding in initial transmissions thereof to generate the complex coordinates of successive QAM constellations. A second of the pair 36 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to first and second patterns, respectively. Bits that map to lattice points in the first mapping pattern more likely to experience error are mapped to lattice points in the second mapping pattern less likely to experience error. Bits that map to lattice points in the second mapping pattern more likely to experience error are mapped to lattice points in the first mapping pattern less likely to experience error. The complex coordinates of the QAM symbol constellations are supplied from the respective output ports of the pair of 36 of mappers to respective input ports of an assembler 30 for assembling a stream of OFDM symbols.

FIG. 2 depicts the first physical layer pipe PLP1 further comprising elements 41-46 in cascade connection after the PLP1 BICM interface, but before a respective input port of the assembler 30 for assembling a serial stream of OFDM symbols. More specifically, FIG. 2 depicts an encoder 41 for BCH coding with its input port connected to receive the PLP1 BICM interface signal from the output port of the BBFRAME scrambler 19 and with its output port connected to the input port of an encoder 42 for LDPC coding. FIG. 2 depicts the output port of the encoder 42 for LDPC coding connected to the input port of a bit interleaver 44, the output port of which is connected for applying bit-interleaved bit-wise FEC coding to the input port of a further interleaver 45 that shuffles the order of the QAM symbols in each successive FEC block. This shuffling implements cyclic delay diversity (CDD) that helps the FEC coding to overcome fading. The output port of the interleaver 44 connects to the write-input port of dual-port random-access memory 45. The dual-port RAM 45 is capable of temporarily storing each FEC block for a plurality of OFDM symbol intervals to implement the single-time retransmission of FEC blocks from the first physical layer pipe PLP1, as explained in more detail with reference to FIG. 5 further on in this specification. In practice the interleaver 44 (and possibly the bit interleaver 43 as well) may be subsumed into the dual-port RAM 45 by appropriately controlling the read addressing and write addressing thereof.

The two read-output ports of the dual-port RAM 45 connect separately to respective input ports of a pair 46 of mappers for mapping successive bits of the interleaved bit-wise FEC coding to successive QAM symbol constellations. Each of the pair 46 of mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLP1. A first of the pair 46 of mappers responds to the consecutive segments of the interleaved bit-wise FEC coding in initial transmissions thereof to generate the complex coordinates of successive QAM constellations. A second of the pair 46 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to third and fourth patterns, respectively. Bits that map to lattice points in the third mapping pattern more likely to experience error are mapped to lattice points in the fourth mapping pattern less likely to experience error. Bits that map to lattice points in the fourth mapping pattern more likely to experience error are mapped to lattice points in the third mapping pattern less likely to experience error. The complex coordinates of the QAM symbol constellations are supplied from the respective output ports of the pair of 46 of mappers to respective input ports of the assembler 30 for assembling a stream of OFDM symbols.

FIG. 2 depicts the (n)th physical layer pipe PLPn further comprising elements 51-56 in cascade connection after the PLPn BICM interface, but before a respective input port of the assembler 30 for assembling a serial stream of OFDM symbols. More specifically, FIG. 2 depicts an encoder 51 for BCH coding with its input port connected to receive the PLPn BICM interface signal from the output port of the BBFRAME scrambler 29 and with its output port connected the input port of an encoder 52 for LDPC coding. FIG. 2 depicts the output port of the encoder 52 for LDPC coding connected to the input port of a bit interleaver 53, the output port of which is connected for applying bit-interleaved bit-wise FEC coding to the input port of a further interleaver 54 that shuffles the order of the QAM symbols in each successive FEC block. This shuffling implements cyclic delay diversity (CDD) that helps the FEC coding to overcome fading. The output port of the interleaver 54 connects to the write-input port of dual-port random-access memory 55. The dual-port RAM 55 is capable of temporarily storing each FEC block for a plurality of OFDM symbol intervals to implement the single-time retransmission of FEC blocks from the first physical layer pipe PLP1, as explained in more detail with reference to FIG. 5 further on in this specification. In practice the interleaver 54 and possibly the bit interleaver 53 as well may be subsumed into the dual-port RAM 55 by appropriately controlling the read addressing and write addressing thereof.

The two read-output ports of the dual-port RAM 55 connect separately to respective input ports of a pair 56 of mappers for mapping successive bits of the interleaved bit-wise FEC coding to successive QAM symbol constellations. Each of the pair 56 of mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLPn. A first of the pair 56 of mappers responds to the consecutive segments of the interleaved bit-wise FEC coding in initial transmissions thereof to generate the complex coordinates of successive QAM constellations. A second of the pair 56 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to fifth and sixth patterns, respectively. Bits that map to lattice points in the fifth mapping pattern more likely to experience error are mapped to lattice points in the sixth mapping pattern less likely to experience error. Bits that map to lattice points in the sixth mapping pattern more likely to experience error are mapped to lattice points in the fifth mapping pattern less likely to experience error. The complex coordinates of the QAM symbol constellations are supplied from the respective output ports of the pair of 56 of mappers to respective input ports of the assembler 30 for assembling a stream of OFDM symbols.

There is usually a number of other physical layer pipes besides PLP0, PLP1 and PLPn, which other physical pipes are identified by the prefix PLP followed by respective ones of consecutive numbers two through (n−1). Each of the PLPs, n in number, may differ from the others in at least one aspect. One possible difference between these n PLPs concerns the natures of the concatenated BCH-LDPC coding these PLPs respectively employ. ETSI standard EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

Each of the interleavers 34, 44, 54 etc. in the data PLPs can by way of specific example, be composed of a cell interleaver (as specified in §§6.4 of ETSI standard EN 302 755 V1.3.1) followed in cascade connection by a time interleaver (as specified in §§6.5 of ETSI standard EN 302 755 V1.3.1). ETSI standard EN 302 755 V1.3.1 defines the OFDM cell as being the modulation value for one OFDM carrier during one OFDM symbol—i. e., a single modulation constellation symbol. The pseudo-random cell interleaving spreads the cells uniformly in each FEC codeword to ensure an uncorrelated distribution of channel distortions and interference along the FEC codewords in the receiver. Furthermore the cell interleaving "rotates" the interleaving sequence differently in each of the FEC blocks of one time interleaver (TI) block. If used, time interleaving operates at PLP level, and the parameters of the time interleaving may differ for different PLPs within the COFDM broadcasting system.

The function of the assembler 30 is to assemble the complex coordinates of QAM symbol constellations read from the pairs of mappers 36, 46, 56 etc. for each of the PLPs and the complex coordinates of QAM symbol constellations of the modulated L1 signaling data into arrays of OFDM symbols to be conveyed successively within respective ones of OFDM frames—e. g., T2-frames as prescribed for DVB-T2 in ETSI standard EN 302 755 V1.3.1. Successive ones of these T2-frames, possibly with Future Extension Frame (FEF) parts interspersed among them, make up super-frames in the overall frame structure. The assembler 30 comprises respective buffer memories for the n PLPs and means for time-division multiplexing OFDM frames from the various PLPs into an OFDM generation interface signal to be supplied to the FIG. 4 portion of the transmitter apparatus for broadcasting DTV signals. The buffer memories included in the assembler 30 are usually dual-ported random-access memories (RAMs). The time interleaving procedures described in §§6.5 of ETSI standard EN 302 755 V1.3.1 are subsumed into the addressing of these RAMs. Designs are possible in which the buffer memories for the assembler 30 are subsumed at least in part within the dual-port RAMs 35, 45, 55 etc. The operation of the assembler 30 for assembling a serial stream of OFDM symbols takes into account the conformation of the OFDM frame structure and is further controlled responsive to the dynamic scheduling information produced by the scheduler 10 depicted in FIG. 1. FIG. 2 does not explicitly show the connections for applying these control signals to the assembler 30. FIG. 2 shows the assembler 30 connected for receiving at an input port thereof coordinates of P2 modulation symbols supplied from apparatus depicted in FIG. 3.

The coordinates of P2 modulation symbol constellations supplied from the FIG. 3 apparatus convey the conformation of the OFDM frame structure and also convey the dynamic scheduling information (DSI) produced by the scheduler 10. FIG. 3 depicts a first-layer signal generator 20 with two input ports and two output ports. The first of the two input ports is connected for receiving DSI from the scheduler 10, and the second of the two input ports is connected for receiving digital indications specifying the conformation of the OFDM frame structure. Responsive to these control signals received at its first and second input ports, the first-layer (L1) signal generator 20 generates L1-pre signaling at its first output port and L1-post signaling at its second output port.

FIG. 3 depicts an encoder 57 for BCH coding having its input port connected for receiving L1-pre signaling supplied from the first output port of the first-layer (L1) signal generator 20. The output port of the encoder 57 for BCH coding connects to the input port of an encoder 58 for LDPC coding. The output port of the encoder 58 connects to the input port of a puncturer 59, the output port of which connects to the input port of a mapper 60 for mapping the coded L1-pre signaling to BPSK symbol constellations. The output port of the mapper 60 connects to a first of two input ports of a time-division multiplexer 61. Details of the processing of L1-pre signaling are essentially as described in §§7.3.1.1 of ETSI standard EN 302 755 V1.3.1 for DVB-T2.

FIG. 3 depicts a bit scrambler 62 having its input port connected for receiving L1-post signaling supplied from the second output port of the first-layer (L1) signal generator 20. The bit scrambler 62 provides data bit randomization similar to that provided by the BBFRAME scramblers 9, 19 and 29. The output port of the bit scrambler 62 connects to the input port of an encoder 63 for CRC-8 coding, the output port of which connects to the input port of an encoder 64 for BCH coding. The output port of the encoder 64 for BCH coding connects to the input port of an encoder 65 for LDPC coding. FIG. 3 shows the output port of the encoder 65 connected to the input port of a puncturer 66, the output port of which connects to the input port of a bit interleaver 67 similar to the bit interleavers 33, 43 and 54. The output port of the bit interleaver 67 connects to the input port of a mapper 68 for mapping the coded L1-post signaling to BPSK, QPSK, 16QAM or 64QAM symbol constellations. The output port of the mapper 68 connects to the second input port of the time-division multiplexer 61. The puncturer 66 is optional and can be replaced by a direct connection from the output port of the encoder 65 for LDPC coding to the input port of the bit interleaver 67. Details of the processing of L1-post signaling are essentially as described in §§7.3.2 and §§7.3.3 of ETSI standard EN 302 755 V1.3.1 for DVB-T2.

The time-division multiplexer 61 is configured for generating a response therefrom that time-interleaves complex coordinates of the BPSK symbol constellations mapping respective segments of coded L1-pre signaling supplied to its first input port from the mapper 60 with the complex coordinates of the BPSK, QPSK or QAM symbol constellations mapping respective segments of coded L1-post signaling supplied to its second input port from the mapper 68. FIG. 3 indicates that the time-division multiplexer 61 supplies the complex coordinates of P2 symbols in its response to a respective input port of the assembler 30 of OFDM symbols depicted in FIG. 2.

A transmission signal in an OFDM broadcast system is transmitted in successive segments called OFDM symbol blocks. Each OFDM symbol block includes an interval during which an effective symbol is supplied for inverse discrete Fourier transformation (I-DFT), and further includes a guard interval into which the waveform of a concluding portion of the latter half of this effective symbol will be directly copied. This guard interval is provided at the beginning of the initial half of the OFDM symbol block. In an OFDM system, such a guard interval is provided to improve performance during multi-path reception. A plurality of OFDM symbol blocks are collected to form one OFDM transmission frame, which DVB-T2 denominates a T2 frame.

FIG. 4 depicts apparatus that generates and transmits radio-frequency COFDM signals responsive to the stream of OFDM symbols supplied via an OFDM generation interface from the output port of the assembler 30 for assembling a serial stream of OFDM symbols, which assembler 30 is depicted in FIG. 2. The output port of the assembler 30 connects to the input port of a parser 70 for parsing the stream of complex coordinates of BPSK, QPSK and QAM symbol constellations into the effective portions of COFDM symbols. The output port of the parser 70 connects to the input port of a pilot carriers insertion and dummy tones reservation unit 71, the output port of which unit 71 connects to the input port of an OFDM modulator 72. E. g., the unit 71 inserts pilot carriers as described in §9.2 of ETSI standard EN 302 755 V1.3.1 for DVB-T2. The unit 71 may also insert zero-valued carriers to reserve spectrum for the subsequent insertion of dummy tones by a peak-to-average-power-ratio (PAPR) reduction unit 73.

The OFDM modulator 72 includes a serial-to-parallel converter for converting the serially generated complex digital samples of the effective OFDM symbols to parallel complex digital samples for inverse discrete Fourier transformation (I-DFT). The OFDM modulator 72 further includes a parallel-to-serial converter for converting the parallel complex digital samples of the I-DFT results to serial complex digital samples of the I-DFT results. The OFDM modulator 72 has 1 K, 2K, 4K, 8K, 16K or 32K carriers capability. That is, DFT size can be 1 K, 2K, 4K, 8K, 16K or 32K. The 8K, 16K and 32K sizes of DFT are suitable for transmissions to stationary DTV receivers. Transmissions to mobile receivers are apt to employ smaller DFT size, 3K generally being preferred. The 1K DFT size is employed when sending indications of the beginnings of T2 frames. FIG. 4 shows a connection for applying digital samples supplied from the output port of the OFDM modulator 72 to the input port of a peak-to-average-power-ratio (PAPR) reduction unit 73.

ETSI standard EN 302 755 V1.3.1 includes two methods for reducing PAPR in DVB-T2 that allow about a 58% reduction in peak amplifier power rating, which can save electricity costs for a broadcasting station significantly. In the first method, called "tone reservation", 1% of the OFDM carriers are reserved and do not carry any data, but instead may be used for inserting values that will counteract the peaks in the signal. In the second method, called "active constellation extension", the values of certain of the edge constellation points are moved "outwards" in such way as to reduce the signal peaks. Since only edge constellation points are ever moved outwards, their movement has no significant impact on the ability of the DTV receiver to decode the data.

The output port of the PAPR reduction unit 73 is connected to the input port of a guard-interval-and-cyclic-prefix-insertion unit 74. The output port of the guard-interval-and-cyclic-prefix insertion unit 74 is connected to the input port of a unit 75 for inserting preamble-1 (P1) symbols into the digital data stream. The output port of the P1 symbols insertion unit 75 connects to the input port of a digital-to-analog converter 76, the output port of which is connected for supplying analog COFDM carriers to the input port of an up converter 77. The up converter 77 converts the analog COFDM carriers in the DAC 76 response to final radio frequencies and is connected for supplying them from its output port to the input port of a linear power amplifier 78. FIG. 4 shows the output port of the linear power amplifier 78 connected for driving RF analog COFDM signal power to a transmission antenna 79. FIG. 4 omits showing some details of the DTV transmitter, such as band-shaping filters for the RF signals.

Figure 5:
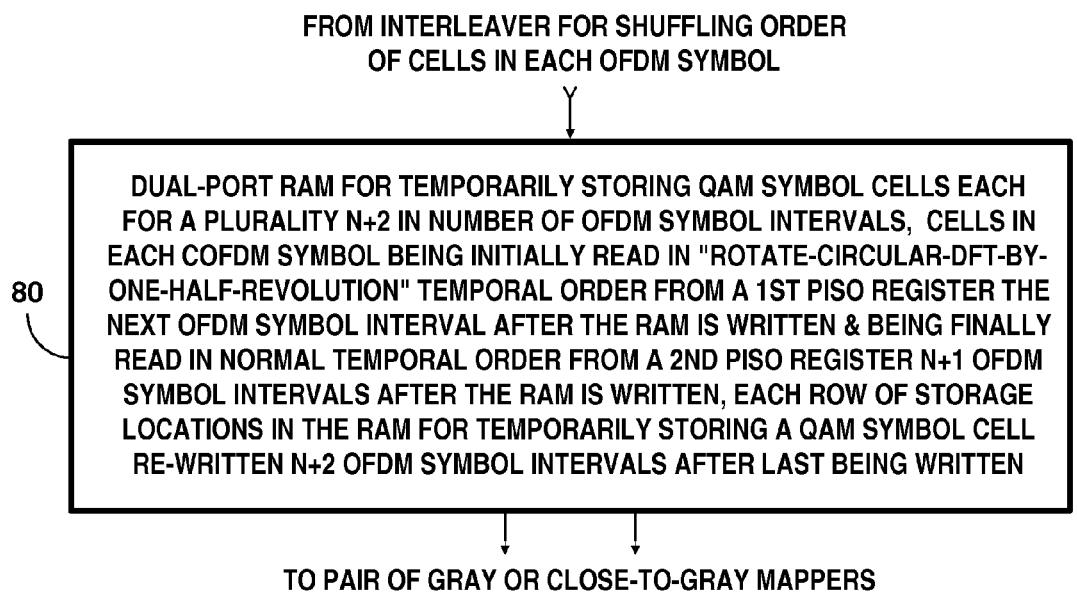
FIG. 5 provides greater detail as to the configuration of each of the dual-port random-access memories depicted in FIG. 2.

FIG. 5 provides greater detail as to possible structure and operation of each of the dual-port RAMs 35, 45, 55 etc. depicted in FIG. 2. FIG. 5 indicates any one of these RAMs to be capable of storing QAM symbol cells for plurality N+2 in number of COFDM symbol intervals and to be configured to be operable in the following way. The write addressing of the RAM 80 scrolls through N+2 rows of storage locations, each of which rows of storage locations provides temporary storage for a respective OFDM symbol. Each successive OFDM symbol in a PLP is written in normal temporal order from one of the interleavers 34, 44, 54 etc. into the FIG. 5 RAM 80 via its write-input port and thereafter is immediately loaded in parallel into a first parallel-in/serial-out (PISO) register from its row of storage locations in the random-access memory. That first PISO register is then read to supply a first mapper in one of the pairs 36, 46, 56 etc. of mappers, with the final halves of OFDM symbols as written into RAM 80 in normal temporal order being read from a first serial output port of the dual-port RAM 80 before their respective initial halves. That is, the QAM symbol cells in each OFDM symbol are initially read out from the first serial output port of the RAM 80 in "rotate-circular-DFT-by-one-half-revolution" temporal order. N+1 coded-OFDM symbol intervals after the QAM symbol cells in each of the OFDM symbols are written, these QAM symbol cells are loaded in parallel into a second PISO register from the row of storage locations in the random-access memory for temporarily storing that OFDM symbol, just before that row of storage locations is re-written by a new COFDM symbol. That second PISO register is then read to supply a second mapper in one of the pairs 36, 46, 56 etc. of mappers with QAM symbol cells as written into RAM 80 in normal temporal order being read from a second serial output port of the RAM 80. That is, the QAM symbol cells in each OFDM symbol are finally read out from the second serial output port of the RAM 80, and this final read-out is in the same normal temporal order as the QAM symbol cells supplied to the RAM 80 for being written into respective rows of storage locations therein.

In some COFDM transmitter apparatuses one or more of the PLPs provides only single-time transmission of data. If such a PLP includes a RAM for temporarily storing QAM symbol cells, it need not be dual-ported. The RAM simply provides temporary storage to assist time-division multiplexing of COFDM symbols carried out by the assembler 30 of a serial stream of COFDM symbols.

The plurality N of COFDM symbol intervals of delay between the initial transmission of a rotated COFDM symbol and the final transmission of a corresponding non-rotated COFDM symbol is a design consideration that has been addressed only incidentally thusfar in this specification. The number N need not be the same for each PLP.

As a first alternative, the plurality N can be large, a multiple of the number of COFDM symbols in a time slice of the PLP response, in order to accommodate the design of receivers able to overcome drop-outs in received signal strength that last up to a second or more. Receivers used in moving vehicles are apt to experience such protracted drop-outs in received signal strength. Each unit increase in the multiple of the number of COFDM symbols in a time slice of the PLP increases the delay between initial and final transmissions of related COFDM symbols by a T2 frame interval that can be up to 250 milliseconds in duration. This presumes that the PLP is a type 1 PLP. When final transmissions are delayed for a prescribed number of T2 frame intervals respective to initial transmission of the same data, the delay is subject to variation. This is because T2 frames can vary in size. Furthermore, future extension frames (FEFs) of indeterminate size may be interspersed among T2 frames. Also, if the PLP is a type 2 PLP, sub-slices of the PLP are apt to be unevenly spaced in time.

Arranging for a T2 frame of an initial transmission of data to be immediately followed by a T2 frame of a final transmission of corresponding data avoids having to signal the DTV receiver specifically as to the delay between the two transmissions. The preamble of each T2 frame can signal whether that T2 frame conveys an initial or a final transmission of data. This arrangement probably best accommodates receivers designed to receive only the final transmissions of data.

Also, when the delay between initial and final transmissions of related COFDM symbols is increased to a number of T2 frame intervals extending over a second or more, the receiver is apt to experience less correlation between deep frequency-selective fading of the COFDM symbols in the final transmissions and deep frequency-selective fading of the rotated COFDM symbols in the initial transmissions. So, code-combining final transmissions with initial transmissions delayed to concur with corresponding final transmissions, which code-combining is done either before or after de-mapping of QPSK or QAM symbols, will be less likely able to suppress the effects of frequency-selective fading. This is the reason that interleavers 35, 45, 55 etc. for shuffling the order of QPSK or QAM symbols within COFDM symbols are included in the FIG. 2 portions of DTV transmitters. De-shuffling the QPSK or QAM symbols within COFDM symbols received by a DTV receiver disperses the effects of the frequency-selective fading, so that decoding of the concatenated BCH coding and LDPC coding is more likely to succeed in faithfully reproducing data that was transmitted.

As a second alternative, the odd number N of COFDM symbol intervals between initial and final transmissions of related COFDM symbols can be very small—e.g., nine or less, even only a single COFDM interval. This makes it much more likely that the receiver will experience strong correlation between deep frequency-selective fading of the COFDM symbols in the final transmissions and deep frequency-selective fading of the rotated COFDM symbols in the initial transmissions. Accordingly, code-combining final transmissions with initial transmissions delayed to concur with corresponding final transmissions, which code-combining is done either before or after de-mapping of QAM symbols, will be quite likely able to suppress the effects of frequency-selective fading. This is of particular benefit to stationary DTV receivers receiving transmissions from two or more transmitters in a single-frequency network (SFN). De-shuffling QAM symbols within COFDM symbols received by a DTV receiver disperses the effects of the frequency-selective fading, so that decoding of the concatenated BCH coding and LDPC coding is more likely to succeed in faithfully reproducing data that were transmitted.

If DTV transmitters are permitted to make initial and final transmissions of the same data in more than one way, a DTV transmitter has to signal DTV receivers which way or ways it makes initial and final transmissions of the same data. This signaling can be done utilizing the L1-post signaling extension fields provided for in the DVB-T2 standard. However, signaling can also be done by modifying indications in the fields in L1-pre signaling or L1-post signaling, which fields are already specified in the DVB-T2 standard. Preferably, the modifications are such that initial and final transmissions of the same data can be made differently in individual PLPs with the same T2 frames. This affords a broadcaster flexibility in tailoring some PLPs for services designed particularly for reception by stationary DTV receivers and other PLPS for services designed particularly for reception by DTV receivers in moving vehicles. The beginning of each T2 frame begins with a P1 symbol applicable to the entire T2 slice. This P1 symbol is followed by a number of P2 symbols, one for each PLP in the T2 frame, facilitating specifying the delay between initial and final transmissions of the same data individually for each data PLP having a time slice in the T2 frame.

The single-bit PLP_ROTATION field in the respective configurable L1-post signaling portion of each P2 symbol can be modified to indicate by ZERO that a PLP does not convey both initial and final transmissions of the same data and to indicate by ONE that the PLP does convey both those initial and final transmissions. If the modified single-bit PLP_ROTATION field is ZERO, this signals receivers that a single-time transmission is being made of data that will not be repeated. If the modified single-bit PLP_ROTATION field is ONE to signal that the PLP conveys both those initial and final transmissions of the same data, the receiver then needs to know how many COFDM symbol intervals are in the delay between initial and final transmissions of the same data.

The 3-bit PLP_TYPE field in L1-post signaling per DVB-T2 can be modified to allow any one of four additional indications. A first of the four additional indications, such as 110, identifies a type 1 data PLP that conveys both initial transmissions of data in rotated temporal order and final transmissions of the same data in normal temporal order after a delay of fewer COFDM symbol intervals than in a slice of the PLP response within a T2 frame. A second of the four additional indications in the PLP_TYPE field, such as 100, identifies a type 1 data PLP that conveys both initial transmissions of data in rotated temporal order and final transmissions of the same data in normal temporal order after a delay of more COFDM symbol intervals than in a slice of the PLP response within a T2 frame. These first and second additional indications both contrast with the 001 indication of a type 1 data PLP, which 001 indication is thenceforth interpreted as a confirmation that the type 1 data PLP conveys single-time transmission of data that is not repeated.

A third of the four additional indications in the PLP_TYPE field, such as 101, identifies a type 2 data PLP that conveys both initial transmissions of data in rotated temporal order and final transmissions of the same data in normal temporal order after a delay of fewer COFDM symbol intervals than in a sub-slice of the PLP response within a T2 frame. A fourth of the four additional indications, such as 111, identifies a type 2 data PLP that conveys both initial transmissions of data in rotated temporal order and final transmissions of the same data in normal temporal order after a delay of more COFDM symbol intervals than in a sub-slice of the PLP response within a T2 frame. These first and second additional indications both contrast with the 010 indication of a type 2 data PLP, which 010 indication is thenceforth interpreted as a confirmation that the type 2 data PLP conveys single-time transmission of data that is not repeated.

If either of the first and third additional indications is transmitted in the PLP_TYPE field, the number of full COFDM symbol intervals delay between the initial and final transmissions of the same data is specified in the 11-bit RESERVED_1 field in configurable L1-post signaling. DTV receivers are designed to respond to either of the first and third additional indications being received in the PLP_TYPE field as a key for interpreting the indications received specified in that RESERVED_1 field as specifying the number of full COFDM symbol intervals delay between the initial and final transmissions of the same data.

If the second additional indication is transmitted in the PLP_TYPE field, the number of full T2 slices delay between the initial and final transmissions of the same data is specified in the 11-bit RESERVED_1 field in configurable L1-post signaling. DTV receivers are designed to respond to the second additional indication being received in the PLP_TYPE field as a key for interpreting the indications received specified in that RESERVED_1 field as specifying the number of full T2 slice intervals delay between the initial and final transmissions of the same data.

If the fourth additional indication is transmitted in the PLP_TYPE field, the number of full T2 slices delay between the initial and final transmissions of the same data is specified in the 11-bit RESERVED_1 field in configurable L1-post signaling. DTV receivers are designed to respond to the fourth additional indication being received in the PLP_TYPE field as a key for interpreting the indications received specified in that RESERVED_1 field as specifying the number of partial T2 slice intervals delay between the initial and final transmissions of the same data.

DTV receivers must further decide what the proper phasing is of final transmissions of data respective to initial transmissions conveying the same data. A DTV receiver can assign alternate COFDM symbols as belonging to respective ones of initial and final transmissions of the same data by counting COFDM symbols from the start of a PLP slice or sub-slice, signaling of such starts being included in the L1-post signaling specified in the DVB-T2 standard. A DTV receiver can further include apparatus to detect substantial correlation between initial and final transmissions of the same data within a PLP, thereby to confirm correctness of an assignment of alternate COFDM symbols to respective ones of those initial and final transmissions of the same data.

Figure 6:
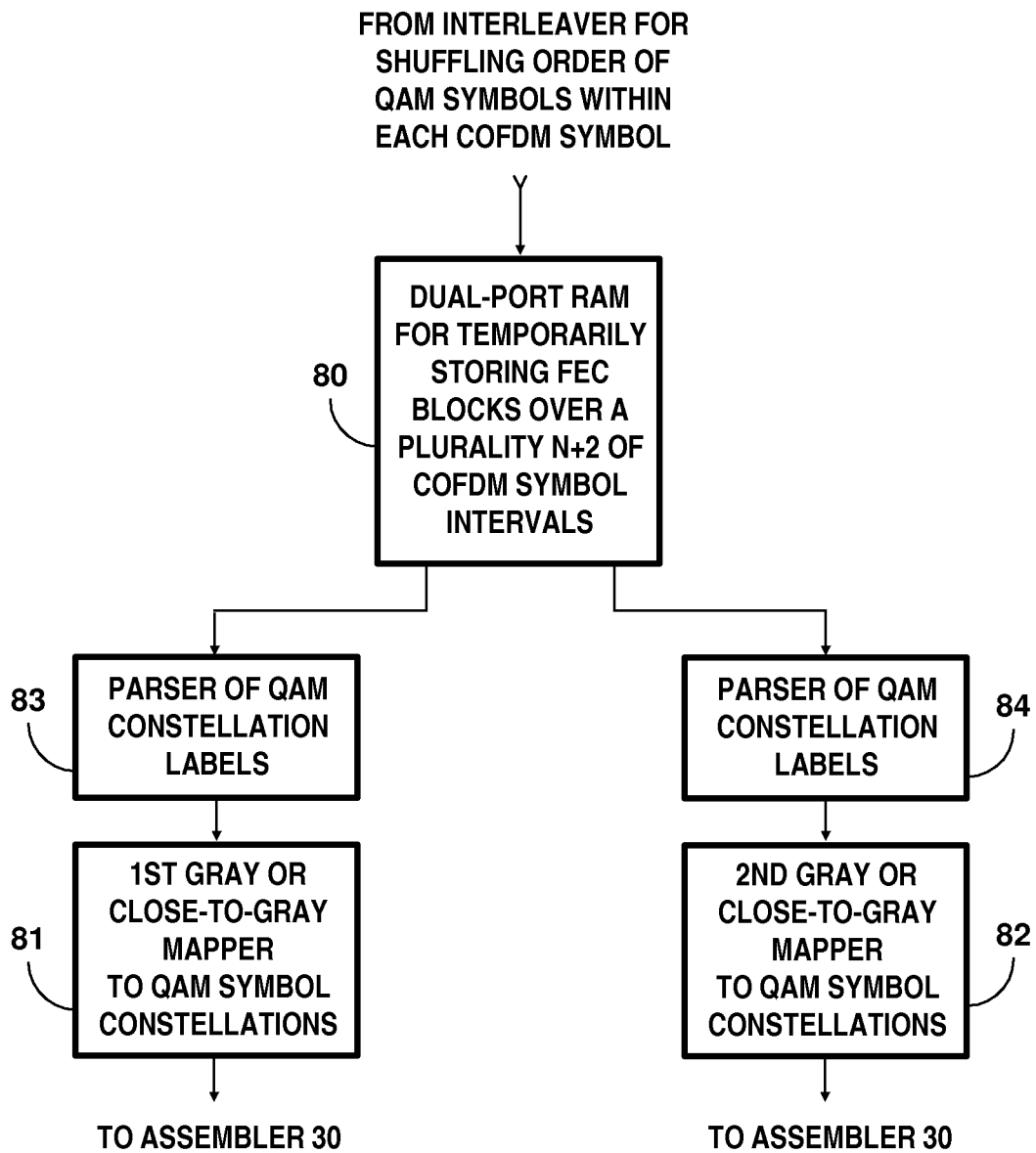
FIG. 6 is a detailed schematic diagram of connections of the two read-output ports of the dual-port random-access memory depicted in FIG. 5 to a pair of mappers to QAM symbols.

FIG. 6 illustrates how the two read-output ports of the dual-port random-access memory 80 depicted in FIG. 5 are connected respectively to a first Gray or close-to-Gray QAM symbol mapper 81 and to a second Gray or close-to-Gray QAM symbol mapper 82. The QAM symbol cells of each successive COFDM symbol initially read from the first serial output port of the RAM 80 in "rotate-circular-DFT-by-one-half-revolution" temporal order are supplied to the input port of a parser 83 of QAM constellation labels. The output port of the parser 83 is connected for supplying QAM constellation labels as input signal to the input port of the first Gray or close-to-Gray QAM symbol mapper 81. The QAM symbol cells of each successive COFDM symbol finally read from the second serial output port of the RAM 80 in the same temporal order as written are supplied to the input port of a parser 84 of QAM constellation labels. The output port of the parser 84 is connected for supplying QAM constellation labels as input signal to the input port of the second Gray or close-to-Gray QAM symbol mapper 82. The parsers 83 and 84 supply 4-bit QAM constellation labels as input signals to the mappers 81 and 82 if those mappers map to 16QAM symbol constellations. The parsers 83 and 84 supply 6-bit QAM constellation labels as input signals to the mappers 81 and 82 if those mappers map to 64QAM symbol constellations, and so forth.

Figure 7:
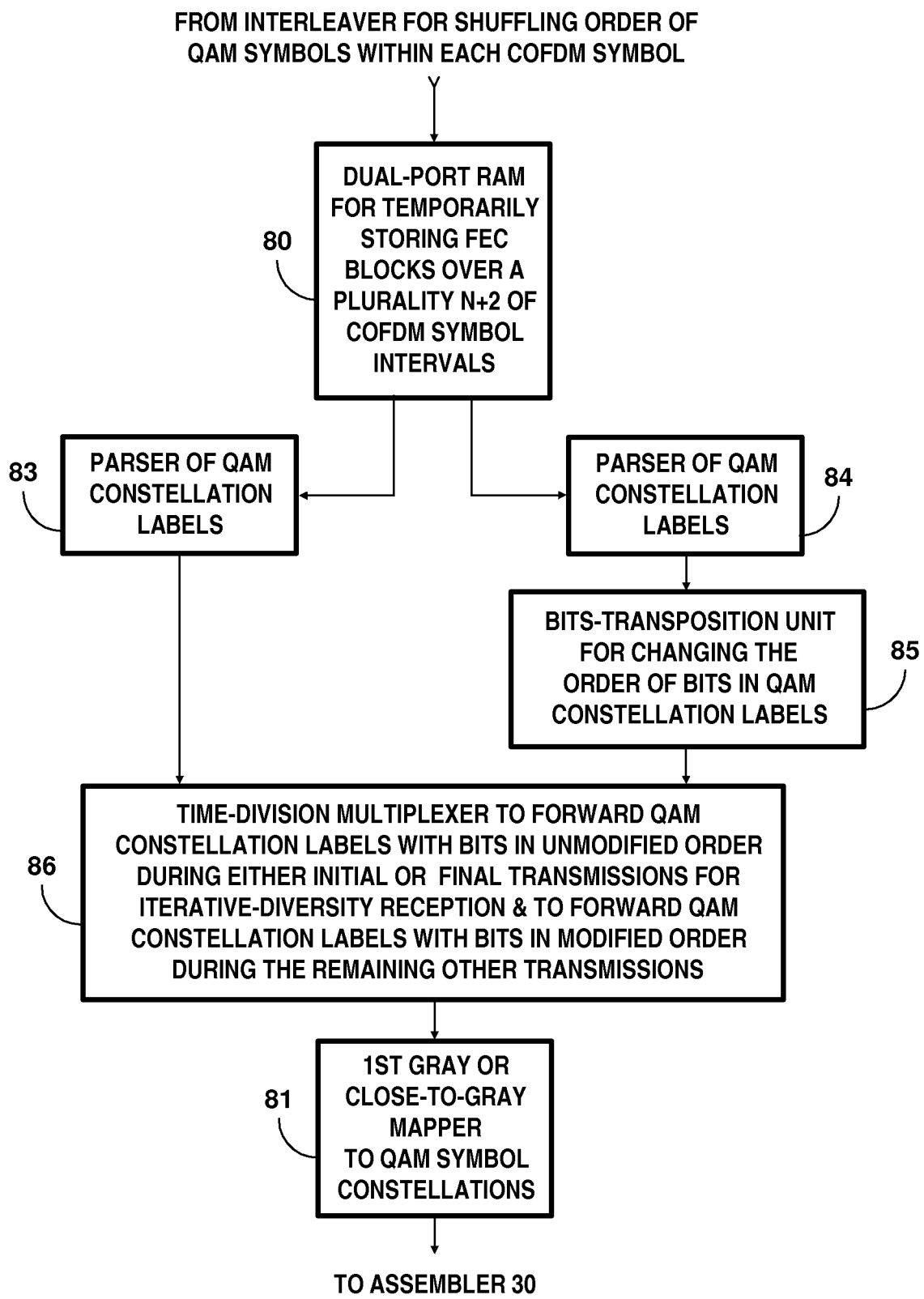
FIG. 7 is a detailed schematic diagram of connections of the two read-output ports of the dual-port random-access memory depicted in FIG. 5 to a single mapper to QAM symbols, which connections allow different mapping patterns at staggered times.
Figure 8:
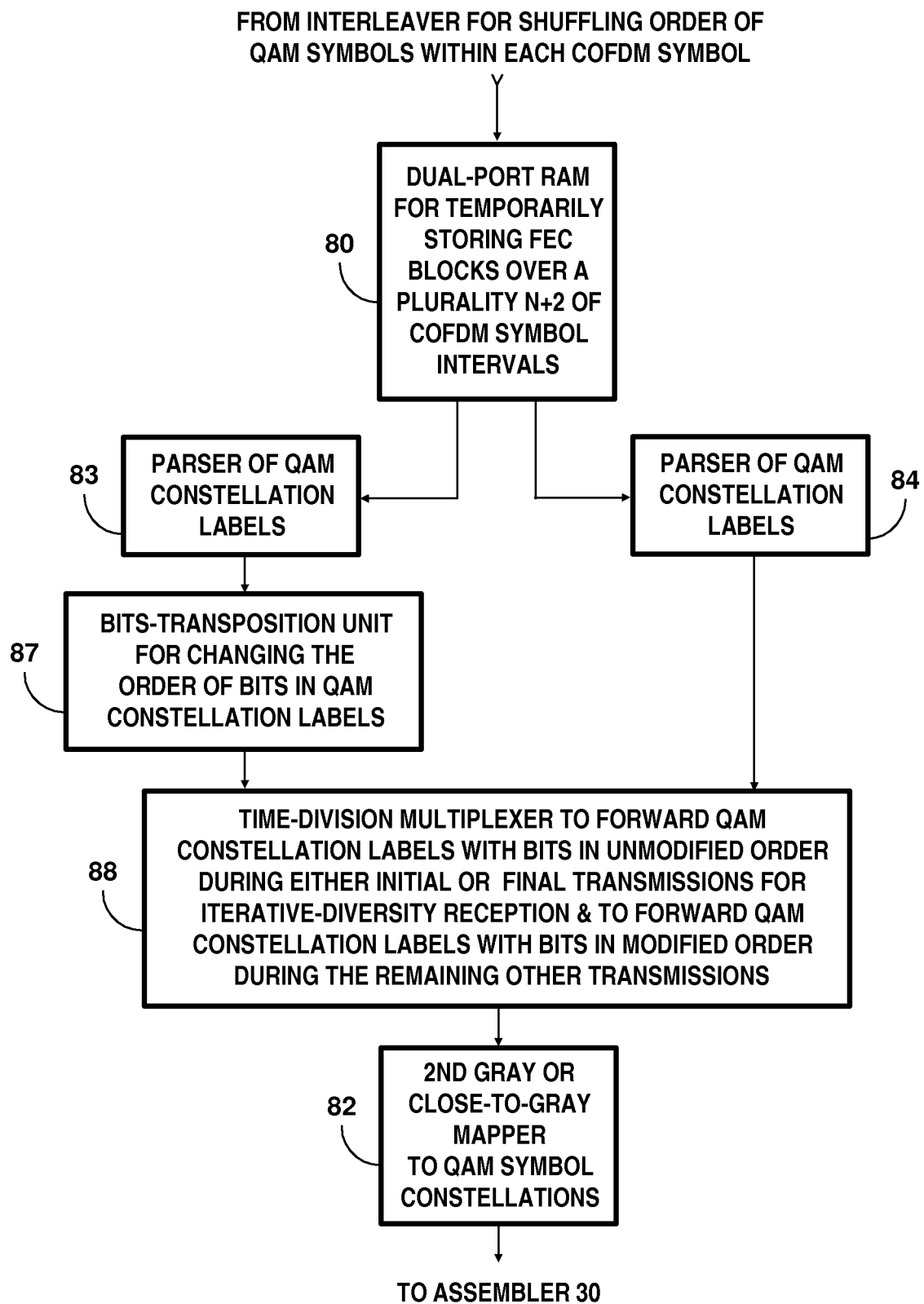
FIG. 8 is a detailed schematic diagram of connections of the two read-output ports of the dual-port random-access memory depicted in FIG. 5 to a single mapper to QAM symbols, which connections are alternative to those depicted in FIG. 7 but also allow different mapping patterns at staggered times.

FIG. 7 illustrates how the two read-output ports of the dual-port random-access memory 80 depicted in FIG. 5 are connected just to the single mapper 82 to QAM symbols, which connections allow the single mapper 82 to operate with two different mapping patterns at staggered times. The QAM symbol cells of each successive COFDM symbol initially read from the first serial output port of the RAM 80 in "rotate-circular-DFT-by-one-half-revolution" temporal order are supplied to the input port of the parser 83 of QAM constellation labels. The QAM symbol cells of each successive COFDM symbol finally read from the second serial output port of the RAM 80 in the same temporal order as written are supplied to the input port of the parser 84 of QAM constellation labels. The output port of the parser 83 is connected for supplying QAM constellation labels as input signal to the input port of a bits-transposition unit 87 for changing the order of the bits in each of those QAM constellation labels to generate modified QAM constellation labels supplied from its output port as input signal to the first of two input ports of a time-division multiplexer 88. The output port of the parser 84 is connected for supplying QAM constellation labels as input signal to the second input port of the time-division multiplexer 88. The output port of the time-division multiplexer 88 is connected for supplying QAM constellation labels to the input port of the single mapper 81 to QAM symbols.

When QAM symbol cells of each successive COFDM symbol are initially read from the first serial output port of the RAM 80 in "rotate-circular-DFT-by-one-half-revolution" temporal order, the time-division multiplexer 88 is conditioned to reproduce at its output port the modified QAM constellation labels supplied to its second input port from the bits-transposition unit 87. Presuming that the bits-transposition unit 85 has changed the order of the bits in each of those modified QAM constellation labels suitably, the response the single mapper 82 to QAM symbols supplies to an input port of the assembler 30 simulates the response that the mapper 81 to QAM symbols supplies to an input port of the assembler 30 in FIG. 6.

When QAM symbol cells of each successive COFDM symbol are finally read from the second serial output port of the RAM 80 in the same temporal order as written to the RAM 80, the time-division multiplexer 88 is conditioned to reproduce at its output port the QAM constellation labels supplied to its second input port from the parser 84. The response the single mapper 82 to QAM symbols supplies to an input port of the assembler 30 is the same as the response that the mapper 82 to QAM symbols supplies to an input port of the assembler 30 in FIG. 6.

Figure 9:
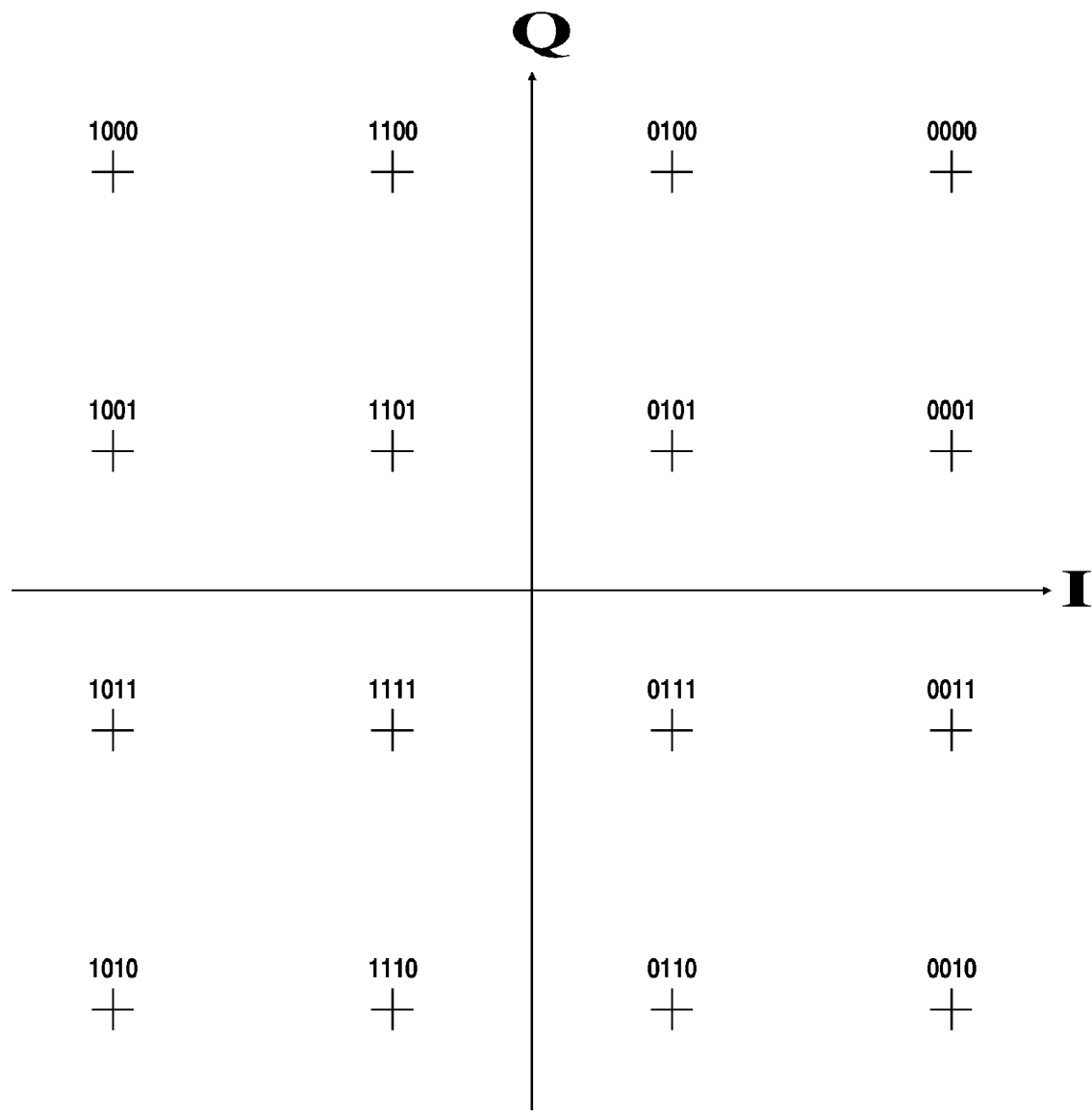
FIG. 9 is a diagram depicting a 16QAM symbol constellation with labeling as can be used by a first one of a pair of mappers to QAM symbol constellations in the FIG. 2 portion of the COFDM transmitter apparatus depicted in FIGS. 1, 2, 3 and 4.
Figure 10:
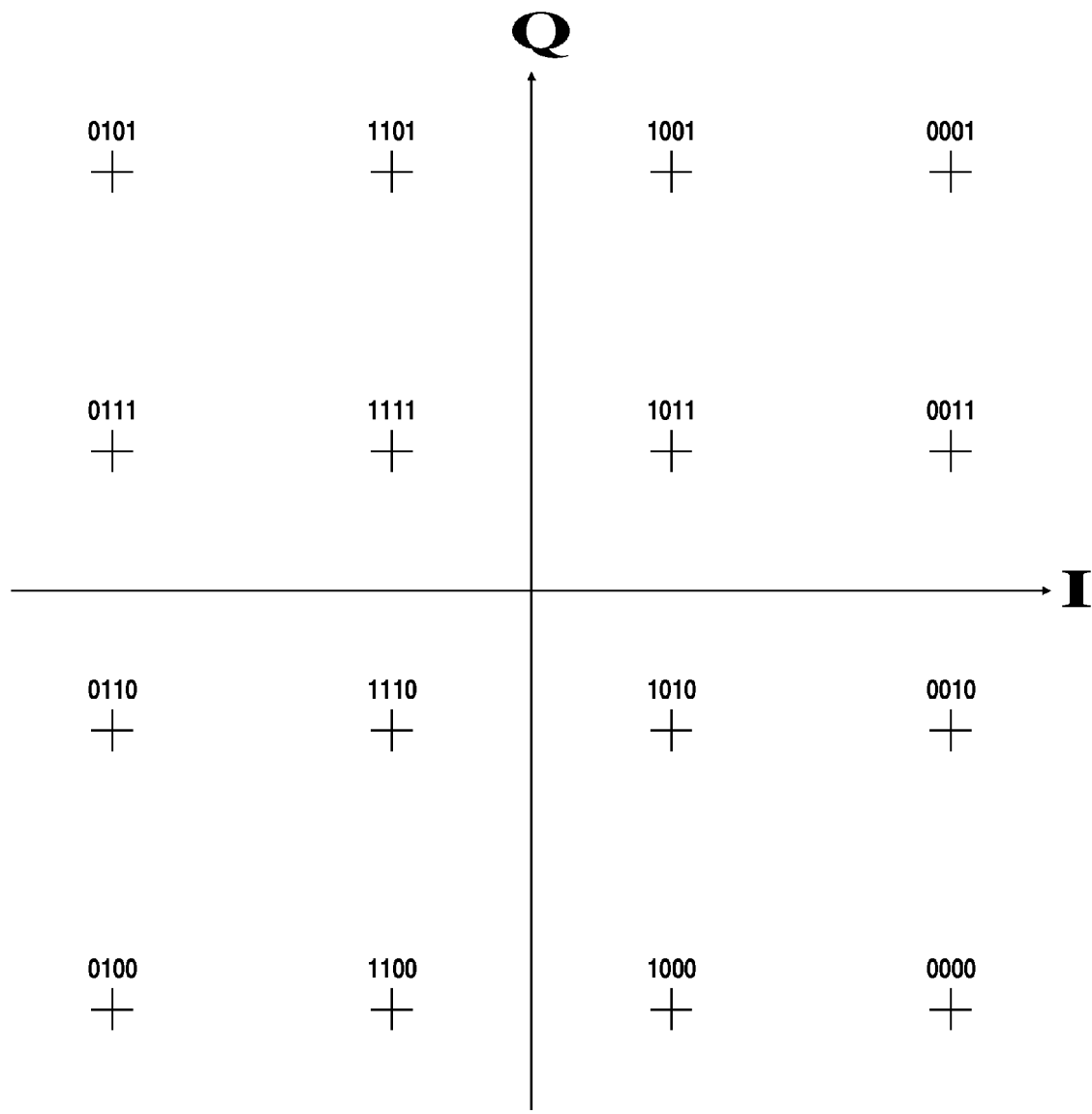
FIG. 10 is a diagram depicting a 16QAM symbol constellation with labeling as can be used by a second one of a pair of mappers to QAM symbol constellations in the FIG. 2 portion of the COFDM transmitter apparatus depicted in FIGS. 1, 2, 3 and 4.

Mathematicians consider QAM symbol constellations to be "point lattices" in two-dimensional space, with the various points in each lattice being identified by a respective plural-bit label. FIG. 9 illustrates a specific first way in which the FIG. 2 portion of the COFDM transmitter apparatus Gray maps 4-bit segments of interleaved FEC coding to the lattice points of 16QAM symbol constellations during initial transmissions for iterative-diversity reception. FIG. 10 illustrates a specific second way in which the FIG. 2 portion of the COFDM transmitter apparatus Gray maps 4-bit segments of interleaved FEC coding to the lattice points of 16QAM symbol constellations during final transmissions for iterative-diversity reception. More specifically, during initial transmissions for iterative-diversity reception the first Gray or close-to-Gray mapper 83 depicted in FIG. 6 can map 4-bit segments of interleaved FEC coding to the lattice points of 16QAM symbol constellations as shown in FIG. 9. During final transmissions for iterative-diversity reception the second Gray or close-to-Gray mapper 85 depicted in FIG. 6 can map 4-bit segments of interleaved FEC coding to the lattice points of 16QAM symbol constellations as shown in FIG. 10.

FIGS. 11A, 11B, 11C and 11D depict how the first, second, third and fourth bits of labels map to lattice points in the square 16QAM symbol constellation of FIG. 9. The greatest likelihood of error during de-mapping of the square 16QAM symbol constellations because of corruption by AWGN is adjacent-bin error; errors over greater distance are substantially less likely to occur. During initial transmissions for iterative-diversity reception, the first and third bits of the labels are less prone to error owing to corruption by AWGN than the second and fourth bits are. This is because only eight of the sixteen lattice points in each of the first and third bits are exposed to adjacent-bin error, while all sixteen lattice points in each of the second and fourth bits are exposed to adjacent-bin error.

FIGS. 12A, 12B, 12C and 12D depict how the first, second, third and fourth bits of labels map to lattice points in the square 16QAM symbol constellation map of FIG. 10. During final transmissions for iterative-diversity reception, the second and fourth of the labels are less prone to error owing to corruption by AWGN than the first and third bits are. This is because only eight bits of the sixteen lattice points in each of the second and fourth bits are exposed to adjacent-bin error, while all sixteen lattice points in each of the first and third bits are exposed to adjacent-bin error.

The first, second, third and fourth bits of labels are equally prone to AWGN-caused error when corresponding initial and final transmissions of coded data are combined. Single-level LDPC coding is best suited for situations in which there is equal likelihood of error in all received bits of coding. Plural-level LDPC coding is better suited than single-level LDPC coding for situations in which there is more likelihood of error in some received bits of coding then in other received bits of coding.

Figure 13:
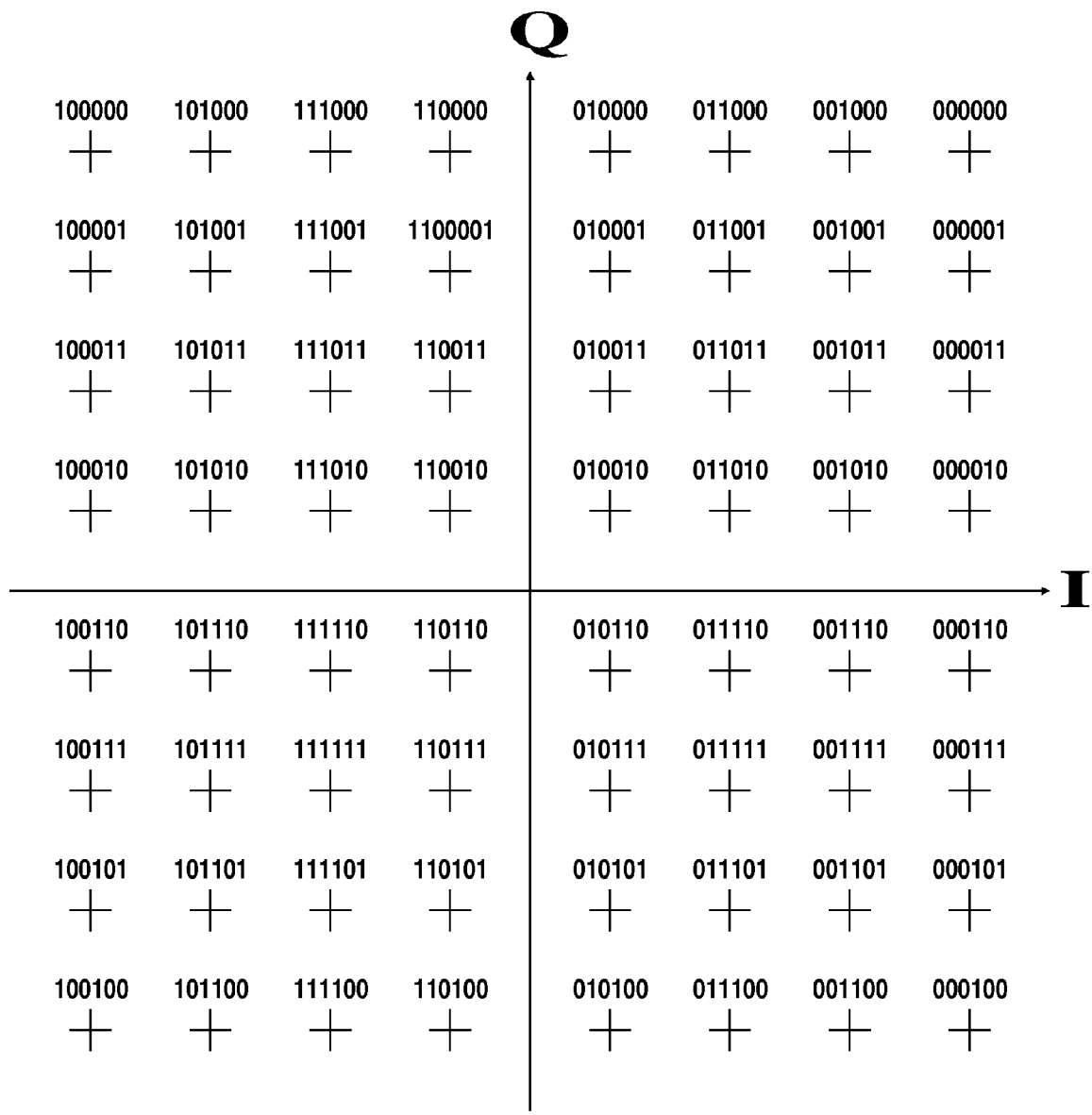
FIG. 13 is a diagram depicting a 64QAM symbol constellation with labeling as can be used by a first one of a pair of mappers to QAM symbol constellations in the FIG. 2 portion of the COFDM transmitter apparatus depicted in FIGS. 1, 2, 3 and 4.
Figure 14:
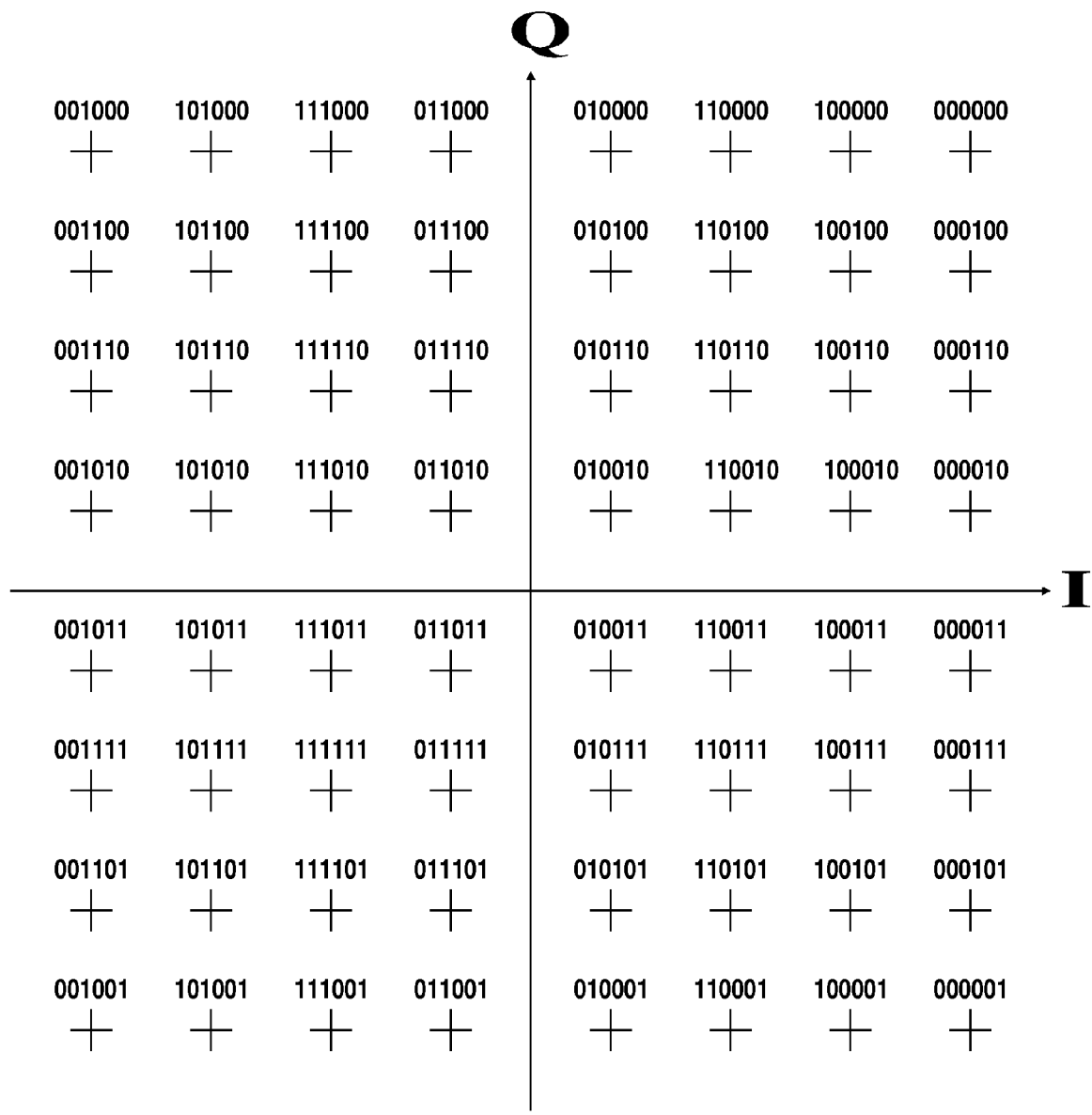
FIG. 14 is a diagram depicting a 64QAM symbol constellation with labeling as can be used by a second one of a pair of mappers to QAM symbol constellations in the FIG. 2 portion of the COFDM transmitter apparatus depicted in FIGS. 1, 2, 3 and 4.

FIG. 13 illustrates a specific first way in which the FIG. 2 portion of the COFDM transmitter apparatus Gray maps 6-bit segments of interleaved FEC coding to the lattice points of 64QAM symbol constellations during initial transmissions for iterative-diversity reception. FIG. 14 illustrates a specific second way in which the FIG. 2 portion of the COFDM transmitter apparatus Gray maps 6-bit segments of interleaved FEC coding to the lattice points of 64QAM symbol constellations during final transmissions for iterative-diversity reception. More specifically, during initial transmissions for iterative-diversity reception the first Gray or close-to-Gray mapper 83 depicted in FIG. 6 can map 6-bit segments of interleaved FEC coding to the lattice points of 64QAM symbol constellations as shown in FIG. 13. During final transmissions for iterative-diversity reception the second Gray or close-to-Gray mapper 85 depicted in FIG. 6 can map 6-bit segments of interleaved FEC coding to the lattice points of 64QAM symbol constellations as shown in FIG. 14.

FIGS. 15A, 15B, 15C, 15D, 15E and 15F depict how the first, second, third, fourth, fifth and sixth bits of labels map to lattice points in the square 64QAM symbol constellation map of FIG. 13. During initial transmissions for iterative-diversity reception, the first and fourth bits of the labels are less prone to error owing to corruption by AWGN than the third and sixth bits are. This is because only sixteen bits of the sixty-four lattice points in each of the first and fourth bits are exposed to adjacent-bin error, while all sixty-four lattice points in each of the third and sixth bits are exposed to adjacent-bin error. The second and fifth bits have an intermediate likelihood of error with thirty-two of the sixty-four lattice points being exposed to adjacent-bin error.

FIGS. 16A, 16B, 16C, 16D, 16E and 16F depict how the first, second, third, fourth, fifth and sixth bits of labels map to lattice points in the square 64QAM symbol constellation map of FIG. 14. During final transmissions for iterative-diversity reception, the third and sixth of the labels are less prone to error owing to corruption by AWGN than the first and fourth bits are. This is because only sixteen bits of the sixty-four lattice points in each of the third and sixth bits are exposed to adjacent-bin error, while all sixty-four lattice points in each of the first and fourth bits are exposed to adjacent-bin error. The second and fifth bits have an intermediate likelihood of error with thirty-two of the sixty-four lattice points being exposed to adjacent-bin error.

The first, third, fourth and sixth bits of labels are equally prone to AWGN-caused error when corresponding initial and final transmissions of coded data are combined. While the likelihood of AWGN-caused error in the first, third, fourth and sixth bits of this combined coded data may differ from the likelihood of AWGN-caused error in the second and fifth bits of the combined coded data, it will not be smaller. The likelihood of AWGN-caused error in bits of the combined coded data will be substantially reduced from the likelihood of AWGN-caused error in the bits of the individual initial and final corresponding transmissions which bits are most prone to error.

Figure 17:
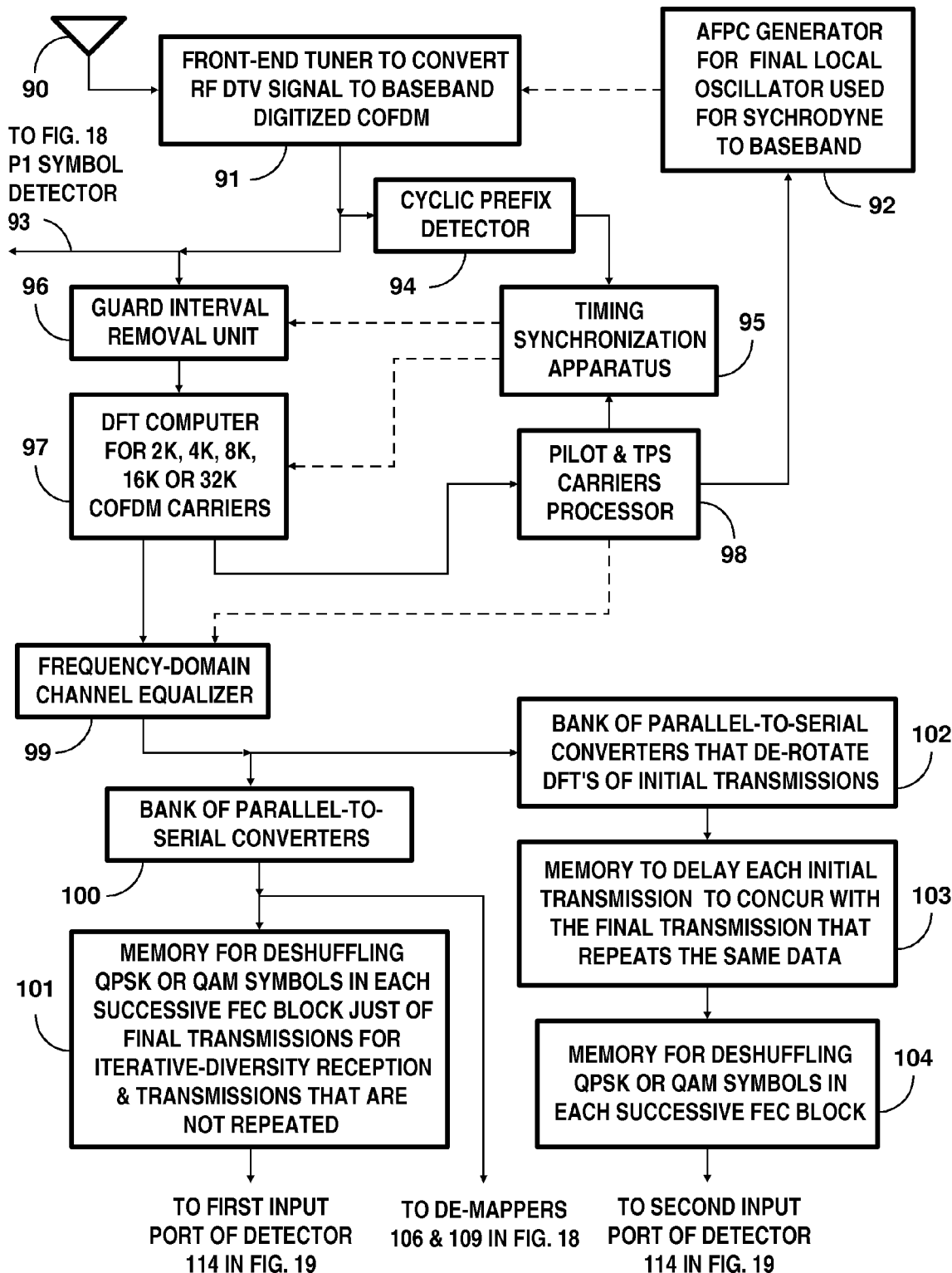
FIGS. 17, 18 and 19 together form a schematic diagram of COFDM receiver apparatus configured for iterative-diversity reception of COFDM signals, which COFDM receiver apparatus embodies aspects of the invention and employs a plural-input/single-output detector to decode LDPC coding that is transmitted twofold.

FIG. 17 shows the initial portion of a DTV receiver designed for iterative-diversity reception of COFDM signals as transmitted at VHF or UHF by a DTV transmitter, such as the one depicted in FIGS. 1, 2, 3 and 4. A reception antenna 90 captures the radio-frequency COFDM signal for application as input signal to a front-end tuner 91 of the receiver. The front-end tuner 91 can be of a double-conversion type composed of initial single-conversion super-heterodyne receiver circuitry for converting radio-frequency (RF) COFDM signal to intermediate-frequency (IF) COFDM signal followed by circuitry for performing a final conversion of the IF COFDM signal to baseband COFDM signal. The initial single-conversion receiver circuitry typically comprises a tunable RF amplifier for RF COFDM signal incoming from the reception antenna, a tunable first local oscillator, a first mixer for heterodyning amplified RF COFDM signal with local oscillations from the first local oscillator to obtain the IF COFDM signal, and an intermediate-frequency (IF) amplifier for the IF COFDM signal. Typically, the front-end tuner 91 further includes a synchronous demodulator for performing the final conversion from IF COFDM signal to baseband COFDM signal and an analog-to-digital converter for digitizing the baseband COFDM signal. Synchronous demodulation circuitry typically comprises a final local oscillator with automatic frequency and phase control (AFPC) of its oscillations, a second mixer for synchrodyning amplified IF COFDM signal with local oscillations from the final local oscillator to obtain the baseband COFDM signal, and a low-pass filter for suppressing image signal accompanying the baseband COFDM signal. In some designs of the front-end tuner 91, synchronous demodulation is performed in the analog regime before subsequent analog-to-digital conversion of the resulting complex baseband COFDM signal. In other designs of the front-end tuner 91, analog-to-digital conversion is performed before synchronous demodulation is performed in the digital regime.

Simply stated, the front-end tuner 91 converts radio-frequency COFDM signal received at its input port to digitized samples of baseband COFDM signal supplied from its output port. Typically, the digitized samples of the real component of the baseband COFDM signal are alternated with digitized samples of the imaginary component of the baseband COFDM signal for arranging the complex baseband COFDM signal in a single stream of digital samples. FIG. 17 shows an AFPC generator 92 for generating the automatic frequency and phase control (AFPC) signal for controlling the final local oscillator within the front-end tuner 91.

Figure 18:
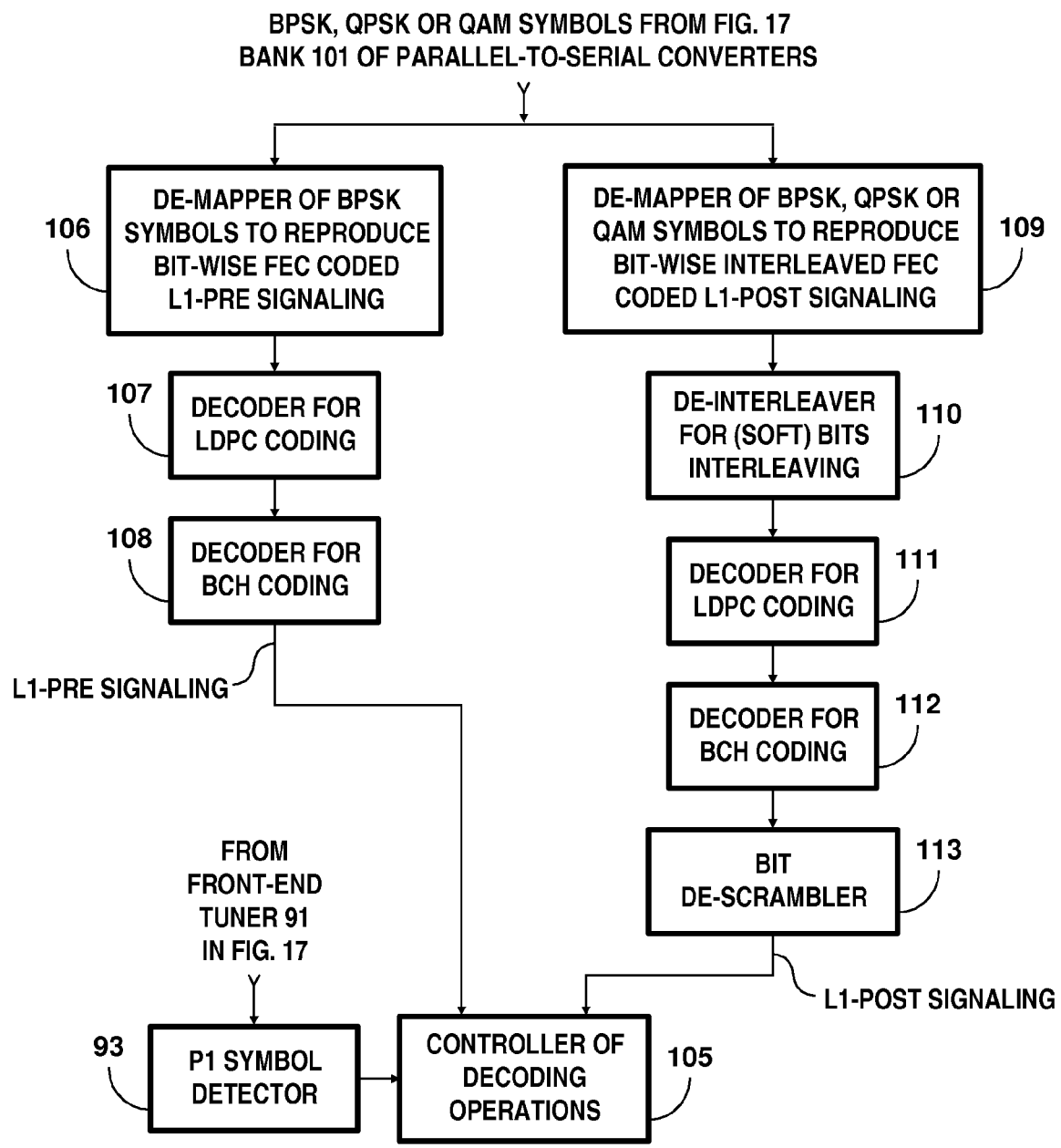

The output port of the front-end tuner 91 is connected for supplying digitized samples of baseband COFDM signal to the respective input ports of a P1 symbol detector 93 depicted in FIG. 18 and a cyclic prefix detector 94 depicted in FIG. 17. The cyclic prefix detector 94 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 94 is connected to supply these indications to a first of two input ports of timing synchronization apparatus 95.

A first of two output ports of the timing synchronization apparatus 95 is connected for supplying gating control signal to the control input port of a guard-interval-removal unit 96, the signal input port of which is connected for receiving digitized samples of baseband COFDM signal from the output port of the front-end tuner 91. The output port of the guard-interval-removal unit 96 is connected for supplying the input port of discrete-Fourier-transform computer 97 with windowed portions of the baseband COFDM signal that contain effective COFDM samples. A second of the output ports of the timing synchronization apparatus 95 is connected for supplying the DFT computer 97 with synchronizing information concerning the effective COFDM samples.

The indications concerning the phasing of COFDM symbols that the cyclic prefix detector 94 supplies to the timing synchronization apparatus 95 is sufficiently accurate for initial windowing of a baseband COFDM signal that the guard-interval-removal unit 96 supplies to the DFT computer 97. A first output port of the DFT computer 97 is connected for supplying demodulation results for at least all of the pilot carriers in parallel to the input port of a pilot carriers processor 98, and a second output port of the DFT computer 97 is connected for supplying demodulation results for each of the COFDM carriers to the input port of a frequency-domain channel equalizer 99. The processor 98 selects the demodulation results concerning pilot carriers for processing, part of which processing generates weighting coefficients for channel equalization filtering in the frequency domain. A first of three output ports of the processor 98 that are explicitly shown in FIG. 17 is connected for supplying these weighting coefficients (via wiring depicted as a dashed-line connection) to the frequency-domain channel equalizer 99, which uses those weighting coefficients for adjusting its responses to the demodulation results for each of the COFDM carriers.

A second of the output ports of the pilot carriers processor 98 that are explicitly shown in FIG. 17 is connected for supplying more accurate window-positioning information to the second input port of the timing synchronization apparatus 95. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 98 explicitly shown in FIG. 17 is connected for forwarding unmodulated pilot carriers to the input port of the AFPC generator 92. The real components of the unmodulated pilot carriers are multiplied by their respective imaginary components in the AFPC generator 92. The resulting products are summed and low-pass filtered to develop the AFPC signal that the AFPC generator 92 supplies to the front-end tuner 91 for controlling the final local oscillator therein. Other methods to develop AFPC signals for the final local oscillator in the front-end tuner 91 are also known, which can replace or supplement the method described above. One such other method is described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997. In that method complex digital samples from the tail of each OFDM symbol are multiplied by the conjugates of corresponding digital samples from the cyclic prefix of the OFDM symbol. The resulting products are summed and low-pass filtered to develop the AFPC signal that the AFPC generator 92 supplies to the front-end tuner 91 for controlling the final local oscillator therein.

The DFT computer 97 is customarily constructed so it can demodulate any one of the 2K, 4k, 8K, 16K and 32K options as to the number of OFDM carriers. If this be the case, the correct option is chosen responsive to information from the P1 symbol detector 93 depicted in FIG. 18. As noted supra, the second output port of the DFT computer 97 is connected to supply demodulated complex digital samples of the complex coordinates of QPSK or QAM symbol constellations in parallel to the input port of the frequency-domain channel equalizer 99. To implement a simple form of frequency-domain channel equalization, the pilot carriers processor 98 measures the amplitudes of the demodulated pilot carriers to determine basic weighting coefficients for various portions of the frequency spectrum. The pilot carriers processor 98 then interpolates among the basic weighting coefficients to generate respective weighting coefficients supplied to the frequency-domain channel equalizer 99 with which to multiply the complex coordinates of QPSK or QAM symbol constellations supplied from the DFT computer 97. Various alternative types of frequency-domain channel equalizer are also known.

The output port of the DFT computer 97 involves a plurality of connections for supplying respective sets of complex coordinates for QPSK or QAM symbol constellations of respective OFDM carriers. The frequency-domain channel equalizer 99 weights each of these respective sets of complex coordinates for QPSK or QAM symbol constellations of respective OFDM carriers received in parallel at its input port and supplies the weighted responses in parallel from its output port to the respective input ports of a bank 100 of parallel-to-series converters. The response of the one of the parallel-to-series converters in this bank 100 of them that is appropriate for the number of OFDM carriers in the DFT and the sort of modulation symbol constellations for those carriers is selected as the response supplied from the bank 100 of parallel-to-series converters for de-mapping of the modulation symbol constellations in that response. FIGS. 17 and 18 indicate that the response of the bank 100 of parallel-to-series converters is supplied directly to a de-mapper 106 of FEC-coded L1-pre signaling and to a de-mapper 109 of FEC-coded L1-post signaling, which de-mappers are depicted in FIG. 18.

The output port of the bank 100 of parallel-to-series converters is connected for supplying for serially supplying complex QPSK or QAM symbol map coordinates to the write input port of a memory 101 for temporarily storing those of such coordinates conveyed by single-time transmissions that are not repeated or by the final transmissions for iterative-diversity reception. The read addressing of the memory 101 differs from its write addressing so as to deshuffle the QPSK or QAM symbols, the order of which was shuffled by the interleavers 35, 45, 55 etc. in the portion of the transmitter apparatus depicted in FIG. 2. This deshuffling restores the original order of the QPSK or QAM symbols conveying bit-interleaved FEC coding. As thus far described, the FIG. 17 initial portion of a COFDM receiver is similar to the initial portions of COFDM receivers used for DVB in Europe. In a departure from DVB practice, the writing of the memory 101 is controlled such that just the final transmissions of the shuffled QPSK or QAM symbols that convey bit-interleaved FEC coding are temporarily stored to be deshuffled when read out.

In further departure from DVB practice, the weighted responses supplied in parallel from the output port of the frequency-domain channel equalizer 99 are further applied to the input ports of another bank 102 of parallel-to-series converters that are arranged so as in effect to de-rotate the circular DFT components computed by the DFT computer 97. The one of the parallel-to-series converters in this bank 102 of them that is appropriate for the number of OFDM carriers in the DFT and the sort of modulation symbol constellations for those carriers is selected to be loaded with the rotated circular DFT components computed by the DFT computer 97 responsive to initial transmissions of data that are later transmitted again. The response of this selected parallel-to-series converter is supplied from the output port of the bank 102 of parallel-to-series converters. The output port of the bank 102 of parallel-to-series converters is connected for supplying complex QPSK or QAM symbol map coordinates to the write input port of a memory 103 for delaying those of such coordinates. The writing of the memory 103 is controlled such that just the de-rotated initial transmissions of the shuffled QPSK or QAM symbols that convey bit-interleaved FEC coding are temporarily stored in the memory 103. The memory 103 is configured to delay the shuffled QPSK or QAM symbols supplied from its read output port so as to concur in time with final transmissions of the same shuffled QPSK or QAM symbols supplied from the output port of the bank 100 of parallel-to-series converters.

Figure 19:
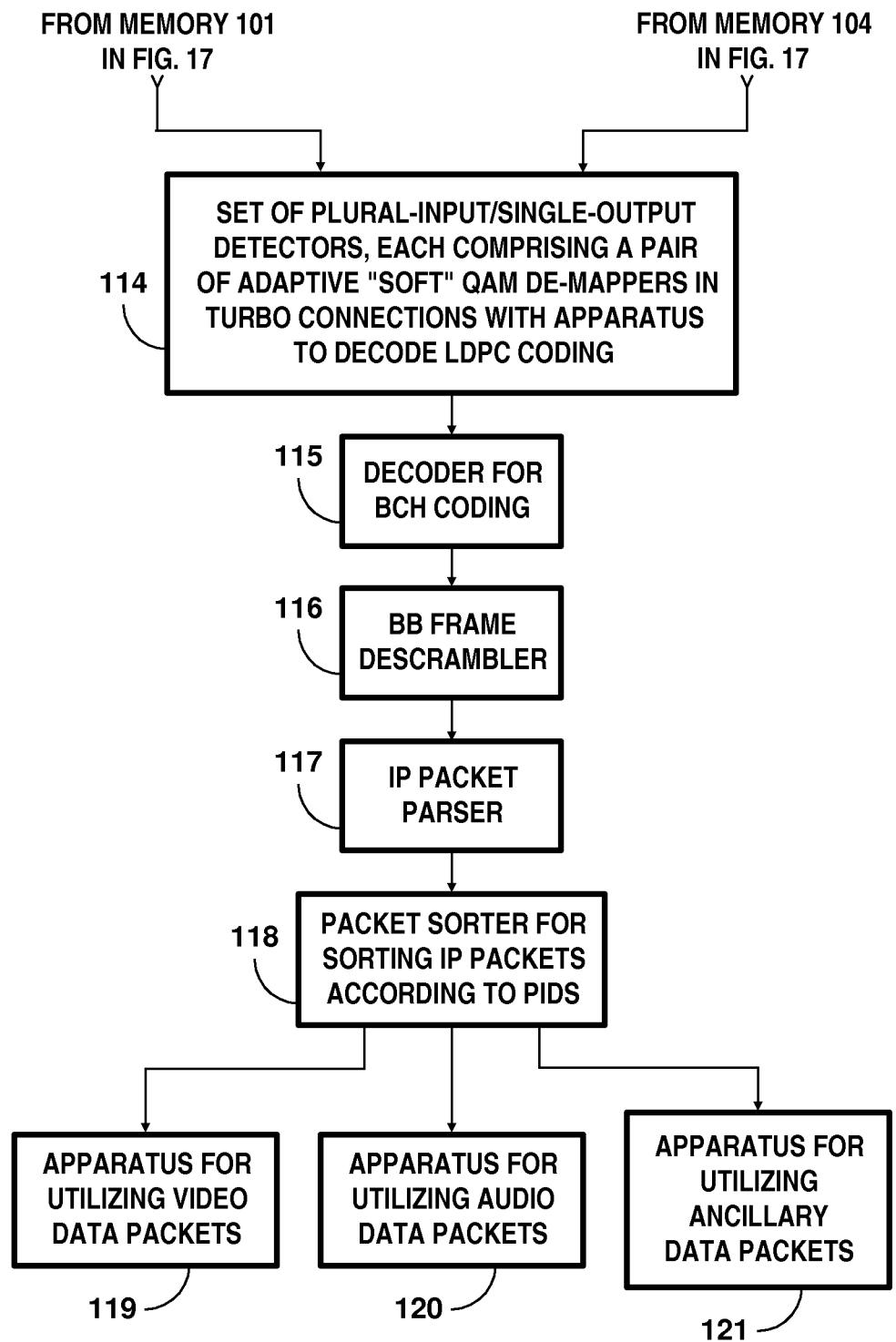

FIG. 17 depicts the read output port of the memory 103 connecting to the write input port of a further memory 104 for deshuffling the QAM constellations shuffled by the interleavers 35, 45, 55 etc. in the FIG. 2 portion of a DTV transmitter. The writing of the memory 104 is controlled such that just the initial transmissions of the shuffled QPSK or QAM symbols that convey bit-interleaved FEC coding are temporarily stored to be deshuffled when read out. FIG. 17 indicates that the read-output ports of the memories 102 and 104 connect to first and second input ports of a detector 114, respectively, which detector 114 is depicted in FIG. 19. While FIG. 17 depicts separate memories 103 and 104 in cascade connection to make it easier for a reader to understand operation of COFDM receivers embodying the invention, in actual practice a single memory is apt to replace the cascaded separate memories 103 and 104.

FIG. 18 depicts a controller 105 of decoding operations in the DTV receiver, but does not explicitly show the connections to elements of the receiver through which those elements are controlled. FIG. 18 shows the output port of the P1 symbol detector 93 connected to a respective input port of the controller 105. FIG. 18 further indicates that the input port of the P1 symbol detector 93 is connected for receiving baseband digitized COFDM signal from the front-end tuner 91 depicted in FIG. 17. The P1 symbol detector 93 detects each occurrence of a P1 symbol, which is based on a 1K OFDM symbol with frequency-shifted repeats at its beginning and its conclusion. A P1 symbol signals the beginning of a T2 frame, and the P1 symbol detector 93 supplies this important timing information to the controller 105. The structure of the P1 symbol facilitates easy detection thereof, as well as forestalling any possibility of its being imitated by any part of the signal within the ensuing T2 frame. Only a fraction of the 1K OFDM carrier positions convey energy, and these carry one of a set of carefully chosen data patterns to provide some capability for signaling the controller 105 for decoding operations in the DTV receiver. This format of P1 symbol provides (a) a simple and robust mechanism for rapid detection of T2 signals when a receiver scans through the appropriate spectrum band, (b) a fast frequency lock mechanism for the receiver and (c) 6-bits of signaling. E.g., these bits may be used for signaling the FFT size used for symbols in the T2 frame. If the DTV standard prescribes inverting the polarity of T2 frames of OFDM signals during initial transmissions, one of these bits can be reserved to signal such inversion.

FIG. 18 depicts a de-mapper 106 for successive coordinates of BPSK symbol constellations as supplied to its input port from the output port of the bank 100 of parallel-to-serial converters in FIG. 19. The controller 105 of decoding operations activates the de-mapper 106 when L1-pre signaling is received, the time for such activation being determined so as to follow the P1 symbol detector 93 indicating to the controller 105 that P1 symbols have just been detected in full. Responsive to the respective parities of the COFDM carriers, the de-mapper 106 generates "soft" bits in logarithmic-likelihood ratio (LLR) format that convey bit-wise FEC coded L1-pre signaling. These soft bits are supplied from the output port of the de-mapper 106 to the input port of a decoder 107 for LDPC coding. The output port of the decoder 107 for LDPC coding is connected for supplying reproduced BCH coding to the input port of a decoder 108 for BCH coding, the output port of which is connected for supplying reproduced L1-pre signaling to a respective input port of the controller 105 of decoding operations within the DTV receiver.

FIG. 18 depicts a de-mapper 109 for successive complex coordinates of QPSK or QAM symbol constellations as supplied to its input port from the output port of the bank 100 of parallel-to-serial converters in FIG. 19. ETSI standard EN 702 755 V1.3.1 prescribes BPSK, QPSK, 16QAM, or 64QAM symbol constellations be used for L1-post signaling in DVB-T2. The controller 105 of decoding operations activates an appropriate section of the de-mapper 109 when L1-post signaling is received, the time for such activation being determined so as to follow the P1 symbol detector 93 indicating to the controller 105 that P1 symbols have just been detected and further to follow the ensuing L1-pre signaling interval. The de-mapper 109 responds to the complex coordinates descriptive of successive BPSK symbol constellations to recover a single soft bit of FEC coding from each constellation. The de-mapper 109 responds to the complex coordinates descriptive of successive QPSK symbol constellations to recover two soft bits of FEC coding from each constellation. The de-mapper 109 responds to the complex coordinates descriptive of successive 16QAM symbol constellations to recover four soft bits of FEC coding from each constellation. The de-mapper 109 responds to the complex coordinates descriptive of successive 64QAM symbol constellations to recover six soft bits of FEC coding from each constellation. In any one of these four cases, the de-mapper 109 generates the soft bits of FEC coding in LLR format. The de-mapper 109 is connected to supply these soft bits from its output port to the input port of a de-interleaver 110 of the interleaving of those soft bits, attributable to the bit interleaver 68 in the FIG. 3 portion of the DTV transmitter. The design of the de-interleaver 110 is different for different ones of these four cases. The output port of the de-interleaver 110 connects to the input port of a soft-input/soft-output decoder 111 for decoding LDPC coding. The output port of the SISO decoder 111 is connected for supplying soft bits of BCH coding to the input port of a soft-input decoder 112 for decoding BCH coding.

FIG. 18 shows the output port of the BCH decoder 112 connected to the input port of a bits de-scrambler 113. The output port of the bits de-scrambler 113 is connected for supplying L1-post signaling to a respective input port of the controller 105 of decoding operations within the DTV receiver. The L1-post signaling has CRC-8 coding, which coding can be decoded within the controller 105 to verify whether or not the L1-post signaling received by the controller 105 is correct or not.

The controller 105 of decoding operations supplies instructions to the memories 101 and 104 depicted in FIG. 17. These instructions specify how to deshuffle the successive complex coordinates of 16QAM, 32QAM, 64QAM, 128QAM, 256QAM or 512QAM symbol constellations supplied to their respective input ports. E. g., the controller 105 generates these instructions responsive to the contents of the 3-bit PLP_MOD field in the L1-post signaling prescribed in the DVB-T2 standard. The instructions that the controller 105 supplies to each of the memories 101 and 104 determine the write addressing and read addressing of each of those memories.

FIG. 19 depicts a set 114 of plural-input/single-output detectors, each having one of its two input ports connected for receiving read-out from the memory 101 and the other of its input ports connected for receiving read-out from the memory 104. Each of the set 114 of plural-input/single-output detectors is of a type similar to any one of known types used to decode duplicated FEC coding in COFDM signals received either in frequency-division multiplex or via respective antennas for spatial diversity reception. Each of the set 114 of plural-input/single-output detectors comprises a plural-input "soft" de-mapper of QAM symbol constellations combined with apparatus to decode LDPC coding. The apparatus to decode LDPC coding may be shared amongst the plural-input/single-output detectors in the set 114 of them.

The output port of the set 114 of plural-input/single output detector is connected for supplying the results of decoding LDPC coding to the input port of a decoder 115 for BCH coding. The output port of the decoder 115 is connected for supplying the results of decoding BCH coding to the input port of a BB Frame descrambler 116, which includes a de-jitter buffer and null-packet re-inserter not explicitly shown. FIG. 19 shows the output port of the BB Frame descrambler 116 connected to supply IP packets to the input port of an internet-protocol packet parser 117. The output port of the IP packet parser 117 is connected to supply IP packets to a packet sorter 118 for sorting IP packets according to their respective packet identifiers (PIDs) to one of the respective input ports of apparatus 119 for utilizing video data packets, apparatus 120 for utilizing audio data packets, and apparatus 121 for utilizing ancillary data packets.

Figure 20:
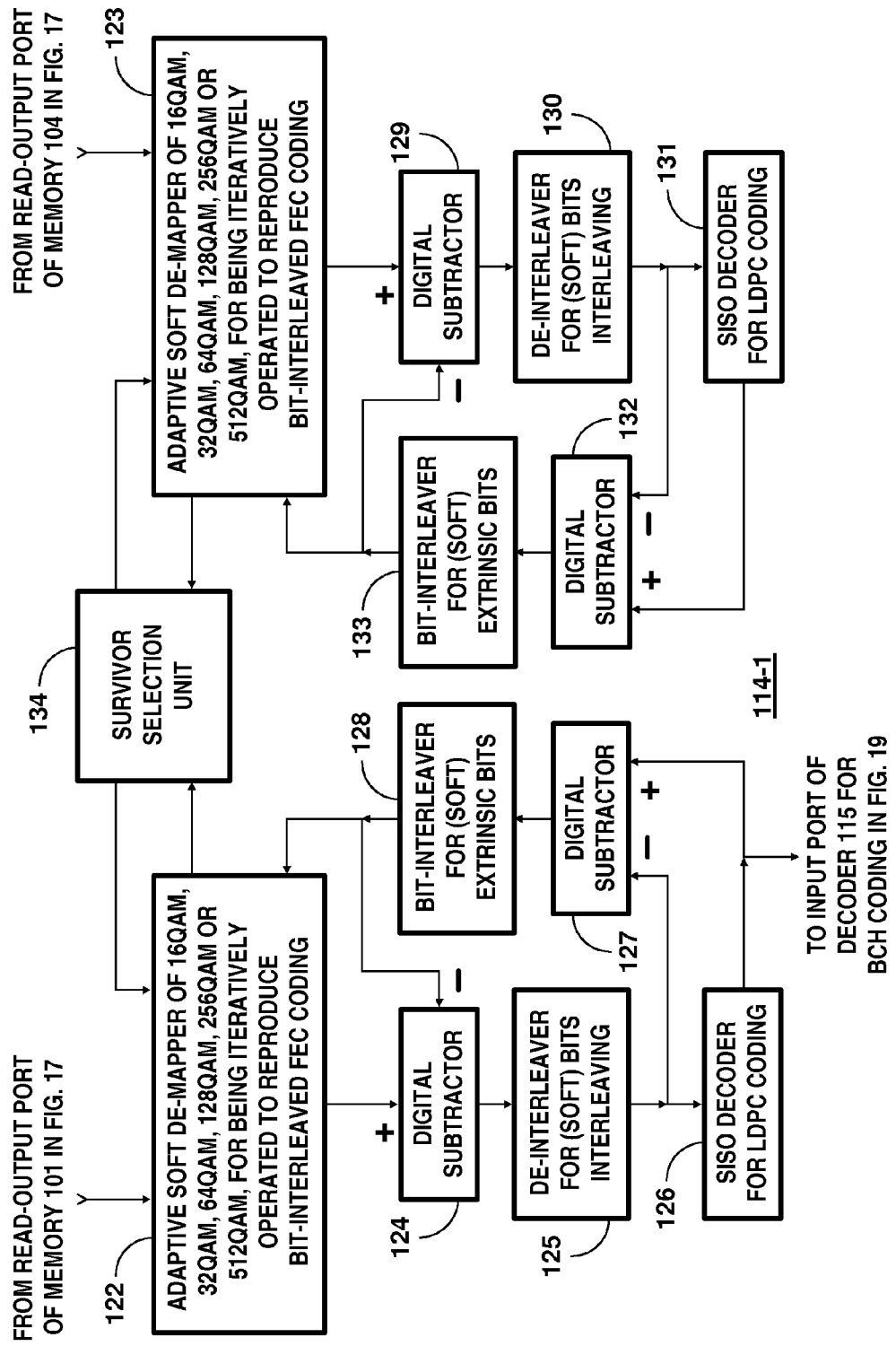
FIG. 20 is a schematic diagram of representative detailed structure of the plural-input/single output detector depicted in FIG. 19, which structure comprises iterative QAM de-mapping together with iterative decoding of LDPC coding.

FIG. 20 depicts a representative structure for the plural-input/single-output detector 114 depicted in FIG. 19. FIG. 20 indicates that the read-output port of the memory 101 for deshuffling QAM symbols in final transmissions of them connects to the input port of an adaptive soft de-mapper 122 for iterative de-mapping of successive complex coordinates of 16QAM, 32QAM, 64QAM, 128QAM, 256QAM or 512QAM symbol constellations. FIG. 20 indicates that the read-output port of the memory 104 for deshuffling QAM symbols of the initial transmissions of them connected to the input port of an adaptive soft de-mapper 123 for iterative de-mapping of successive complex coordinates of 16QAM, 32QAM, 64QAM, 128QAM, 256QAM or 512QAM symbol constellations.

Figure 21:
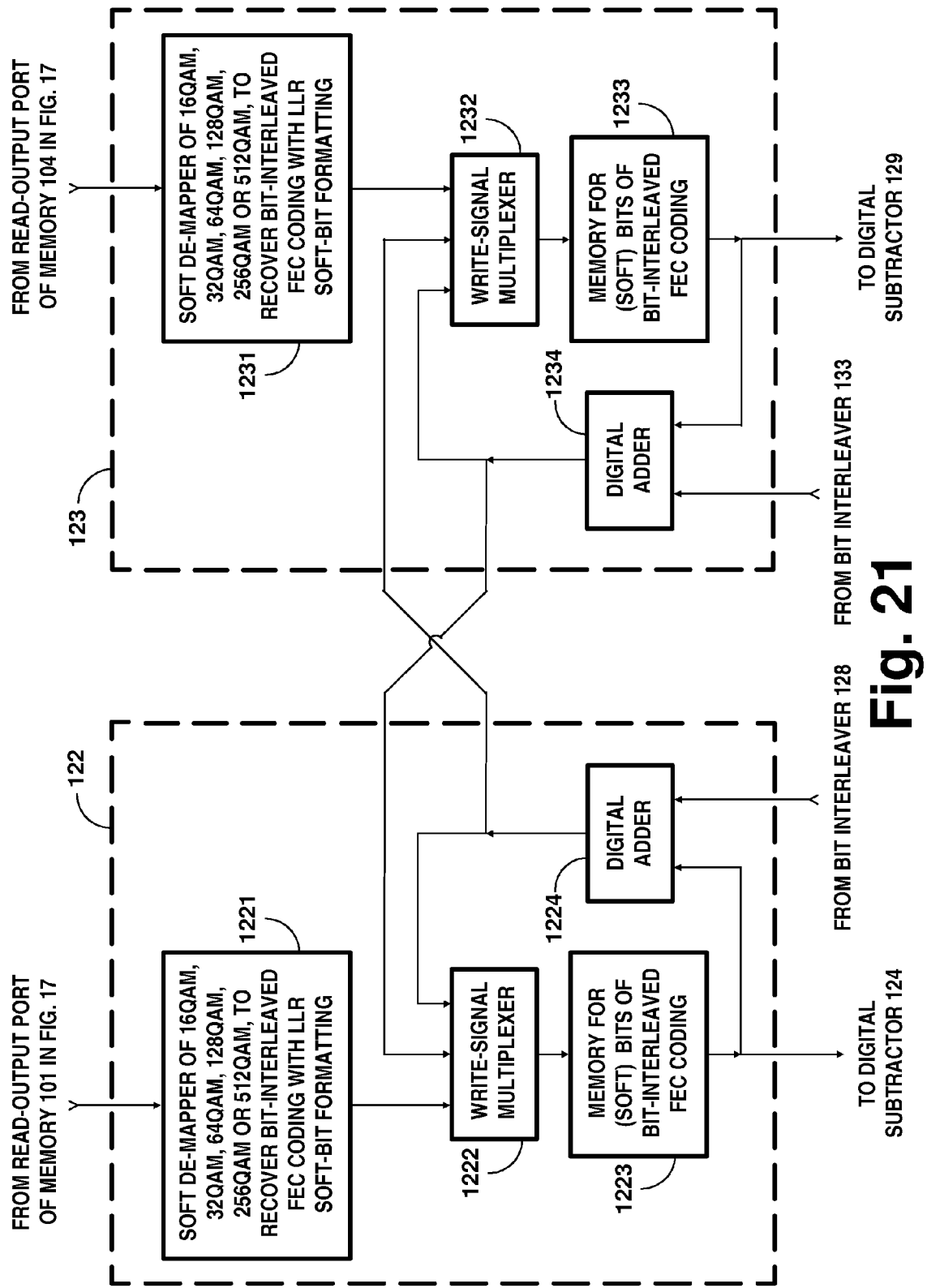
FIG. 21 is a schematic diagram depicting, in detail, representative structure of the FIG. 20 adaptive soft demappers of QAM constellations.

FIG. 21 shows the structures of adaptive soft de-mappers 122 and 123 in greater detail. The adaptive soft de-mappers 122 and 123 include component soft de-mappers 1221 and 1231, respectively. Besides the soft de-mapper 1221, the adaptive soft de-mapper 122 further includes a write-signal multiplexer 1222, a memory 1223 for soft bits of FEC coding, and a digital adder 1224. Besides the soft de-mapper 1231, the adaptive soft de-mapper 1232 further includes a write-signal multiplexer 1232, a memory 1233 for soft bits of FEC coding, and a digital adder 1234.

The soft de-mapper 1221 in the adaptive soft de-mapper 122 is configured for de-mapping successive complex coordinates of 16QAM, 32QAM, 64QAM, 128QAM, 256QAM or 512QAM symbol constellations supplied to its input port from the read-output port of the memory 101. The soft de-mapper 1221 responds to the de-shuffled QAM symbols to supply soft bits of FEC coding in log-likelihood-ratio (LRR) format from its output port to a first of three input ports of the write-signal multiplexer 1222. The memory 1223 is configured for temporarily storing the bit-interleaved FEC coding supplied in LLR soft-bit format to its write-input port from the output port of the write-signal multiplexer 1222. The digital adder 1224 has a first addend-input port to which a read-output port of the memory 1223 connects, has a second addend-input port connected for receiving extrinsic information from FIG. 20 circuitry, and has a sum-output port connected to the second input port of the write-signal multiplexer 1222.

The soft de-mapper 1231 in the adaptive soft de-mapper 123 is configured for de-mapping successive complex coordinates of 16QAM, 32QAM, 64QAM, 128QAM, 256QAM or 512QAM symbol constellations supplied to its input port from the read-output port of the memory 104. The soft de-mapper 1231 responds to the de-shuffled QAM symbols to supply soft bits of FEC coding in log-likelihood-ratio (LRR) format from its output port to a first of three input ports of the write-signal multiplexer 1232. The memory 1233 is configured for temporarily storing the bit-interleaved FEC coding supplied in LLR soft-bit format to its write-input port from the output port of the write-signal multiplexer 1232. The digital adder 1234 has a first addend-input port to which a read-output port of the memory 1233 connects, has a second addend-input port connected for receiving extrinsic information from FIG. 20 circuitry, and has a sum-output port connected to the second input port of the write-signal multiplexer 1232.

The sum-output port of the digital adder 1234 in the adaptive soft de-mapper 123 connects to the third input port of the write-signal multiplexer 1222 in the adaptive soft de-mapper 122, and the sum-output port of the digital adder 1224 in the adaptive soft de-mapper 123 connects to the third input port of the write-signal multiplexer 1232 in the adaptive soft de-mapper 123. These cross connections between the adaptive soft de-mappers 122 and 123 are used in survivor selection operations explained in some detail further on in the specification.

The read-output port of the memory 1223 is further connected via the output port of the de-mapper 122 for supplying a posteriori soft de-mapping results to the minuend input port of a digital subtractor 124 depicted in FIG. 20. A portion of the plural-input/single-output detector 114 depicted in FIG. 20 is considered next. The difference output port of the digital subtractor 124 connects to the input port of a de-interleaver 125 for bit-interleaved soft bits. The output port of the de-interleaver 125 connects to the input port of a soft-input/soft-output (SISO) decoder 126 for LDPC coding and further connects to the subtrahend input port of a digital subtractor 127. The minuend input port of the subtractor 127 is connected to receive the soft bits of decoding results from the output port of the SISO decoder 126. The subtractor 127 generates soft extrinsic data bits from the SISO decoder 126 by comparing the soft output bits from the SISO decoder 126 with soft input bits to the SISO decoder 126. The output port of the subtractor 127 is connected to supply these soft extrinsic data bits to the input port of a bit-interleaver 128 complementary to the de-interleaver 125. The output port of the bit-interleaver 128 is connected for feeding back bit-interleaved soft extrinsic data bits to the second addend-input port of the digital adder 1224 in the adaptive soft de-mapper 122 of QAM, there to be additively combined with previous a posteriori soft de-mapping results read from memory 1221 to generate updated a priori soft de-mapping results to write over the previous ones read from that memory 1221.

More specifically, the output port of the bit-interleaver 128 connects to the second input port of the digital adder 1223. The memory 1223 is read concurrently with memory within the bit-interleaver 128, and the soft bits read out in LLR form from the memory 1223 are supplied to the first input port of the digital adder 1224. The adder 1224 adds the interleaved soft extrinsic bits fed back from the SISO decoder 126 to respective ones of the soft bits of a posteriori soft de-mapping results read from the memory 1223 to generate updated a priori soft de-mapping results supplied from the sum output port of the adder 1224 to the write-input port of the memory 1223 via the write signal multiplexer 1222. The soft bits of previous a posteriori demapping results temporarily stored in the memory 1223 are each written over after its being read and before another soft bit is read.

The output port of the bit-interleaver 128 is also further connected for feeding back bit-interleaved soft extrinsic data bits to the subtrahend input port of the subtractor 124. The subtractor 124 differentially combines the bit-interleaved soft extrinsic data bits fed back to it with respective ones of soft bits of the a posteriori de-mapping results read from the memory 1223 to generate soft extrinsic data bits from the adaptive soft de-mapper 122 for application to the input port of the de-interleaver 125. As thusfar described, the adaptive soft de-mapper 122 and the SISO decoder 126 are in a turbo loop connection with each other, and the turbo cycle of demapping QAM constellations and decoding LDPC can be iterated many times to reduce bit errors in the BCH coding that the SISO decoder 126 finally supplies to the decoder 115 of BCH coding. Successful correction of BCH codewords can be used for terminating iterative de-mapping and decoding of LDPC coding after fewer turbo cycles than the maximum number permitted.

The read-output port of the memory 1233 depicted in FIG. 21 is further connected via the output port of the de-mapper 123 for supplying a posteriori soft de-mapping results to the minuend input port of a digital subtractor 129 depicted in FIG. 20. A further portion of the plural-input/single-output detector 114 depicted in FIG. 20 is considered next. The difference output port of the digital subtractor 129 connects to the input port of a de-interleaver 130 for bit-interleaved soft bits. The output port of the de-interleaver 130 connects to the input port of a soft-input/soft-output (SISO) decoder 131 for LDPC coding and further connects to the subtrahend input port of a digital subtractor 132. The minuend input port of the subtractor 132 is connected to receive the soft bits of decoding results from the output port of the SISO decoder 131. The subtractor 132 generates soft extrinsic data bits from the SISO decoder 131 by comparing the soft output bits from the SISO decoder 131 with soft input bits to the SISO decoder 131. The output port of the subtractor 132 is connected to supply these soft extrinsic data bits to the input port of a bit-interleaver 133 complementary to the de-interleaver 130. The output port of the bit-interleaver 133 is connected for feeding back bit-interleaved soft extrinsic data bits to the second addend-input port of the digital adder 1234 in the adaptive soft de-mapper 123 of QAM, there to be additively combined with previous a posteriori soft de-mapping results read from memory 1231 to generate updated a priori soft de-mapping results to write over the previous ones read from that memory 1231.

More specifically, the output port of the bit-interleaver 133 connects to the second input port of the digital adder 1233. The memory 1233 is read concurrently with memory within the bit-interleaver 133, and the soft bits read out in LLR form from the memory 1233 are supplied to the first input port of the digital adder 1234. The adder 1234 adds the interleaved soft extrinsic bits fed back from the SISO decoder 131 to respective ones of the soft bits of a posteriori soft de-mapping results read from the memory 1233 to generate updated a priori soft de-mapping results supplied from the sum output port of the adder 1234 to the write-input port of the memory 1233 via the write signal multiplexer 1232. The soft bits of previous a posteriori demapping results temporarily stored in the memory 1233 are each written over after its being read and before another soft bit is read.

The output port of the bit-interleaver 133 is also further connected for feeding back bit-interleaved soft extrinsic data bits to the subtrahend input port of the subtractor 129. The subtractor 129 differentially combines the bit-interleaved soft extrinsic data bits fed back to it with respective ones of soft bits of the a posteriori de-mapping results read from the memory 1233 to generate soft extrinsic data bits from the adaptive soft de-mapper 123 for application to the input port of the de-interleaver 130. As thusfar described, the adaptive soft de-mapper 123 and the SISO decoder 131 are in a turbo loop connection with each other, and the turbo cycle of demapping QAM constellations and decoding LDPC can be iterated many times to reduce bit errors in the BCH coding the SISO decoder 126 finally supplies to the decoder 115 of BCH coding. Successful correction of BCH codewords can be used for terminating iterative de-mapping and decoding of LDPC coding after fewer turbo cycles than the maximum number permitted.

FIG. 20 depicts a survivor selection unit 134 having a first input port connected for receiving a priori information from memory within the adaptive soft de-mapper 122 and having a second input port connected for receiving a priori information from memory within the adaptive soft de-mapper 123. The survivor selection unit 134 has a first output port connected for updating at selected times the memory 1223 within the adaptive soft de-mapper 122. The survivor selection unit 134 has a second output port connected for updating at selected times the memory 1233 within the adaptive soft de-mapper 123. The survivor selection unit 134 is dormant at the times LDPC coding is being decoded by the turbo loop connection of the adaptive soft mapper 122 and the SISO decoder 126. The survivor selection unit 134 is dormant at the times LDPC coding is being decoded by the turbo loop connection of the adaptive soft de-mapper 123 and the SISO decoder 131. Typically, LDPC coding is decoded concurrently by the two turbo loops. The LDPC coding is iterated a few times—e. g. seven times—during each successive period that the survivor selection unit 134 is dormant. Then, the survivor selection unit 134 compares the likelihood of error in each pair of correspondingly timed soft bits from the FEC coding block temporarily stored in the memory 1223 within the adaptive soft de-mapper 122 and from the FEC coding block temporarily stored in the memory 1233 within the adaptive soft de-mapper 123, respectively. If and only if the soft bit from the de-mapper 122 has very little likelihood of being in error, but the soft bit from the de-mapper 123 has a considerably greater likelihood of being in error, the survivor selection unit 134 will write over the soft bit temporarily stored in the de-mapper 123 memory 1233 so as to conform to the bit from the de-mapper 122. If and only if the soft bit from the de-mapper 123 has very little likelihood of being in error, but the bit from the de-mapper 122 has a considerably greater likelihood of being in error, the survivor selection unit 134 will write over the soft bit temporarily stored in the de-mapper 122 memory 1223 so as to conform to the soft bit from the de-mapper 123. If neither of the foregoing conditions obtains, the survivor selection unit 134 does not over-write either one of the pair of soft bits respectively stored in the memories 1223 and 1233 of the de-mappers 122 and 123. After the FEC blocks stored in the memories 1223 and 1233 of the de-mappers 122 and 123 have been completely scanned and selectively updated, the survivor selection unit 134 is returned to a dormant condition, and iterative decoding of LDPC coding in the turbo loops including the SISO decoders 126 and 131 is resumed.

Neither FIG. 20 nor FIG. 21 explicitly shows the comparison apparatus that the survivor selection unit 134 uses for comparing the likelihood of error in each pair of correspondingly timed soft bits from the FEC coding block temporarily stored in the memory 1223 within the adaptive soft de-mapper 122 and from the FEC coding block temporarily stored in the memory 1233 within the adaptive soft de-mapper 123, respectively. During the intermittent periods of survivor selection this comparison apparatus takes over control of the write-signal multiplexers 1222 and 1232 of the de-mappers 122 and 123 that are depicted in FIG. 21.

If during a survivor selection period the soft bit from the de-mapper 122 has very little likelihood of being in error, but the soft bit from the de-mapper 123 has a considerably greater likelihood of being in error, the comparison apparatus conditions the write-signal multiplexer 1222 for writing the memory 1223 with the sum output signal that the digital adder 1224 supplies to the second input port of the multiplexer 1222. Furthermore, the comparison apparatus conditions the write-signal multiplexer 1232 for writing the memory 1233 with the sum output signal that the digital adder 1224 supplies to the third input port of the multiplexer 1232.

If during a survivor selection period the soft bit from the de-mapper 123 has very little likelihood of being in error, but the soft bit from the de-mapper 122 has a considerably greater likelihood of being in error, the comparison apparatus conditions the write-signal multiplexer 1232 for writing the memory 1233 with the sum output signal that the digital adder 1234 supplies to the second input port of the multiplexer 1232. Furthermore, the comparison apparatus conditions the write-signal multiplexer 1222 for writing the memory 1223 with the sum output signal that the digital adder 1234 supplies to the third input port of the multiplexer 1222.

If during a survivor selection period the soft bits from the de-mapper 122 and from the de-mapper 123 have quite similar likelihoods of being in error, the comparison apparatus conditions the write-signal multiplexer 1222 for writing the memory 1223 with the sum output signal that the digital adder 1224 supplies to the second input port of the multiplexer 1222. Furthermore, the comparison apparatus conditions the write-signal multiplexer 1232 for writing the memory 1233 with the sum output signal that the digital adder 1234 supplies to the second input port of the multiplexer 1232.

Figure 22:
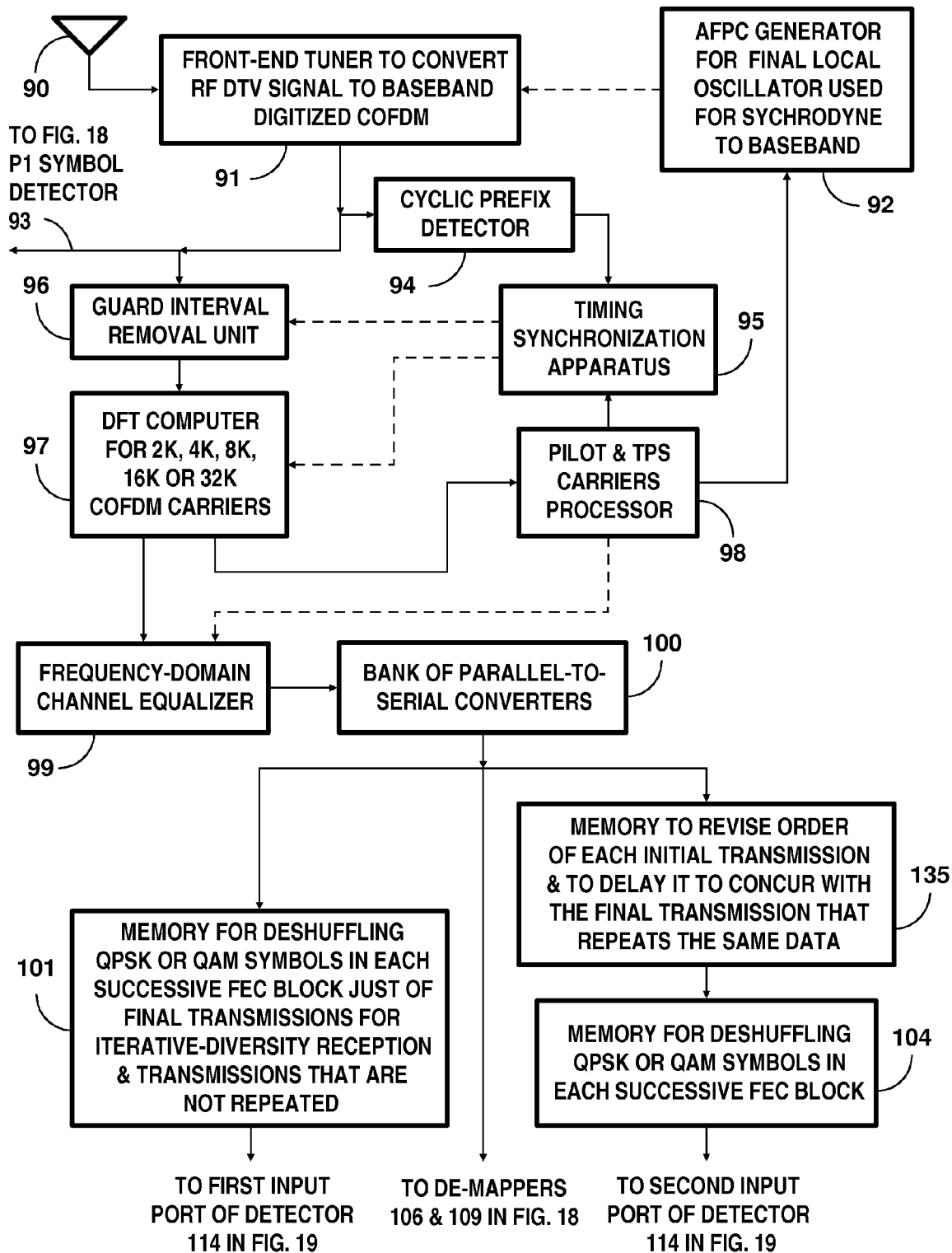
FIG. 22 is a schematic diagram of a modification of the FIG. 17 portion of the COFDM receiver apparatus further depicted in FIGS. 18 and 19, which COFDM receiver apparatus as so modified embodies further aspects of the invention.

FIG. 22 shows a modified FIG. 7 portion of a COFDM receiver including subsequent portions as shown in FIGS. 18 and 19. The bank 102 of parallel-to-series converters arranged so as in effect to de-rotate the circular DFT components computed by the DFT computer 97 is dispensed with in FIG. 22, and a differently configured memory 135 replaces the memory 103 used for delaying the serial response of the bank 102 of parallel-to-series converters to initial transmissions for iterative-diversity reception. FIG. 22 shows the output port of the bank 100 of parallel-to-series converters connected for supplying its serial response to initial transmissions for iterative-diversity reception to the write-input port of the memory 135 for temporarily storing that serial response. The memory 135 is configured to revise the order of the complex coordinates of QAM symbol constellations in initial transmissions for iterative-diversity reception and to delay them as read to the write input port of the memory 104, so as to concur in time with the complex coordinates of modulation symbol constellations in corresponding final transmissions applied to the write input port of the memory 101. That is, there is an offset between the write addressing and the read addressing of locations in memory 135 for temporarily storing those complex coordinates of modulation symbol constellations that in effect provides for de-rotating the circular DFT specifying those complex coordinates. This de-rotation is complementary to the rotation of circular DFT performed by one of the dual port RAMs 35, 45, 55 etc. in the FIG. 2 portion of the COFDM transmitter depicted in FIGS. 1-4.

A set of generators of suitable write and read addressing for the memory 135 are described in detail in U.S. Pat. No. 8,958,490 with reference to FIGS. 20A, 20B, 20C and 20D of its drawing depicting such generators connected to provide write and read addressing for its memory 145. An alternative set of generators of suitable write and read addressing for the memory 135 are described in detail in U.S. Pat. No. 8,958,490 with reference to FIGS. 21A, 21B, 21C and 21D of its drawing depicting such generators connected to provide write and read addressing for its memory 145.

Figure 23:
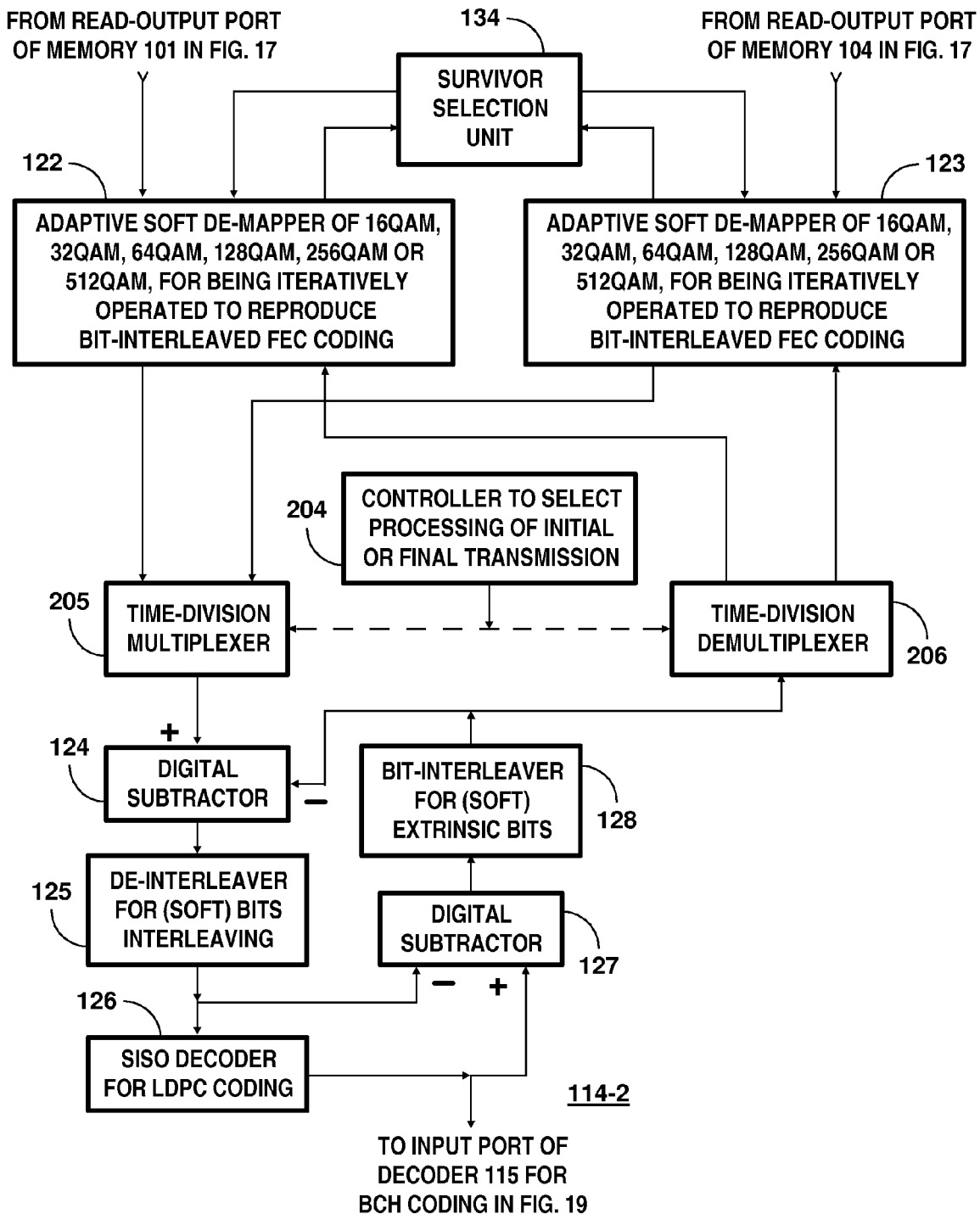
FIG. 23 is a schematic diagram depicting in detail other representative detailed structure of the plural-input/single output detector depicted in FIG. 19, which structure is alternative to that depicted in FIG. 20.

FIG. 23 depicts in detail another representative detailed structure 114-2 of the plural-input/single output detector 114 depicted in FIG. 19, which structure is alternative to the structure 114-1 depicted in FIG. 20. FIG. 23 indicates that the read-output port of the memory 101 for deshuffling QAM symbols in final transmissions of them connects to the input port of an adaptive soft de-mapper 122 for iterative de-mapping of successive complex coordinates of 16QAM, 32QAM, 64QAM, 128QAM, 256QAM or 512QAM symbol constellations. FIG. 23 indicates that the read-output port of the memory 104 for deshuffling QAM symbols of the initial transmissions of them connected to the input port of an adaptive soft de-mapper 123 for iterative de-mapping of successive complex coordinates of 16QAM, 32QAM, 64QAM, 128QAM, 256QAM or 512QAM symbol constellations. The structures of the survivor selection unit 134 and of the adaptive soft de-mappers 122 and 123 in the plural-input/single output detector 114-2 depicted in FIG. 23 are the same as in the plural-input/single output detector 114-2 depicted in FIG. 23. FIG. 21 depicts these structures in more detail.

The FIG. 23 plural-input/single output detector 114-2 differs from the FIG. 20 plural-input/single output detector 114-1 in that the elements 129-133 are dispensed with. The adaptive soft de-mappers 122 and 123 are each in respective turbo connections with the elements 124-128, including just the single SISO decoder 126 for LDPC coding. These respective turbo connections are made on a time-division multiplex basis, as determined by indications from a controller 204 as to which of the initial and final transmissions for iterative diversity reception is to be currently processed. These indications are applied to a time-division multiplexer 205 and to a time-division demultiplexer 206 as control signals for controlling their respective operations.

The output port of the adaptive soft de-mapper 122 for supplying soft a posteriori de-mapping results is connected to a first input port of the time-division multiplexer 205, and the output port of the adaptive soft de-mapper 123 for supplying a posteriori soft de-mapping results is connected to a second input port of the time-division multiplexer 205. The output port of the time-division multiplexer 205 connects to the minuend input port of the digital subtractor 124. Responsive to indication from the controller 204 that an initial transmission for iterative-diversity reception is currently to be processed, the time-division multiplexer 205 reproduces the soft a posteriori de-mapping results from the adaptive soft de-mapper 123 for application to the minuend input port of the digital subtractor 124. Responsive to indication from the controller 204 that a final transmission for iterative-diversity reception is currently to be processed, the time-division multiplexer 205 reproduces the soft a posteriori de-mapping results from the adaptive soft de-mapper 122 for application to the minuend input port of the digital subtractor 124.

The input port of the time-division demultiplexer 206 is connected for receiving bit-interleaved extrinsic signal that the bit-interleaver 128 supplies from its output port. A first of two output ports of the time-division demultiplexer 206 is connected to the second input port of the digital adder 1224 within the adaptive soft de-mapper 122, and the second output port of the time-division demultiplexer 206 is connected to the second input port of the digital adder 1234 within the adaptive soft de-mapper 123. Responsive to indication from the controller 204 that a final transmission for iterative-diversity reception is currently to be processed, the time-division demultiplexer 206 reproduces the bit-interleaved extrinsic signal at its second output port, to be fed back to adaptive soft de-mapper 122. Responsive to indication from the controller 204 that an initial transmission for iterative-diversity reception is currently to be processed, the time-division demultiplexer 206 reproduces the bit-interleaved extrinsic signal at its first output port, to be fed back to adaptive soft de-mapper 123.

In practice the COFDM receiver apparatuses as thusfar described are apt to be modified to deshuffle QAM symbols after de-mapping them, rather than before de-mapping them Such modification can reduce memory requirements in the COFDM receiver apparatus. E. g., the COFDM receiver apparatus of FIGS. 17, 18 and 19 is modified in the following three respects. The memory 101 is replaced by a direct connection from the output port of the bank 100 of parallel-to-serial converters to the first input port of the detector 114. The memory 104 is replaced by a direct connection from the read-output port of the memory 103 to the second input port of the detector 114. The deshuffling of QAM symbols is implemented by suitable addressing of the memories 1223 and 1233 during their being initially written by de-mapping results from the de-mappers 1221 and 1231, respectively. By way of further example, the COFDM receiver apparatus of FIGS. 22, 18 and 19 is modified similarly, except that the memory 104 is replaced by a direct connection from the read-output port of the memory 135 to the second input port of the detector 114.

A new DTV broadcasting standard could prescribe that each of the COFDM symbols in final transmissions for iterative-diversity reception immediately succeeds the corresponding COFDM symbols in initial transmissions. In such case the COFDM receiver apparatus of FIGS. 17, 18 and 19 can be further modified to replace the cascaded memories 103 and 104 by a direct connection from the output port of the bank 102 of parallel-to-serial converters to the second input port of the plural-input/single-output detector 114, as well as replacing the memory 101 by a direct connection from the output port of the bank 100 of parallel-to-serial converters to the first input port of the plural-input/single-output detector 114. Also, in such case the COFDM receiver apparatus of FIGS. 22, 18 and 19 can be further modified to replace the cascaded memories 103 and 104 by a direct connection from the output port of the bank 102 of parallel-to-serial converters to the second input port of the plural-input/single-output detector 114, as well as replacing the memory 101 by a direct connection from the output port of the bank 100 of parallel-to-serial converters to the first input port of the plural-input/single-output detector 114. The plural-input/single-output detector 114 can begin processing each successive COFDM symbol from an initial transmission for iterative-diversity reception before it receives a corresponding successive COFDM symbol from a final transmission for iterative-diversity reception. Assuming the plural-input/single-output detector 114 to be structured per FIG. 20 or FIG. 23, an earliest period for survivor selection between the bits of each pair of initially transmitted and finally transmitted COFDM symbols can be scheduled as soon as the finally transmitted COFDM symbol has been received.

Thusfar in this specification, processing of the complex coordinates of modulation symbol constellations has been described as being performed using a single bit stream that alternates in-phase coordinates with quadrature-phase coordinates. In practice, alternative embodiments of the DTV receiver apparatus are apt to be used that process the in-phase coordinates and quadrature-phase coordinates of two-dimensional modulation symbol constellations in parallel in respective bit streams. These alternative embodiments of DTV receiver apparatus are to be considered as embodying aspects of the invention disclosed herein. Also, alternative embodiments of the DTV transmitter apparatus are apt to be used that process the in-phase coordinates and quadrature-phase coordinates of two-dimensional modulation symbol constellations in parallel in respective bit streams. These alternative embodiments of DTV transmitter apparatus are to be considered as embodying aspects of the invention disclosed herein. These alternative embodiments are to be considered to be equivalents included within the scopes of claims accompanying this specification in accordance with the court-established doctrine of equivalency.

The QPSK, 16QAM, 32QAM, 64QAM, 128QAM, 256QAM and 512AM symbol constellations are representative of two-dimensional modulation symbol constellations that can be used in DTV systems embodying the invention. Over time, only certain ones of these types of modulation symbol constellations may find widespread usage. Single-time retransmission may allow still larger modulation symbol constellations to be used, such as 1024QAM or possibly 4096 QAM. High-order PSK modulation symbol constellations that employ plural rings of lattice points are also feasible if there be single-time retransmission of those constellations.

The improved shaping gain provided by using Gray mapping of QAM symbols in initial transmissions for iterative-diversity reception that differs from the Gray mapping of QAM symbols in subsequent final transmissions obtains even when the Gray mappings differ from those described with reference to FIGS. 9-16. For example, one of the Gray mappings for 16QAM may be as specified in ETSI standard EN 302 755 V1.3.1. By way of further example, one of the Gray mappings for 64QAM may be as specified in ETSI standard EN 302 755 V1.3.1. Improved shaping gain can be provided for cruciform QAM such as 512QAM by using close-to-Gray mapping of QAM symbols in initial transmissions for iterative-diversity reception that differs from the close-to-Gray mapping of QAM symbols in subsequent final transmissions. Single-time retransmission of data allows the channel to be shaped ideally for 16QAM with two Gray maps; two-time retransmission of data allows the channel to be shaped ideally for 64QAM with three Gray maps; three-time retransmission of data allows the channel to be shaped ideally 256QAM with four Gray maps; etc.

The DTV systems described supra may be modified to replace LDPC block coding with LDPC convolutional coding. The DTV systems described supra may be modified to include further error correction coding. LDPC coding is known that does not need to be combined with BCH coding to suppress error floors, and such LDPC coding accommodates the BCH coding being replaced by CRC coding to detect when LDPC coding has eliminated errors. The DTV systems described supra may be modified so the DTV transmitter does not include interleavers for shuffling the order of the QPSK or QAM symbols within each FEC block. Just the differential rotation between corresponding COFDM symbols in initial and final transmissions of the same data would be relied on to implement cyclic delay diversity. DTV receivers could then be simplified omitting the memory required for deshuffling QPSK or QAM symbols to restore them to their original sequential order. Less preferred DTV systems that embody some of the aspects of the invention modify the DTV systems described supra to omit rotation of the DFT of COFDM symbols during single-time retransmissions. Such modifications sacrifice capability to overcome severe frequency-selective fading, but preserve capability to overcome man-made-noise (MMN) and drop-outs in received signal strength that span the full frequency spectrum of the RF channel.

Persons familiar with the DVB-T2 terrestrial broadcasting standard will be likely to notice that neither of the 16QAM constellations shown in FIGS. 9 and 10 corresponds to the 16QAM constellation specified in the DVB-T2 standard. Those persons will be likely further to notice that neither of the 64QAM constellations shown in FIGS. 13 and 14 corresponds to the 64QAM constellation specified in the DVB-T2 standard. Embodiments of the invention in which one of the first and second Gray mappings of the QAM constellations corresponds to a QAM constellation specified in the DVB-T2 standard are feasible and may be preferable from the standpoint of backward compatibility with DVB-T2.

Figure 24:
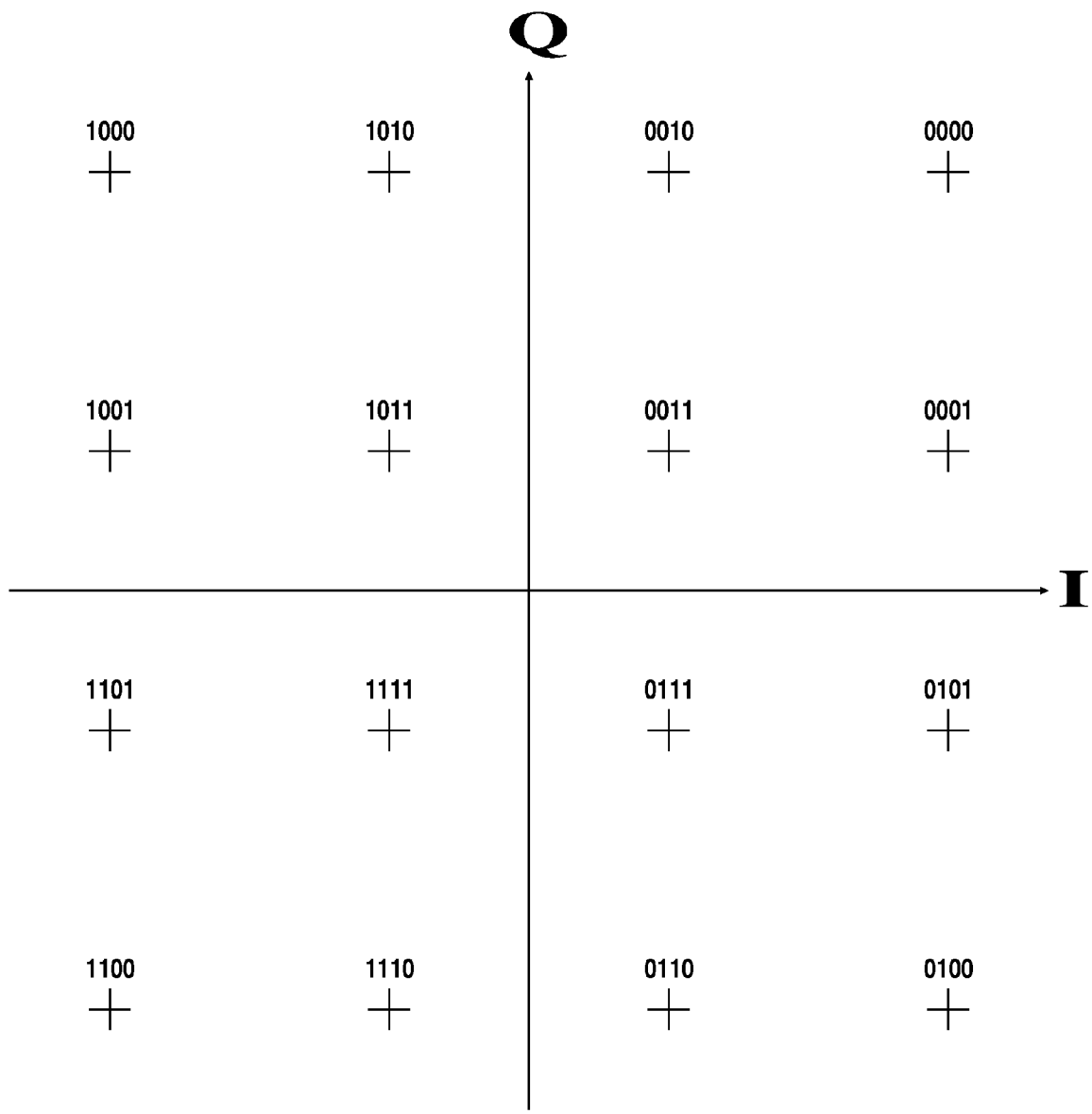
FIG. 24 is a diagram depicting a standard 16QAM symbol constellation with labeling per DVB-T2 that can be used by a first one of the pair of mappers to QAM symbol constellations in the FIG. 2 portion of the COFDM transmitter apparatus depicted in FIGS. 1, 2, 3 and 4.

FIG. 24 depicts "standard" Gray mapping for 16QAM as specified for the DVB-T2 terrestrial broadcast system in ETSI standard EN 302 755 V1.3.1. The labeling of the lattice points proceeds in regular order from most robust to least robust in this standard 16QAM mapping.

Figure 25:
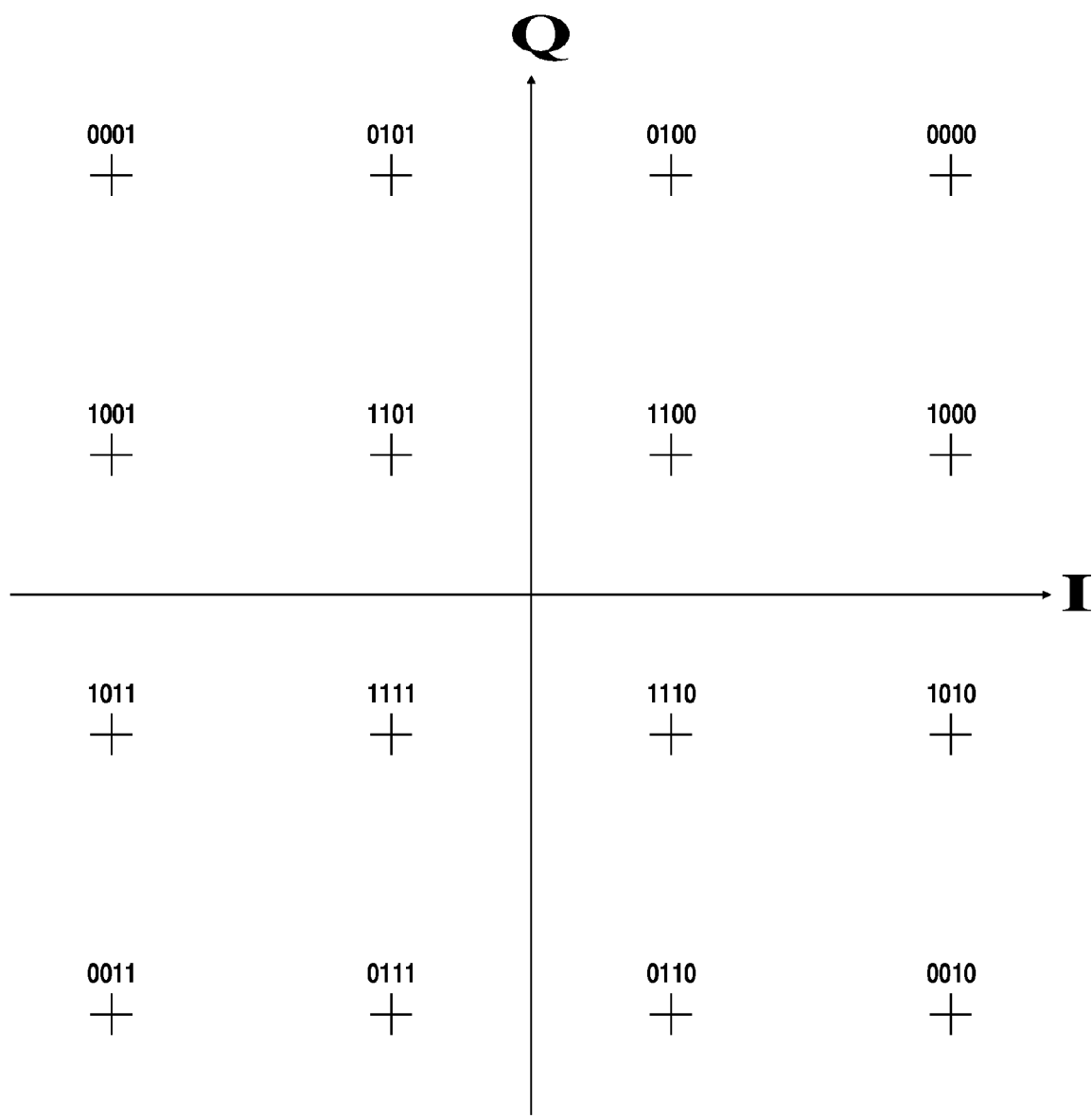
FIG. 25 is a diagram depicting a conjugate 16QAM symbol constellation with labeling that can be used by the second one of the pair of mappers to QAM symbol constellations in the FIG. 2 portion of the COFDM transmitter apparatus depicted in FIGS. 1, 2, 3 and 4.

FIG. 25 depicts a "conjugate" Gray mapping for 16QAM. In this "conjugate" Gray mapping for 16QAM the order of the bits in the labeling of each lattice point is reversed from the order of the bits in the labeling of that lattice point in the "standard" Gray mapping for 16QAM.

Figure 26:
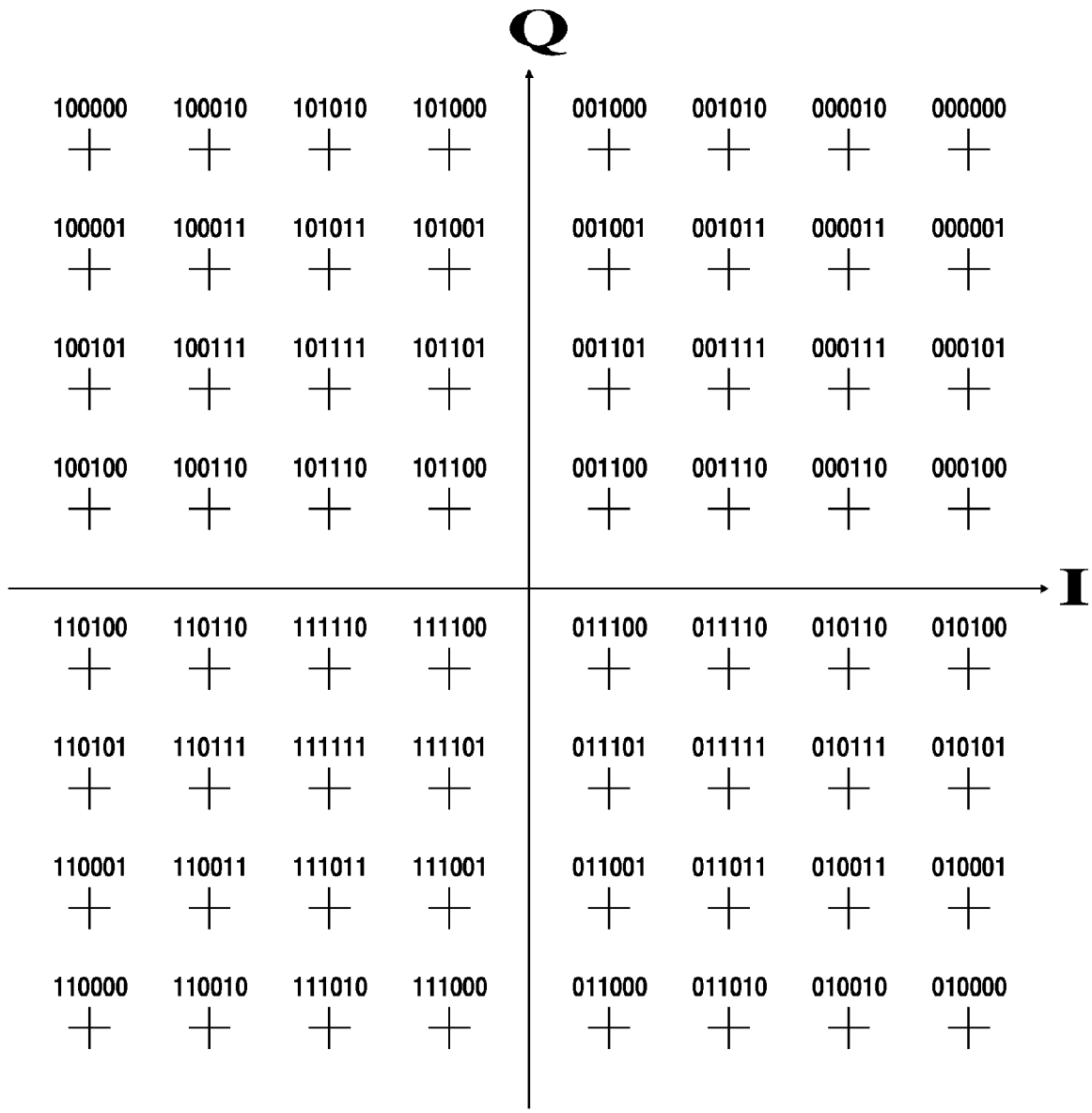
FIG. 26 is a diagram depicting a standard 64QAM symbol constellation with labeling per DVB-T2 that can be used by a first one of the pair of mappers to QAM symbol constellations in the FIG. 2 portion of the COFDM transmitter apparatus depicted in FIGS. 1, 2, 3 and 4.
Figure 27:
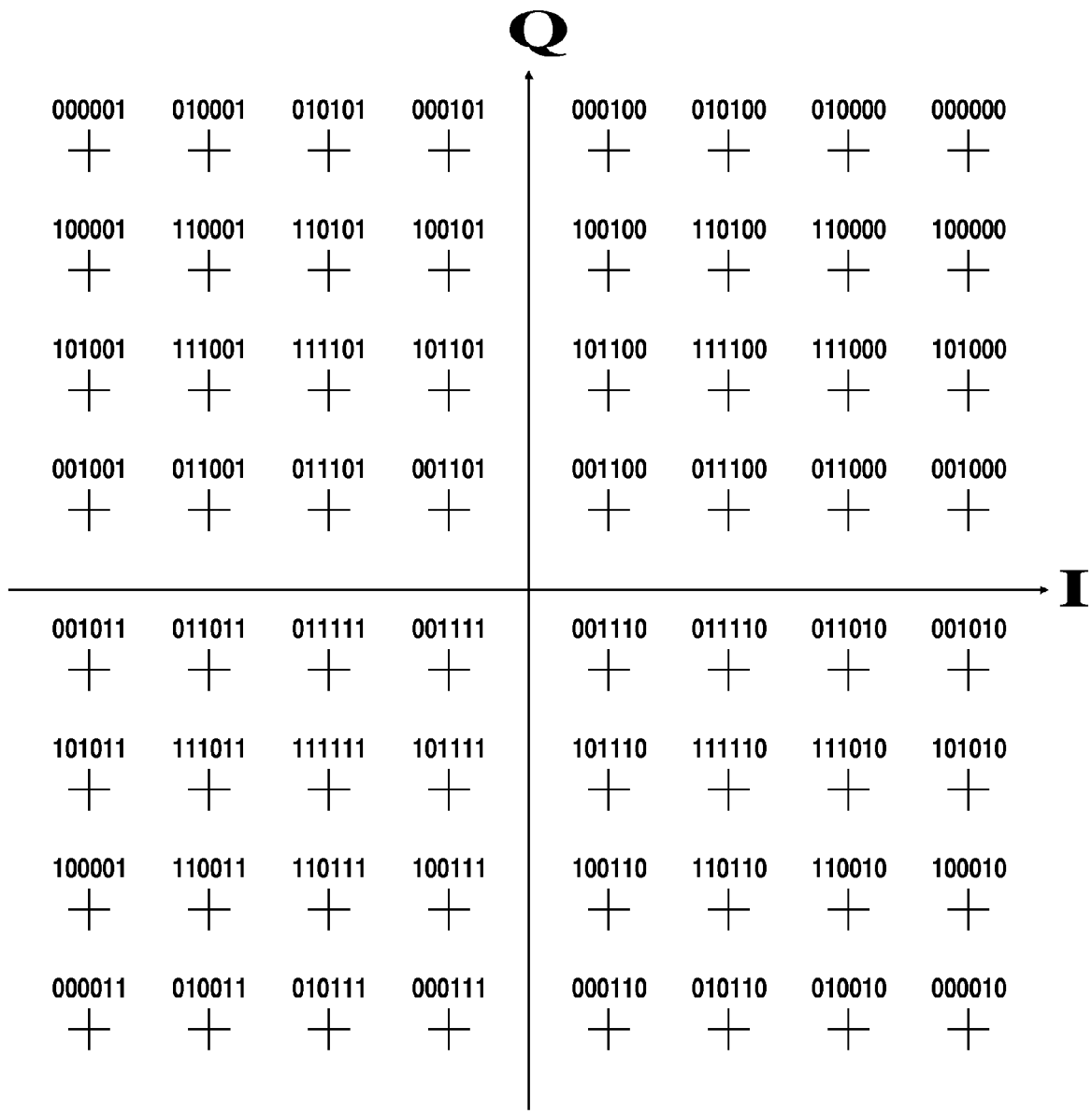
FIG. 27 is a diagram depicting a conjugate 64QAM symbol constellation with labeling that can be used by the second one of the pair of mappers to QAM symbol constellations in the FIG. 2 portion of the COFDM transmitter apparatus depicted in FIGS. 1, 2, 3 and 4.

FIG. 26 depicts "standard" Gray mapping for 64QAM as specified for the DVB-T2 terrestrial broadcast system in ETSI standard EN 302 755 V1.3.1. The labeling of the lattice points proceeds in regular order from most robust to least robust in this standard 16QAM mapping, FIG. 27 depicts a "conjugate" Gray mapping for 64QAM. In this "conjugate" Gray mapping for 64QAM the order of the bits in the labeling of each lattice point is reversed from the order of the bits in the labeling of that lattice point in the "standard" Gray mapping for 64QAM.

The arranging of bits in regular order from most robust to least robust in the labeling of the lattice points in a standard Gray mapping for square QAM symbol constellations, together with arranging of bits in regular order from least robust to more robust in the labeling of the lattice points of a "conjugate" Gray mapping for those QAM symbol constellations, results in interesting properties. Bits of lattice point labeling that are resolved as being real in the I-axis dimension in the "standard" Gray mapping of QAM symbol constellations of any size are resolved as being imaginary in the Q-axis dimension in the "conjugate" Gray mapping of QAM symbol constellations of that same size. Bits of lattice point labeling that are resolved as being imaginary in the Q-axis dimension in the "standard" Gray mapping of QAM symbol constellations of any size are resolved as being real in the I-axis dimension in the "conjugate" Gray mapping of QAM symbol constellations of that same size. This effect may help reduce the influence of inter-symbol interference from BPSK pilot carriers on the COFDM carriers conveying data.

While the shaping gain afforded by the invention are quite pronounced for uniform Gray mappings to square QAM symbol constellations, the invention can provide some additional shaping gain for non uniform mappings to square QAM symbol constellations besides the shaping gain these non-uniform mappings provide. Shaping gains are afforded by the invention irrespective of the FEC coding and interleaving procedures used previous to the dual mappings to QAM symbol constellations. E. g., these preceding FEC coding procedures may entail concatenated Reed-Solomon coding and convolutional coding for some services. Persons skilled in the art of designing DTV systems are apt to discern that various other modifications and variations can be made in the specifically described apparatuses without departing from the spirit or scope of the invention in some of its aspects. Accordingly, it is intended that these modifications and variations of the specifically described apparatuses be considered to result in further embodiments of the invention, which are included within the scope of the appended claims and their equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. A method for preparing packets of digital data to be transmitted by a COFDM broadcast transmitter so as to facilitate iterative-diversity reception by COFDM broadcast receivers of suitable design, said method comprising steps of:

forward-error-correction (FEC) coding successive frames of digital data to generate respective FEC codewords, each having the same prescribed number of bits;

writing said FEC codewords to temporary storage locations within a digital memory to be temporarily stored therein for a number at least one of COFDM symbol intervals;

twice reading said FEC codewords from said temporary storage locations within said digital memory, initially reading portions of FEC codewords in each of successive COFDM symbols in a first time-sequential order from said temporary storage locations, and finally reading said portions of said FEC codewords in each of successive COFDM symbols in a second time-sequential order from said temporary storage locations some time after their being initially read;

mapping the bits of each portion of said FEC codeword initially read from said temporary storage locations to modulation symbol constellations to generate digital coordinates descriptive of successive ones of said modulation symbol constellations;

mapping the bits of each said portion of said FEC codeword finally read from said temporary storage locations to modulation symbol constellations to generate digital coordinates descriptive of successive ones of said modulation symbol constellations, said mapping of said bits of each said FEC codeword finally read from said temporary storage locations to said modulation symbol constellations differing from said mapping of said bits of each said FEC codeword initially read from said temporary storage locations to said modulation symbol constellations, those bits of each said FEC codeword mapped less robustly to said modulation symbol constellations when initially read from said temporary storage locations being mapped more robustly to said modulation symbol constellations when finally read from said temporary storage locations, those bits of each said FEC codeword mapped more robustly to said modulation symbol constellations when initially read from said temporary storage locations being mapped less robustly to said modulation symbol constellations when finally read from said temporary storage locations; and generating a modulated carrier wave responsive to said digital coordinates descriptive of successive ones of said modulation symbol constellations mapping each said FEC codeword as twice read from said temporary storage locations within said digital memory, said modulated carrier wave to be transmitted by said broadcast transmitter.

2. The claim 1 method for preparing packets of digital data to be transmitted by a COFDM broadcast transmitter, wherein said step of forward-error-correction (FEC) coding successive frames of digital data to generate respective FEC codewords is conducted so as to generate FEC codewords that are low-density parity-check (LDPC) codewords for subsequent said writing to said temporary storage locations within said digital memory.

3. The claim 1 method for preparing packets of digital data to be transmitted by a COFDM broadcast transmitter, wherein said first time-sequential order differs from said second time-sequential order in that initial and final portions of each COFDM symbol in said initial reading thereof are in reverse order from their order in said final reading thereof.

4. The claim 3 method for preparing packets of digital data to be transmitted by a COFDM broadcast transmitter, wherein said substeps of finally reading said digital coordinates descriptive of said modulation symbol constellations in each of successive COFDM symbols occur within a few COFDM symbol intervals of said substeps of initially reading said digital coordinates descriptive of the same said modulation symbol constellations.

5. The claim 3 method for preparing packets of digital data to be transmitted by a COFDM broadcast transmitter, wherein said substeps of finally reading said digital coordinates descriptive of said modulation symbol constellations in each of successive COFDM symbols occurs a prescribed number of COFDM frame intervals after said substeps of initially reading said digital coordinates descriptive of the same said modulation symbol constellations, said prescribed number being at least one.

6. A receiver for iterative-diversity reception of a selected one of modulated radio-frequency carrier waves, each comprising a plurality of coded orthogonal frequency-division multiplexed (COFDM) modulated subcarriers for transmitting forward-error-correction (FEC) coded digital signals twofold in time-division multiplex, COFDM symbols of initial transmissions of said FEC-coded digital signals being time-interleaved with COFDM symbols of final transmissions of the same said FEC-coded digital signals occurring a prescribed time interval later, bits of said FEC-coded digital signals mapping to plural-amplitude-level symbol constellations in a first way in COFDM symbols of final transmissions of said FEC-coded digital signals, bits of said FEC-coded digital signals mapping to plural-amplitude-level symbol constellations in a second way in COFDM symbols of initial transmissions of said FEC-coded digital signals respectively preceding said final transmissions thereof, the more robust bits of lattice-point labels in the first way of mapping being the less robust bits of similar lattice-point labels in the second way of mapping, and the more robust bits of lattice-point labels in the second way of mapping being the less robust bits of lattice-point labels in the first way of mapping, said receiver comprising:

a tuner for receiving and demodulating said selected one of said modulated radio-frequency carrier waves to generate a baseband digitized COFDM signal;

a unit for removing the guard interval from said baseband digitized COFDM signal;

a computer for computing the discrete Fourier transform (DFT) of said baseband digitized COFDM signal from which said guard interval thereof has been removed, thereby to recover complex-coordinate descriptions of said plural-amplitude-level symbol constellations;

parallel-to-serial conversion apparatus for converting said complex-coordinate descriptions of said plural-amplitude-level symbol constellations from said final transmissions as received from said computer to a prescribed first serial order and for converting said complex-coordinate descriptions of said plural-amplitude-level symbol constellations from said initial transmissions as received from said computer to a second serial order;

a first de-mapper for said FEC-coded digital signals with bits mapped to plural-amplitude-level symbol constellations in said first way in COFDM symbols of said final transmissions of said FEC-coded digital signals, said first de-mapper connected for responding to said complex-coordinate descriptions of said plural-amplitude-level symbol constellations from said final transmissions that are supplied from said parallel-to-serial conversion apparatus in said first serial order, thus to generate first de-mapping reproductions of said FEC-coded digital signals;

a second de-mapper for said FEC-coded digital signals with bits mapped to plural-amplitude-level symbol constellations in said second way in COFDM symbols of said initial transmissions of said FEC-coded digital signals, said second de-mapper connected for responding to said complex-coordinate descriptions of said plural-amplitude-level symbol constellations from said initial transmissions that are supplied in second prescribed order from said parallel-to-serial conversion apparatus, thus to generate second reproductions of said FEC-coded digital signals; and apparatus responsive to said first and said second reproductions of said FEC-coded digital signals for decoding them, thereby to supply digital signals that are at least partially corrected for errors incurred during transmissions of said FEC-coded digital signals.

7. A receiver as set forth in claim 6, said receiver configured for usefully receiving FEC-coded digital signals that include low-density parity-check (LDPC) coding, wherein said apparatus responsive to said first and said second reproductions of said FEC-coded digital signals for decoding them comprises:

a first decoder for LDPC coding, connected for receiving said first reproduction of FEC-coded digital signals from said first de-mapper for said FEC-coded digital signals and responding to generate first results of decoding LDPC coding;

a second decoder for LDPC coding, connected for receiving said second reproduction of FEC-coded digital signals from said second de-mapper for said FEC-coded digital signals and responding to generate second results of decoding LDPC coding; and apparatus for combining said first results of decoding LDPC coding with said second results of decoding LDPC coding to generate combined results of decoding LDPC coding with reduced transmission errors.

8. A receiver as set forth in claim 7, wherein said first de-mapper is an adaptive soft de-mapper of quadrature-amplitude-modulation (QAM) symbol constellations arranged in a first turbo connection with said first decoder for LDPC coding and provided with respective memory for said first de-mapping results and updates thereof, and wherein said second de-mapper is an adaptive soft de-mapper of QAM symbol constellations arranged in a second turbo connection with said second decoder for LDPC coding and provided with respective memory for said second de-mapping results and updates thereof.

9. A receiver as set forth in claim 6, wherein said complex-coordinate descriptions of said plural-amplitude-level symbol constellations from said final transmissions as converted to a second first serial order provide an input signal for said first de-mapper for said FEC-coded digital signals, said receiver further comprising:
　　means for delaying said complex-coordinate descriptions of said plural-amplitude-level symbol constellations from said initial transmissions as converted to said second serial order to concur in time with ones of said complex-coordinate descriptions of said plural-amplitude-level symbol constellations from said final transmissions as converted to said first serial order that convey similar information, said complex-coordinate descriptions of said plural-amplitude-level symbol constellations from said initial transmissions as so delayed providing an input signal for said second de-mapper for said FEC-coded digital signals.

10. A receiver as set forth in claim 9 configured for receiving COFDM symbols of said final transmissions that map plural-amplitude-level symbol constellations to said COFDM modulated subcarriers in accordance with a first prescription and for further receiving COFDM symbols of initial transmissions of said FEC-coded digital signals that map plural-amplitude-level symbol constellations to said COFDM modulated subcarriers in accordance with a second prescription different from said first prescription, wherein said parallel-to-serial conversion apparatus converts said complex-coordinate descriptions of said plural-amplitude-level symbol constellations from said initial transmissions received from said computer to a second serial order that is different from said first serial order.

11. A receiver as set forth in claim 10, wherein said parallel-to-serial conversion apparatus for converting said complex-coordinate descriptions of said plural-amplitude-level symbol constellations from said final transmissions as received from said computer to said first serial order and for converting said complex-coordinate descriptions of said plural-amplitude-level symbol constellations from said initial transmissions as received from said computer to said second serial order comprises:
　　a first parallel-to-serial converter connected for converting said complex-coordinate descriptions of said plural-amplitude-level symbol constellations from said final transmissions as received from said computer to said first serial order for providing said input signal to said first de-mapper; and
　　a second parallel-to-serial converter connected for converting said complex-coordinate descriptions of said plural-amplitude-level symbol constellations from said initial transmissions as received from said computer to said second serial order for providing input signal to said means for delaying said complex-coordinate descriptions.

12. A receiver as set forth in claim 11, further comprising:
　　a first memory configured for being written with said complex-coordinate descriptions of said plural-amplitude-level symbol constellations as converted to said first serial order and being read for restoring an original order of said plural-amplitude-level symbol constellations for application to said first de-mapper as its said input signal; and
　　a second memory configured for being written with said complex-coordinate descriptions of said plural-amplitude-level symbol constellations as converted to said first second order and being read in accordance with said original order of said plural-amplitude-level symbol constellations for application with delay to said second de-mapper as its said input signal.

13. A receiver as set forth in claim 12, wherein said first de-mapper is an adaptive soft de-mapper of quadrature-amplitude-modulation (QAM) symbol constellations arranged in a first turbo connection with said first decoder for LDPC coding and provided with respective memory for said first de-mapping results and updates thereof, wherein said second de-mapper is an adaptive soft de-mapper of QAM symbol constellations arranged in a second turbo connection with said second decoder for LDPC coding and provided with respective memory for said second de-mapping results and updates thereof, and wherein said apparatus for combining said first results of decoding LDPC coding with said second results of decoding LDPC coding to generate combined results of decoding LDPC coding with reduced transmission errors comprises:
　　a survivor selection unit connected for periodically transferring bits with little chance of error from said first de-mapper to said respective memory in said second de-mapper for replacing corresponding bits with substantially larger chance of error, said survivor selection unit further connected for periodically transferring bits with little chance of error from said second de-mapper to said respective memory in first de-mapper for replacing corresponding bits with substantially larger chance of error.

14. A receiver as set forth in claim 11, wherein said first de-mapper is an adaptive soft de-mapper of quadrature-amplitude-modulation (QAM) symbol constellations arranged in a first turbo connection with said first decoder for LDPC coding and provided with respective memory for said first de-mapping results and updates thereof, wherein said second de-mapper is an adaptive soft de-mapper of QAM symbol constellations arranged in a second turbo connection with said second decoder for LDPC coding and provided with respective memory for said second de-mapping results and updates thereof, and wherein said apparatus for combining said first results of decoding LDPC coding with said second results of decoding LDPC coding to generate combined results of decoding LDPC coding with reduced transmission errors comprises:
　　a survivor selection unit connected for periodically transferring bits with little chance of error from said first de-mapper to said respective memory in said second de-mapper for replacing corresponding bits with substantially larger chance of error, said survivor selection unit further connected for periodically transferring bits with little chance of error from said second de-mapper to said respective memory in first de-mapper for replacing corresponding bits with substantially larger chance of error.

15. A receiver as set forth in claim 10, wherein said parallel-to-serial conversion apparatus for converting said complex-coordinate descriptions of said plural-amplitude-level symbol constellations from said final transmissions as received from said computer to said first serial order and for converting said complex-coordinate descriptions of said plural-amplitude-level symbol constellations from said initial transmissions as received from said computer to said second serial order comprises:
　　a parallel-to-serial converter connected for converting said complex-coordinate descriptions of said plural-amplitude-level symbol constellations both from said final transmissions and said initial transmissions as received from said computer to said first serial order; and
　　a first memory configured for being written with said complex-coordinate descriptions of said plural-amplitude-level symbol constellations as converted to said first serial order and being read for revising the order said complex-coordinate descriptions of said plural-amplitude-level symbol constellations to convert them to said second serial order, said first memory thereby providing said means for delaying said complex-coordinate descriptions of said plural-amplitude-level symbol constellations from said initial transmissions as converted to said second serial order to concur in time with ones of said complex-coordinate descriptions of said plural-amplitude-level symbol constellations from said final transmissions as converted to said first serial order that convey similar information.

16. A receiver as set forth in claim 15, further comprising:
a second memory configured for being written with said complex-coordinate descriptions of said plural-amplitude-level symbol constellations as converted to said first serial order and being read for restoring an original order of said plural-amplitude-level symbol constellations for application to said first de-mapper as its said input signal; and
a third memory configured for being written with said complex-coordinate descriptions of said plural-amplitude-level symbol constellations as converted to said first second order and being read in accordance with said original order of said plural-amplitude-level symbol constellations for application to said second de-mapper as its said input signal.

17. A receiver as set forth in claim 16, wherein said first de-mapper is an adaptive soft de-mapper of quadrature-amplitude-modulation (QAM) symbol constellations arranged in a first turbo connection with said first decoder for LDPC coding and provided with respective memory for said first de-mapping results and updates thereof, wherein said second de-mapper is an adaptive soft de-mapper of QAM symbol constellations arranged in a second turbo connection with said second decoder for LDPC coding and provided with respective memory for said second de-mapping results and updates thereof, and wherein said apparatus for combining said first results of decoding LDPC coding with said second results of decoding LDPC coding to generate combined results of decoding LDPC coding with reduced transmission errors comprises:
a survivor selection unit connected for periodically transferring bits with little chance of error from said first de-mapper to said respective memory in said second de-mapper for replacing corresponding bits with substantially larger chance of error, said survivor selection unit further connected for periodically transferring bits with little chance of error from said second de-mapper to said respective memory in first de-mapper for replacing corresponding bits with substantially larger chance of error.

18. A receiver as set forth in claim 15, wherein said first de-mapper is an adaptive soft de-mapper of quadrature-amplitude-modulation (QAM) symbol constellations arranged in a first turbo connection with said first decoder for LDPC coding and provided with respective memory for said first de-mapping results and updates thereof, wherein said second de-mapper is an adaptive soft de-mapper of QAM symbol constellations arranged in a second turbo connection with said second decoder for LDPC coding and provided with respective memory for said second de-mapping results and updates thereof, and wherein said apparatus for combining said first results of decoding LDPC coding with said second results of decoding LDPC coding to generate combined results of decoding LDPC coding with reduced transmission errors comprises:
a survivor selection unit connected for periodically transferring bits with little chance of error from said first de-mapper to said respective memory in said second de-mapper for replacing corresponding bits with substantially larger chance of error, said survivor selection unit further connected for periodically transferring bits with little chance of error from said second de-mapper to said respective memory in first de-mapper for replacing corresponding bits with substantially larger chance of error.

19. A receiver as set forth in claim 10, said receiver configured for usefully receiving FEC-coded digital signals that include low-density parity-check (LDPC) coding, wherein said apparatus for decoding said first and said second reproductions of said FEC-coded digital signals comprises:
a time-division multiplexer having two input ports and an output port, a first of said two input ports of said time-division multiplexer connected for receiving said first de-mapping results, and a second of said two input ports of said time-division multiplexer connected for receiving said second de-mapping results, said time-division multiplexer configured for alternately reproducing at its output port said first de-mapping results and said second de-mapping results forwarded to said de-interleaving apparatus to produce said first and said second reproductions of said FEC-coded digital signals alternately;
a decoder for LDPC coding, having an input port connected for receiving said first and said second reproductions of said FEC-coded digital signals alternately from said de-interleaving apparatus and responding to generate results of decoding LDPC coding of said first and said second reproductions of said FEC-coded digital signals alternately.

20. A receiver as set forth in claim 19, further comprising:
a first memory configured for being written with said complex-coordinate descriptions of said plural-amplitude-level symbol constellations as converted to said first serial order and being read for restoring an original order of said plural-amplitude-level symbol constellations for application to said first de-mapper as its said input signal; and
a second memory configured for being written with said complex-coordinate descriptions of said plural-amplitude-level symbol constellations as converted to said first second order and being read in accordance with said original order of said plural-amplitude-level symbol constellations for application with delay to said second de-mapper as its said input signal.

21. A receiver as set forth in claim 19, wherein said first de-mapper is an adaptive soft de-mapper of quadrature-amplitude-modulation (QAM) symbol constellations arranged in a first turbo connection with said decoder for LDPC coding and provided with respective memory for said first de-mapping results and updates thereof, wherein said second de-mapper is an adaptive soft de-mapper of QAM symbol constellations arranged in a second turbo connection with said decoder for LDPC coding and provided with respective memory for said second de-mapping results and updates thereof, said receiver further comprising:
a survivor selection unit connected for periodically transferring bits with little chance of error from said first de-mapper to said respective memory in said second de-mapper for replacing corresponding bits with substantially larger chance of error, said survivor selection unit further connected for periodically transferring bits with little chance of error from said second de-mapper to said respective memory in first de-mapper for replacing corresponding bits with substantially larger chance of error.

22. A receiver as set forth in claim 21, further comprising:
a first memory configured for being written with said complex-coordinate descriptions of said plural-amplitude-level symbol constellations as converted to said first serial order and being read for restoring an original order of said plural-amplitude-level symbol constellations for application to said first de-mapper as its said input signal; and
a second memory configured for being written with said complex-coordinate descriptions of said plural-amplitude-level symbol constellations as converted to said first second order and being read in accordance with said original order of said plural-amplitude-level symbol constellations for application with delay to said second de-mapper as its said input signal.

23. A receiver as set forth in claim 19, wherein said parallel-to-serial conversion apparatus for converting said complex-coordinate descriptions of said plural-amplitude-level symbol constellations from said final transmissions as received from said computer to said first serial order and for converting said complex-coordinate descriptions of said plural-amplitude-level symbol constellations from said initial transmissions as received from said computer to said second serial order comprises:
a first parallel-to-serial converter connected for converting said complex-coordinate descriptions of said plural-amplitude-level symbol constellations from said final transmissions as received from said computer to said first serial order for providing said input signal to said first de-mapper; and
a second parallel-to-serial converter connected for converting said complex-coordinate descriptions of said plural-amplitude-level symbol constellations from said initial transmissions as received from said computer to said second serial order for providing input signal to said means for delaying said complex-coordinate descriptions.

24. A receiver as set forth in claim 23, further comprising:
a first memory configured for being written with said complex-coordinate descriptions of said plural-amplitude-level symbol constellations as converted to said first serial order and being read for restoring an original order of said plural-amplitude-level symbol constellations for application to said first de-mapper as its said input signal; and
a second memory configured for being written with said complex-coordinate descriptions of said plural-amplitude-level symbol constellations as converted to said first second order and being read in accordance with said original order of said plural-amplitude-level symbol constellations for application with delay to said second de-mapper as its said input signal.

25. A receiver as set forth in claim 19, wherein said parallel-to-serial conversion apparatus for converting said complex-coordinate descriptions of said plural-amplitude-level symbol constellations from said final transmissions as received from said computer to said first serial order and for converting said complex-coordinate descriptions of said plural-amplitude-level symbol constellations from said initial transmissions as received from said computer to said second serial order comprises:
a parallel-to-serial converter connected for converting said complex-coordinate descriptions of said plural-amplitude-level symbol constellations both from said final transmissions and said initial transmissions as received from said computer to said first serial order; and
a first memory configured for being written with said complex-coordinate descriptions of said plural-amplitude-level symbol constellations as converted to said first serial order and being read for revising the order said complex-coordinate descriptions of said plural-amplitude-level symbol constellations to convert them to said second serial order, said first memory thereby providing said means for delaying said complex-coordinate descriptions of said plural-amplitude-level symbol constellations from said initial transmissions as converted to said second serial order to concur in time with ones of said complex-coordinate descriptions of said plural-amplitude-level symbol constellations from said final transmissions as converted to said first serial order that convey similar information.

26. A receiver as set forth in claim 25, further comprising:
a second memory configured for being written with said complex-coordinate descriptions of said plural-amplitude-level symbol constellations as converted to said first serial order and being read for restoring an original order of said plural-amplitude-level symbol constellations for application to said first de-mapper as its said input signal; and
a third memory configured for being written with said complex-coordinate descriptions of said plural-amplitude-level symbol constellations as converted to said first second order and being read in accordance with said original order of said plural-amplitude-level symbol constellations for application to said second de-mapper as its said input signal.

27. A receiver for iterative-diversity reception of a selected one of modulated radio-frequency carrier waves, each comprising a plurality of coded orthogonal frequency-division multiplexed (COFDM) modulated subcarriers for transmitting forward-error-correction (FEC) coded digital signals twofold in time-division multiplex, bits of said FEC-coded digital signals mapping to plural-amplitude-level symbol constellations in a first way in COFDM symbols of first transmissions of said FEC-coded digital signals, bits of said FEC-coded digital signals mapping to plural-amplitude-level symbol constellations in a second way in COFDM symbols of second transmissions of said FEC-coded digital, said receiver comprising:
a tuner for receiving and demodulating said selected one of said modulated radio-frequency carrier waves to generate a baseband digitized COFDM signal;
a unit for removing the guard interval from said baseband digitized COFDM signal;
a computer for computing the discrete Fourier transform (DFT) of said baseband digitized COFDM signal from which said guard interval thereof has been removed, thereby to recover complex-coordinate descriptions of said plural-amplitude-level symbol constellations;
parallel-to-serial conversion apparatus for converting said complex-coordinate descriptions of said plural-amplitude-level symbol constellations from said final transmissions as received from said computer to a prescribed first serial order and for converting said complex-coordinate descriptions of said plural-amplitude-level symbol constellations from said initial transmissions as received from said computer to a second serial order;
a first adaptive "soft" de-mapper for said FEC-coded digital signals with bits mapped to plural-amplitude-level symbol constellations in said first way in COFDM symbols of said first transmissions of said FEC-coded digital signals, said first de-mapper connected for responding to said complex-coordinate descriptions of said plural-amplitude-level symbol constellations from said first transmissions that are supplied from said parallel-to-serial conversion apparatus in said first serial order, thus to generate first de-mapping results providing first de-mapping reproductions of said FEC-coded digital signals said first de-mapper provided with respective memory for said first de-mapping results and updates thereof;

a second adaptive "soft" de-mapper for said FEC-coded digital signals with bits mapped to plural-amplitude-level symbol constellations in said second way in COFDM symbols of said second transmissions of said FEC-coded digital signals, said second de-mapper connected for responding to said complex-coordinate descriptions of said plural-amplitude-level symbol constellations from said initial transmissions that are supplied in second prescribed order from said parallel-to-serial conversion apparatus, thus to generate second de-mapping results providing second reproductions of said FEC-coded digital signals, said second de-mapper provided with respective memory for said second de-mapping results and updates thereof; and decoding apparatus responsive to said first and said second reproductions of said FEC-coded digital signals for decoding them, thereby to supply digital signals that are at least partially corrected for errors incurred during transmissions of said FEC-coded digital signals;

a first turbo connection of said first adaptive "soft" de-mapper for said FEC-coded digital signal with said decoding apparatus, said first turbo connection configured for generating said updates of said first de-mapping results;

a second turbo connection of said second adaptive "soft" de-mapper for said FEC-coded digital signal with said decoding apparatus, said second turbo connection configured for generating said updates of said second de-mapping results; and a survivor selection unit connected for periodically transferring bits with little chance of error from said first de-mapper to said respective memory in said second de-mapper for replacing corresponding bits with substantially larger chance of error, said survivor selection unit further connected for periodically transferring bits with little chance of error from said second de-mapper to said respective memory in first de-mapper for replacing corresponding bits with substantially larger chance of error.

* * * * *